United States Patent
Florance et al.

(10) Patent No.: US 6,871,140 B1
(45) Date of Patent: Mar. 22, 2005

(54) SYSTEM AND METHOD FOR COLLECTION, DISTRIBUTION, AND USE OF INFORMATION IN CONNECTION WITH COMMERCIAL REAL ESTATE

(75) Inventors: Andrew Florance, Chevy Chase, MD (US); David Schaffel, Rockville, MD (US); Constantine Violagis, Potomac, MD (US); Bruce Foster, Santa Monica, CA (US); Harlan Hamlin, Potomac, MD (US); John Choi, San Diego, CA (US); Vladimir Bulkin, North Potomac, MD (US); Robert Stroman, Bethesda, MD (US); Mark Newmister, Ellicott City, MD (US); Michael Glick, Potomac, MD (US)

(73) Assignee: Costar Group, Inc., Bethesda, MD (US)

( * ) Notice: Subject to any disclaimer, the term of this patent is extended or adjusted under 35 U.S.C. 154(b) by 614 days.

(21) Appl. No.: 09/693,988

(22) Filed: Oct. 23, 2000

Related U.S. Application Data

(60) Provisional application No. 60/229,527, filed on Sep. 5, 2000, provisional application No. 60/194,700, filed on Apr. 5, 2000, provisional application No. 60/185,392, filed on Feb. 28, 2000, and provisional application No. 60/185,066, filed on Feb. 25, 2000.

(51) Int. Cl.[7] .............................................. G01C 21/26
(52) U.S. Cl. .................... 701/207; 705/26; 342/357.09; 342/357.1; 340/988
(58) Field of Search ........................ 705/25, 26; 707/3; 701/213, 207

(56) References Cited

U.S. PATENT DOCUMENTS

| | | | |
|---|---|---|---|
| 4,713,761 A | 12/1987 | Sharpe et al. | |
| 4,829,423 A | * 5/1989 | Tennant et al. | ................. 704/8 |

(List continued on next page.)

FOREIGN PATENT DOCUMENTS

| | | | |
|---|---|---|---|
| EP | 0 902 381 | 3/1999 | ........... G06F/17/60 |
| GB | 0104529.3 | 3/2003 | |
| WO | WO 00/49530 | 8/0000 | |
| WO | WO 99/49404 | 9/1999 | ........... G06F/17/60 |
| WO | WO 99/56144 | 11/1999 | |
| WO | WO 00/04476 | 1/2000 | ........... G06F/17/60 |
| WO | WO 00/75843 | 12/2000 | ........... G06F/17/60 |
| WO | WO 01/11513 | 2/2001 | ........... G06F/17/60 |
| WO | WO 01/16768 | 3/2001 | ........... G06F/13/14 |
| WO | WO 01/48643 | 7/2001 | ........... G06F/17/60 |
| WO | WO 01/63528 | 8/2001 | ........... G06F/17/60 |

OTHER PUBLICATIONS

"LoopNet," www.loopnet.com.
http://dc.internet.com/news/article.php/408601.
http://www.costar.com/products/exchange.
http://news.stockselector.com/newsarticle.asp?symbol=CSGP&article=21129490.

(List continued on next page.)

*Primary Examiner*—Richard Chilcot
*Assistant Examiner*—James A Kramer
(74) *Attorney, Agent, or Firm*—Michael D. Bednarek; Shaw Pittman LLP

(57) ABSTRACT

A system and method for creating a unified commercial real estate data model through collection, distribution and use of information in connection with commercial real estate and for creating a web-based marketplace that facilitates the efficient and secure buying and selling of commercial properties. The invention provides a digital marketplace in which the members of the commercial real estate and related business community can continuously interact and facilitate transactions by efficiently exchanging accurate and standardized information. The present invention also facilitates mortgage lending and provides enough information to allow lenders to underwrite a property. The present invention also provides a mobile data gathering and dissemination vehicle as well as a system tracking and dispatch of mobile vehicles. The present invention further provides correlation of data stored in a remote location to vehicle position in real time.

67 Claims, 73 Drawing Sheets

U.S. PATENT DOCUMENTS

| | | | |
|---|---|---|---|
| 4,870,576 A | | 9/1989 | Tornetta |
| 4,891,761 A | * | 1/1990 | Gray et al. ................. 701/219 |
| 4,974,170 A | | 11/1990 | Bouve et al. ............... 364/518 |
| 5,032,989 A | | 7/1991 | Tornetta ..................... 364/401 |
| 5,214,757 A | | 5/1993 | Mauney et al. ............. 395/161 |
| 5,222,018 A | | 6/1993 | Sharpe et al. |
| 5,289,572 A | | 2/1994 | Yano et al. ................. 395/155 |
| 5,414,838 A | | 5/1995 | Kolton et al. |
| 5,420,405 A | | 5/1995 | Chasek |
| 5,424,951 A | | 6/1995 | Nobe et al. ................. 364/443 |
| 5,543,789 A | | 8/1996 | Behr et al. .................. 340/995 |
| 5,576,755 A | * | 11/1996 | Davis et al. ................... 725/48 |
| 5,584,025 A | | 12/1996 | Keithley et al. ............ 395/615 |
| 5,664,115 A | | 9/1997 | Fraser .......................... 705/37 |
| 5,680,305 A | | 10/1997 | Apgar, IV .............. 364/401 R |
| 5,682,525 A | | 10/1997 | Bouve et al. ............... 395/615 |
| 5,717,737 A | | 2/1998 | Doviak et al. ................. 379/58 |
| 5,724,524 A | | 3/1998 | Hunt et al. |
| 5,802,492 A | * | 9/1998 | DeLorme et al. ........ 455/456.5 |
| 6,026,375 A | | 2/2000 | Hall et al. .................... 705/26 |
| 6,038,522 A | * | 3/2000 | Manson et al. ............. 702/150 |
| 6,385,541 B1 | * | 5/2002 | Blumberg et al. .......... 701/213 |
| 6,401,068 B1 | * | 6/2002 | Cherveny et al. ........... 704/275 |
| 6,496,702 B1 | * | 12/2002 | Lockhart ................. 455/456.5 |
| 6,550,057 B1 | * | 4/2003 | Bowman-Amuah ......... 717/126 |

OTHER PUBLICATIONS

Article entitled "The Touring Machine" (1997)—by Feiner et al. retrieved from http://www1.cs.columbia.edu/graphics/projects/mars/touring.html.

Copy of UK Search Report dated Apr. 2, 2004.

* cited by examiner

3381 West Pico Blvd.
Century Park Center
Los Angeles, California
A 292,000 SF Office Building Offered at $49,500,000 overview | financial | tenants | market | comps | map

| | | | |
|---|---|---|---|
| Price: | $ 49,500,000 | Use: | Income Property |
| Price/SF: | $ 175.98 | Cap Rate: | 8.52% |

Change a field in the worksheet and click "calculate" to refresh the section with new numbers.

| | | | |
|---|---|---|---|
| Down Payment: | $ 2,000,150 | Price: $ | 20,000,000 |
| New Loan: | $ 20,000,000.00 | Cap Rate: | 8.00 % |
| Net Operating Income: | $ 1,000,000 | Down Payment: | 30 % |
| Loan Payment: | $ 520,012 | Interest Rate: | 8.00 % |
| Pre-Tax Cash Flow: | $ 172,300 | Loan Term: | 30 |

| | | | |
|---|---|---|---|
| Gross Income: | $ 6,627,000 | Taxes: | $ 560,000 |
| Other Income: | $ 1,405,080 | Insurance: | $ 109,784 |
| Vacancy Allowance: | $ (401,600) | Utilities: | $ 871,090 |
| Operating Expenses: | ($ 3,418,200) | Wages: | $ 423,691 |
| Net Operating Income: | $ 4,218,200 | Maintenance: | $ 409,000 |
| Loan Payment: | $ (3,381,948) | Management: | $ 275,000 |
| Pre-Tax Cash Flow: | $ 836,252 | Misc/Reserves: | $ 813,635 |
| | | Total Est Expenses: | ($ 3,412,200) |
| Current Asking Rent/SF: | $ 26.10 | | |
| Est Average Rent/SF: | $ 23.50 | Est Expenses/SF: | $ 12.10 |

| | | | |
|---|---|---|---|
| Lender | First Union | Existing Loan: | $ 925,000 |
| Loan Payment: | $ 88,368 | Interest Rate: | 8.0 |
| Due Date: | November 1, 2027 | Loan Term: | 30 |

Building Questionnaires

Please select the type of property you wish to profile in CoStar Property™:

- For Lease Properties
  - Office
  - Industrial

- For Sale Properties
  - *Coming Soon!*

If you prefer to fax your questionnaire, click on the link to download the corresponding form in PDF format*:

- Office
- Industrial

*You need to have Adobe Acrobat on your computer. If you do not have Adobe Acrobat, get it now.

*Please note:* Data that is submitted by this questionnaire will be transmitted to CoStar Group's Research Division for entry into CoStar Property™. This does not submit data directly into CoStar Property™. For more information, please contact CoStar Group at info@costargroup.com.

Home    Products & Services    Corporate Info    Support    Contact Us    Site Map Copyright © 1998-2000 CoStar Realty Information, Inc. All Rights Reserved.
7475 Wisconsin Avenue • Suite 600 • Bethesda, Maryland 20814 • 800.204.5960 • (NASDAQ: CSGP)

Terms of use    Privacy Policy    Photo Restrictions    Contact Us

Loss/Core Factor  Elevators
                  Passenger
                  #
                  Freight
                  #

Clear   Suite Level Information >

Home      Products & Services    Corporate Info    Support        Contact Us      Site Map
              Copyright © 1998-2000 CoStar Realty Information, Inc. All Rights Reserved.
     7475 Wisconsin Avenue • Suite 600 • Bethesda, Maryland 20814 • 800.204.5960 • (NASDAQ: CSGP)
Terms of use         Privacy Policy             Photo Restrictions            Contact Us

SYSTEM AND METHOD FOR COLLECTION, DISTRIBUTION, AND USE OF INFORMATION IN CONNECTION WITH COMMERCIAL REAL ESTATE

This application claims the benefit of the priority of the following provisional applications:

"Information Distribution System," Application Ser. No. 60/185,066, filed Feb. 25, 2000;

"Information Distribution System," Application Ser. No. 60/185,392, filed Feb. 28, 2000;

"System and Method For Collection, Distribution, and Use Of Information in Connection with Commercial Real Estate," Application Ser. No. 60/194,700, filed Apr. 5, 2000; and "System and Method For Collection, Distribution, and Use Of Information in Connection with Commercial Real Estate," Application Ser. No. 60/229,527, filed Sep. 5, 2000.

These provisional applications are hereby incorporated by reference in their entireties.

BACKGROUND

1. Field of the Invention

The present invention broadly relates to the field of electronic commerce and global network information management services, and more specifically, to a system and method for creating a unified commercial real estate data model through collection, distribution and use of information in connection with commercial real estate and web-based information systems that facilitate the buying and selling of commercial real estate.

2. Background of the Invention

Whether measured in terms of variety, volume, or value of transactions, the market for commercial real estate information is vast. In 1998, the U.S. commercial real estate market had: hundreds of thousand of leasing transactions, with an aggregate value of more than $200 billion, and had tens of thousands of sales transactions, with an aggregate value of $285 billion. In the same year, lenders, provided tens of thousands of commercial real estate loans, with an aggregate net value of more than $110 billion, according to the Federal Reserve Board. F. W. Dodge reports that during 1998, construction commenced on 766 million square feet of commercial properties with an aggregate value of $52 billion. Finally, vendors made $10 billion in sales to tenants who were moving to new facilities, according to the Corporate Realty Design and Management Institute.

Despite its enormous size, the real estate industry in many ways is a backwater. In the current market, real estate brokers perform various functions. To begin with, individuals, institutions, and owner/users buy and sell buildings. The aggregate sales value of commercial properties sold in the United States in one year is about $285 billion, according to a Federal Reserve estimate. Most transactions occur through the use of a commercial real estate broker, whose job is to list the asset for sale, disseminate the correct information, respond to questions and requests for specific information, attempt to create an auction atmosphere, and complete and close a sale. Brokers typically receive between 1% and 6% of the sales value of the property, with the lower commission rates corresponding to higher sales values.

Below a level of, about, $5 million, sales are typically locally sourced to local users or individuals or small institutions. Beyond $5 million and, more acutely, past $10 million, the market becomes more regional as the buyer base narrows. Above $25 million, the market becomes institutional in the sense that the potential buyers are REITs, pension funds, advisors, or corporations. At this level the market becomes national and, to some extent, international. It is critically important to limit the dissemination of information in this context.

In addition, every building that is not owner occupied must be leased. Brokers usually take one side of the transaction as either the listing broker or the tenant rep. Listing brokers list the space for the property owner and attempt to drum up interest in the space with flyers and information packages. Brokers also typically specialize in a type of property and in a region, so their added value is in knowing who is most likely to want a specific space for lease. Tenant representatives usually represent the tenant and are specifically looking for space for expansion or to enter a new market. Tenant representatives consolidate all the listing information from the listing brokers in a market for a specific type of space, conform the package, and help the user make an informed decision. Many individual brokers do both.

The real estate industry is so large and fragmented that, historically, there has been no meaningful national research. Research that does exist is typically local or regional in nature, frequently limited to occupancy and rental rate information, and most of the time only marginally accurate. From market to market, different data was kept by the administrative assistant for a couple of local brokers, who would then hold that out as proprietary knowledge in that particular market. Ten years ago this was out of date; by today's standards, it is completely useless. With the trend towards much more liquid real estate markets and the dominance of large regional and national tenants and capital providers, the need for accurate national data has become acute.

At present, however, transaction costs are high, and information is non-standardized as states, cities, and local communities all have their own rules and regulations. To add to the milieu of confusion, investors and owners frequently have different tax statuses, so comparisons are never apples-to-apples. Brokers typically use this to their advantage—their pitch becomes "I am the only one that knows all this stuff, and if you don't use me, what you don't know can hurt you." A helpful way to think about this would be to imagine that each securities brokerage firm maintained its own exchange, instead of them all feeding the NYSE and NASDAQ. Clients would have little chance of getting the best execution since there would be a closed market only. To some extent, real estate has operated this way historically, except that each of the brokerage firms referred to these closed networks as "proprietary information."

Over the past 15 years, however, a new class of investors and users has opened up the business. National institutional owners like the REITs and large ERISA managers like Jones Lang LaSalle have created a need for standardized, reliable information and processes. This, in turn, has led to a mass consolidation among the smaller local and regional brokers. This trend toward a national information standard is becoming more powerful. The old model of the local power broker is being replaced by a single-point-of-contact model for national real estate companies, in which client needs are met with just one relationship. The only way a small brokerage firm can level the field is by having access to the same information as the larger brokers.

It has been long demonstrated in other contexts, e.g., the securities industry, that distributed information improves market efficiency. In the securities industry each broker has a system on their desk that gives them access to standardized, accurate securities pricing information. Largely, information is collected by the exchanges and consolidated into a standard system of quotes and news. The vendors of the information try to figure out the best way to graphically present the information and to price the data feed to maximize revenue. For the most part, the major quote and information providers are all providing the same thing. The present invention relates to a way of applying this approach to real estate information. By centralizing and standardizing the information, it has made it much more user friendly and, hence, valuable. It has created a digital exchange with itself as the sponsor.

To facilitate transactions, industry participants must have, extensive, accurate, and current information. Members of the commercial real estate and related business community require daily access to current data such as rental rates, vacancy rates, tenant movements, supply, new construction, absorption rates, and other important market developments to carry out their businesses effectively. Such data collection is time-consuming, as shown by a 1996 study, which found that commercial real estate professionals spent 40% of their workday collecting and analyzing information on the real estate market. Therefore, there is a need for a unified commercial real estate data model to develop an efficient marketplace, where members of the commercial real estate and related business community can exchange information, evaluate opportunities using national standardized data, and interact with each other on a continuous basis.

The parties involved in the commercial real estate and related business community that require extensive information, include: sales and leasing brokers; property owners; property management firms; design and construction firms; real estate developers; real estate investment trusts; investment banks; commercial banks; investors and asset managers; government agencies; mortgage-backed security issuers; appraisers; media; tenant vendors; building services vendors; communications providers; insurance companies and institutional advisors.

The commercial real estate related business community has yet to develop an efficient marketplace because of the fragmented approach to gathering and exchanging information within the marketplace, i.e., the lack of a unified data model. Various organizations, including hundreds of brokerage firms, directory publishers, and local research companies, have attempted to collect data on specific territories and to develop software to analyze the information they have independently gathered. This fragmented approach resulted in duplication of effort in the collection and analysis of information, excessive internal cost, non-standardized data with varying degrees of accuracy and comprehensiveness, and a large information gap.

The creation of an efficient digital marketplace for commercial real estate requires a unified data model—an infrastructure of a national, standardized database, accurate and comprehensive research capabilities, and intensive, real-time participant interaction. The global information network or Internet can help maximize interaction among participants in a marketplace. The Internet has emerged as a mass communications and commerce medium enabling millions of people worldwide to share information, create communities among individuals with similar interests, and conduct business electronically. International Data Corporation projects that the number of Internet users will grow from 100 million in 1998 to 320 million in 2002. In addition to its emergence as a mass communications medium, the Internet has features and functions that are unavailable in traditional media, which enable users to: communicate or access enormous amounts of information at low cost and without geographic limitation; access dynamic and interactive content on a real-time basis; and communicate and interact instantaneously with a single individual or with entire groups of individuals.

Along with the impressive overall growth of the Internet, business-to-business usage is also growing rapidly, as businesses are increasingly leveraging the Internet's ability to reach clients globally, deliver personalized content, and open new distribution channels. Forrester Research projects business-to-business electronic commerce to grow from $17 billion in 1998 to $327 billion in 2002.

It is in this context that there remains a need for a system and method for creating a unified commercial real estate data model through collection, distribution and use of information in connection with commercial real estate and web-based information systems that facilitate the buying and selling of commercial real estate.

The present invention also relates to a method and system for listing and brokering a commercial real estate and its financial derivatives. An underlying principle of commodities, equities, or bond trading is that the asset sought to be traded have an intrinsic value which can be determined, usually by a market exchange, and that that value will shift based upon the vagaries of the market. The determination of market value can be aided by systems such as that described in U.S. Pat. No. 4,713,761, System for Centralized Processing of Accounting and Payment Functions, issued Dec. 15, 1987 to Sharpe et al., and in U.S. Pat. No. 5,222,018, also for a System for Centralized Processing of Accounting and Payment Functions, and issued Jun. 22, 1993 to Sharpe et al. These systems merely provide a revenue or cost value which can then be used by analysts in determining a market value for the listed commodity. The ability to extract historical financial and market information, and to evaluate shifts due to events that pressure those markets, has been addressed by such art as U.S. Pat. No. 5,414,838 for A System for Extracting Historical Market Information with Condition and Attributed Windows, issued May 9, 1995 to Kolton et al. Again, the element of speed in reacting to the vagaries of the market provides the asset trading markets with winners and losers on a day to day basis. Transaction time for financial markets has been addressed by such art as U.S. Pat. No. 5,420,405 for a Secure, Automated Transaction System that Supports an Electronic Currency Operating in Mixed Debit and Credit Modes, issued to Norman E. Chasek on May 30, 1995.

U.S. Pat. No. 5,724,524 to Hunt, et al. describes a Method and System for Listing, Brokering, and Exchanging Carrier Capacity in which listing, brokering, and exchanging a commodity requires identifying a plurality of characteristics of the particular commodity, and then entering those characteristics into the database of a data processing system utilizing a real-time clock. An exchange market for the commodity is established based upon a pre-selected set of its characteristics. After a market price for the commodity has been set, a class (or classes) of financial derivatives is established together with a financial exchange market for those derivatives. The characteristics of the derivatives comprise: a common descriptive link between varied commodity types; a contract length that runs from the purchase date of the contract to the performance date for the commodity; and, a contract price.

In the context of commercial real estate, there has heretofore been insufficient reliable information to create derivatives based on the commercial real estate market. It is an object of the present invention to provide a system and method that support the creation of financial derivatives for commercial real estate. More specifically, it is an object of the present invention to shift the financial burden of long-term leases through the financial markets by providing an opportunity to hedge against the future. While the landlords would have to guarantee that capacity will be available at a time when it is required, the financial burden of the landlords will be minimized by making capital available up front in exchange for capacity later. A further object of the present invention is to provide the financial markets with an ability to trade commercial real estate space as a tangible commodity by providing the method and means for doing so.

As used herein, "Commercial Real Estate" means any real property, including, without limitation, office, retail and industrial rental space, a building, and multiple buildings for use by a business entity, or one or more facilities or buildings that a business entity occupies for the purpose of conducting its operations on a routine and ongoing basis.

"Market" means a geographic region, e.g., the Washington, D.C. metropolitan area, that includes all buildings or potential buildings available for business occupancy, with boundaries that are consistent with U.S. Census standards and that are generally accepted definitions of metropolitan areas.

"Submarket" means a geographic area as a subset of a Market and that includes buildings or potential buildings available for business occupancy, with boundaries generally accepted by local real estate professionals.

"Grade" means the designated quality of real estate on a relative scale of quality, based primarily upon a generally accepted classification structure, such as Class A, B or C properties. Real estate experts familiar with the classification systems and with generally accepted standards can provide this "grade" designation.

"Rent" means the annual amount paid by a business entity for rights to occupy real estate.

"Vacancy Rate" means the percentage of square feet that is offered for lease in a market, submarket or building.

"Absorption" means the net reduction in vacant square feet over a defined period (typically, twelve-months) resulting from new tenants, new construction, and lease terminations.

"Comparable Real Estate" means real estate that is approximately equivalent in Rent, Grade, Use and/or location to the business entity's Real Estate.

"Area" means an indicator of economic attractiveness of the submarket where the real estate is located; and it is based, for example, upon rents, vacancy, absorption rate and/or other measures of economic attractiveness of a submarket.

"Risk" means an indicator of the financial, market and environmental exposure of real estate and of the financial, market and environmental risks associated with the employees and the business entity's occupancy in the real estate.

"Owner" or "Owner's representative" means anyone acting on behalf of an owner, including for example the owner's broker, the owner's property manager, and the owner herself.

"Seller" or "Seller's representative" means anyone acting on behalf of a seller or potential seller, including for example the seller's broker, the seller's property manager, and the seller herself. The seller represented by the seller or seller's representative includes potential sellers and those actually selling.

"Buyer" or "Buyer's representative" means anyone acting on behalf of a buyer or potential buyer, including for example the buyer's broker and the buyer himself. The buyer represented by the buyer or buyer's representative includes potential buyers and those actually buying.

"Confidentiality agreement" means a legal, binding contract requiring parties to the agreement to treat certain information as private and not for publication. For example, in the context of real estate, a confidential agreement requires that a buyer keep a property listing confidential in return for viewing the property listing. As used herein, "non-disclosure agreement" is synonymous with "confidentiality agreement." Executing and submitting confidentiality and non-disclosure agreements can occur, for example, by clicking-through an "accept" button for an agreement posted online or by exchanging electronic documents having electronic signatures.

SUMMARY OF THE INVENTION

An object of the present invention is to provide a system and method for creating a unified commercial real estate data model through collection, distribution and use of information in connection with commercial real estate and a web-based marketplace that facilitates the buying and selling of commercial properties.

Another object of the present invention is to provide a web-based information distribution system that supports the efficient and secure buying and selling of commercial properties.

The present invention provides a unified, robust, and unbiased Internet marketplace for commercial real estate. The system has access to databases containing independent and comparable data on commercial real estate, which are continuously assembled and updated by professional researchers. The system includes a database detailing office and industrial space in the subject market that is comprehensive, accurate and up-to-date. The system also includes a tenant information database of information about tenants that allows users to identify and target the most likely tenants to lease space and determine the underlying demand for commercial real estate in their market.

This broker-centric model of the present invention enables sellers to reach a larger and more qualified universe of buyers, and enables buyers to more quickly and effectively find and evaluate commercial properties for sale by instantly referencing correlating web-based information. The present invention features properties for sale, including correlating content on comparable sales, for-lease space availability, commercial real estate inventory and market statistics, tenant information, and an image library of building photographs, floor plans, aerials, and maps. It also includes background information on buyers, sellers, lenders, owners, principals, and service providers.

The system of the present invention allows real estate buyers to review potential deals through a search engine that matches properties for sale with buyers' investment criteria. The system speeds up the commercial buying process and does what electronic trading of securities through NASDAQ did for the over-the-counter market by creating an open, efficient market for commercial real estate.

Currently, sellers of a property hire a broker to market the building. Usually that broker shows the building to a limited number of prospective buyers, institutions or private buyers with whom the broker has some personal connection. The system of the present invention site allows sellers and their brokers to advertise a building for sale to a much broader audience, but in a controlled manner: buyers have to prove they are serious and have the resources to buy the property before they can see any in-depth details.

At the same time, buyers can input various criteria such as price, size, location, and desired vacancy rates and receive a list of available properties. When a seller shows a prospective buyer a package of information about the property, the buyer can independently verify statistics about the building like rent rolls, tenant base, and comparable sales prices for similar buildings in the market by trawling through the system's databases, which are compiled by researchers.

By acting as an independent collecting information through independent researchers, the system short-circuits the buyer's analysis process on any given property. In this way, the system eliminates the need to expend time, money, and effort only to find out that data provided by the seller was misleading.

In the currently preferred embodiment, the service is free for sellers and their brokers, while buyers and their brokers pays a subscription on a sliding scale from $250 a month up to $20,000 a month, depending on the size of the buying entities.

The system provides an interactive marketplace that enables brokers to reach a larger and more qualified universe of buyers and sellers faster, thus helping them complete transactions more rapidly, efficiently and cost effectively-through the Internet. The system is capable of providing information on thousands of properties for sale, including correlating content on comparable sales, for-lease space availability, commercial real estate inventory and market statistics, tenant information, and an image library of building photographs, floor plans, aerials, and maps. The system can also provide background information on buyers, sellers, lenders, owners, principals, and service providers.

The present invention provides a digital marketplace in which the members of the commercial real estate and related business community can continuously interact and facilitate transactions by efficiently exchanging accurate and standardized information.

The system of the present invention also facilitates mortgage lending. In particular, since reliable information concerning all factors needed to evaluate a commercial loan application, e.g., the building characteristics and the information concerning prospective borrowers, are accessible to the system or maintained within the system, the system facilitates matching borrowers with lenders. Alternatively, the system lists all available lenders, either generally or only those lenders that are willing to lend money for a particular property. The borrower can click on a particular lender and obtain information or submit information for loan pre-approval.

The system of the present invention provides enough information to allow lenders to actually underwrite a property. Based on the property information, the lender is able to commit to a particular loan regardless of who is buying the property, subject only to verification of credit information. The system allows a lender to offer better terms to a strong borrower. Lenders recognize the value of such a system, but, as yet, have been unable to create suitable automated underwriter systems that pull in discrete, disparate data fields and create massive automated valuation underwriting. Lacking the unified data model, lenders heretofore have had to pull data from various systems making it extremely expensive to underwrite a property. As such, lenders, to reduce costs, have had to be very selective in choosing systems from which to pull data.

There are three levels associated with underwriting properties and with establishing an underwriting marketplace. The first level involves simply providing quotes and information on loan programs and then matching that to people's requests. The second level involves 'soft quotes'—in which the system provides enough property information for lenders to provide a commitment of loan quotes on a non-request basis. This second level allows lenders to proactively market loans instead of responding back to requests for information.

The third level is refinancing. The system and method of the present invention make it possible for lenders to send pre-approved loans to the owner of any building, whether or not the owner is seeking to sell or refinance. Most owners are not currently marketing their property for sale or refinancing. However, owners may still be receptive to profitable offers. The unified data model of the system of the present invention allows lenders to go into the broad universe of all the properties stored on the database of the present invention and create a pre-approved credit line or a pre-approved loan for these different properties. Moreover, for certain properties, the unified data model of the system of the present invention has enough information to underwrite the loan. The system of the present invention has enough information to actually submit pre-approved offers and provide soft quotes. In contrast, without the unified data model and system of the present invention, the expense of underwriting loans is so large that lenders cannot process loans for under a certain amount. The invention therefore allows lenders to considerably increase their loan volume and brings much liquidity to the marketplace. Everyone is able to find out the best possible loan that one could obtain on his property.

As a further aspect of the present invention, a lending product is provided on the system that lists every lender that the system tracks. The present invention enables customers to click on a lender's name in the list to request a free package of materials from that lender. The system facilitates this communication between the customer and a prospective lender.

The system uses linked databases and computers to provide a wide array of digital service offerings including a leasing marketplace, a selling marketplace, decision support, tenant information, comparable sales information, property marketing, and industry news. All of these services are preferably digitally delivered and most clients receive daily service updates over the Internet.

The system includes a comprehensive database of information that is relevant to commercial real estate transactions, a research department for updating the information, and links, through the Internet, for example, to participating organizations and other users. The database of the preferred embodiment has been constructed over more than a decade by a research department that now makes over 1.8 million updates each year to the database. The system has obtained and assimilated over 50 proprietary databases. The database now covers 54 commercial real estate markets in the United States. It tracks over 15 billion square feet in over 350,000 properties, including more than $40 billion in properties for sale, and over 900,000 tenants. It is estimated that 36,000 participating companies use the marketplace of the present invention to distribute information on their properties. Of these participating companies, approximately 3,600 are clients, representing 25,000 end-users, who subscribe to the services to facilitate transactions, market services and properties, and conduct market research.

The system of the present invention provides a digital commercial real estate marketplace that takes advantage of network effects. The digital marketplace can be used by and deliver value to several distinct categories of users. To begin with, a large percentage of the commercial real estate industry participating companies use the marketplace to distribute information on their properties. Some portion of these participating companies, are subscribers that pay for enhanced access or additional information or related services to facilitate transactions, market services and properties, and conduct market research. A significant aspect of the present invention is that the users, including clients and other members of the commercial real estate and related business community, assist the system operator by continuously updating the marketplace data. Each day thousands of updates to the marketplace database are made. The resulting information is distributed via the Internet, creating a more dynamic and efficient market for transactions involving the commercial real estate and related business community.

The system of the present invention capitalizes on the information accumulated in the digital marketplace to create a high value-added, full-service solution for users. The system of the present invention provides the following services:

Digital leasing marketplace—provides the information required to efficiently conduct commercial real estate leasing transactions, both between brokers and between owners and brokers. This service provides a more comprehensive solution with much higher data quality, at substantially less time and cost.

Digital selling marketplace—provides the information required to efficiently and securely conduct commercial real estate buy and sell transactions. This service benefits users by allowing purchasers to make more-informed investments and sellers to maximize realized property values.

On-line decision support services—allow members of the community to perform an analysis of underlying market conditions and trends when making investment, leasing, purchase, sale, build, and marketing decisions involving commercial real estate. These services benefit users by providing more powerful, flexible, time-efficient, and accurate analytic capabilities.

Comparable Sales Information—enables members of the real estate community to evaluate property value by analyzing comparable sales information including information on sale prices, income and expenses, capitalization rates, loan data, and other key details. This service provides a database searchable by such parameters as location, property type, square footage, price range, and number of units.

Tenant information services—enable members of the commercial real estate and related business community to identify and market to the tenants who are the most likely prospects for their goods and services. These services benefit users by more precisely identifying and capturing viable prospects at a lower cost.

On-line property marketing—provides a unique on-line means for the commercial real estate and related business community to direct advertising to the appropriate decision-makers. This service benefits users by providing them increased distribution, higher visibility, and a more cost-effective way to reach their targeted audience.

On-line industry news—allows members of the commercial real estate and related business community to remain current with developments in the industry. These services benefit users by providing more timely and in-depth news.

All of the foregoing services can be digitally delivered via the Internet or through other forms of downloads. The increased availability of services from a web-based platform will allow the commercial real estate and related business community real-time access to the digital marketplace data and provide the opportunity for increased interaction among community members. The practical result of this increased interaction is the development of a more efficient commercial real estate marketplace.

The system of the present invention uses the latest technology to continuously improve data collection, enhance sales efforts and service capabilities, and control costs as the marketplace framework and unified data model is built. The system preferably uses a mobile information-collecting device that is equipped with a GPS system and a link to the databases of the system of the present invention. The device further includes a display screen and input device, and can also include a web camera. As detailed below, the system is able to provide location-sensitive real estate information automatically, and to perform other useful tasks by correlating a vehicle's instantaneous position to data stored in a remote database to identify geographically pertinent information and transmitting the geographically pertinent information to the truck for display on the display panel within the truck. Optionally, the mobile information-collecting device also includes audio capabilities and the geographically pertinent information includes audio data, such that the device, for example, plays a voice describing the geographically pertinent information to the occupant of the mobile information-collecting device.

In addition, the system uses global satellite positioning and the Internet to coordinate remote field research vehicles equipped with GPS transponders, laptop computers, cellular communications, and laser measurement devices, to provide the most precise and timely inventory of available buildings.

The system also integrates a wide client and property information management system with a telecommunications system and database to allow the sales force, research staff, client-service staff, and accounting department to develop a coordinated sales, research, and account management effort. This enterprise-wide system also assists management in improving quality control and training.

The system also includes equipment to collect architectural photographs digitally so that the system can move the images into a database substantially faster and at lower cost.

Thus, the present invention provides the first national and standardized source for commercial real estate metrics that is comparable between geographic territories. For example, the definitions of vacancy rates and building classifications have varied among the different providers of real estate information. Through national presence and uniformity of services and data across all markets, the system provides a foundation for members of the commercial real estate and related business community to do business on a national basis. Leading firms within the community conduct business efficiently in multiple local markets by standardizing their internal systems on the proprietary database of the present invention. The system of the present invention provides a unified data model that allows insight into relationships that were only inferred in the past.

The system of the present invention includes a variety of features that are useful for those within the commercial real estate field and elsewhere.

For example, the system provides fraud detection—by alerting brokers/owners that their property is being marketed—any person (subscriber or not) can see "my listings," which includes identification of properties that they own/represent that are shown as being on the market.

The system of the present invention also provides intelligent searching the query system allows the user to add/remove terms from the search without rerunning the entire search. This allows users to refine searches. The ADD/DELETE feature lets the user narrow the user's existing search results by adding search terms to the user's original search request. The search software retains the user's original search request and corresponding search results.

To perform an ADD/DELETE Request, the user follows the following steps:
1. Once the user has completed a search request that returns search results, the user selects ADD/DELETE from the Search menu or clicks the ADD/DELETE button in the software's toolbar.
2. The user then enters a complete ADD/DELETE request. If the user is using the Graphical Interface, the user enters the ADD/DELETE request in the ADD/DELETE Search Request field.

The software returns focused search results through which the user can browse as the user normally would.

The user may want to narrow the scope of the user's search if the search results contain too many documents. Or, after reviewing the user's search results, the user may want expand the scope of the user's search. The user can make these adjustments by modifying the user's original search request to include additional connectors and/or search terms—all without losing the user's original search results. Narrowing the scope of search results is described herein as running a query on a query or running a negative search query.

The system of the present invention also provides a unique method for searching for property within a geographical area using a map linked to a database that stores geographically pertinent information. As an example, the map includes icons showing the locations of properties for which the database has information. As a user drags a mouse pointer over an icon, a window pops-up displaying the geographically pertinent information from the database. For example, the information in the window could include a photograph of the property along with its sales price.

The system of the present invention also provides confidentiality assurance through a system for controlled dissemination of information.

The system of the present invention provides and facilitates "soft quotes," pursuant to which lenders offer loans on specific buildings subject only to qualification of buyer and possible discount for premium buyers.

The system of the present invention also provides and facilitates unsolicited refinancing offers for owners of buildings. In this way, the system allows building owners to take advantage of opportunities created by changes in rates and increased information available.

The system of the present invention also provides and facilitates creation of a derivatives market/futures market for commercial real estate.

The system of the present invention also provides a mobile data gathering and dissemination vehicle as well as a system tracking and dispatch of mobile vehicles. The system of the present invention further provides correlation of data stored in a remote location to vehicle position in real time. This feature is useful in the context of commercial real estate, residential real estate and as part of a merchant directory.

The system of the present invention also provides a least cost routing for data transfer system for transmitting data from the mobile vehicle.

The system of the present invention also synchronizes data stored in data sources by cross-checking data sources and prompting the input agent to make necessary changes in affected databases.

The system of the present invention also provides an investment advisor feature that provides relevant information such as: what is the leasing history of specific building? what is the history of market in that area? what is the history of the building relative to market (is the building generally one of the first to fill up)?

The system of the present invention also provides an intelligent assistant for assisting in setting prices based on the saved searches of users, i.e., knowing what other users (buyers) are looking (searching) for. The system could, for example, advise the user that "if you set the price at X level you will hit Y pending searches, but if you set the price at X' level you will only hit (Y-n) pending searches." The system thus allows queries against pending searches so that the user knows what people are looking for.

The system of the present invention also provides quick alerts when saved searches are satisfied to support user investment strategies. In particular, the system notifies the user by wireless messaging and/or e-mail as soon as a property matches existing search criteria. In accordance with a particularly important aspect of the present invention, this feature applies to searches that are satisfied as a result of changes in market conditions that bring a previously listed property within the investment criteria.

The system of the present invention in general employs the unified data model to enhance knowledge of the overall context of business decisions, for example, buying versus leasing.

The system of the present invention makes it possible for a user to extract data relating to virtually every aspect of a commercial real estate transaction. Although the data is described as being contained within a "database," data can be stored in a plurality of linked physical locations or data sources. The significant aspect is that the database contains information relating to areas that have previously been only accessible in isolation from one another. By providing a unified data model and a system for forming a variety of queries against the unified database, it is possible to understand with precision the relationship between market factors that have heretofore only been understood in an anecdotal way.

For example, prior to the present invention, a commercial real estate investor might have recognized the value of investing in a particular building that had low vacancy but was located in an area of extremely high vacancy. If so, this investor might also be interested in knowing that a building that is on the market has lost a big tenant.

Prior to the system of the present invention, however, there has been no unified way of storing an investor's investment criteria and continually monitoring the market so as to have the ability to provide a real-time alert when a property matching the investor's investment criteria has become available. This advantage is achieved because databases containing leasing information are linked with databases concerning buildings for sale, which are linked to databases that store a particular investor's investment criteria, which are linked to databases that store the data necessary to determine market conditions, and so on. It is through the connections of previously discrete databases that the synergies and advantages of the present invention arise.

In this sense, the present invention resides in the interconnection of related pieces of information that allows a true understanding and deep appreciation of a commercial real estate market. The user of the system of the present invention has the ability to understand data in context, because the data in one data source is influenced by other data sources that have heretofore not been connected.

The data stored in the databases of the present invention is from various sources. For example, property information can be obtained by researching information sold and information available. Tenant information can be obtained through personal inspection of properties and from brokers. Market analytics are obtained through an historical analysis. In addition, tax assessment information provides yet another source of information.

Another way of gathering information is through mobile information-collecting device, according to another aspect of the present invention. The mobile information-collecting device is a truck or other vehicle that is equipped with a GPS system and a link to the databases of the system of the present invention. The device further includes a display screen and input device, and can also include a web camera. The system is designed such that the location of the truck or other mobile information gathering device at any particular instance is correlated to the database so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important feature is that the system automatically retrieves and displays the entirety of the currently available information so that the operator can determine if pieces of information are missing or need to be updated.

The mobile information gathering system of the present invention has other applications as well. For example, a similar device can be used in connection with residential real estate listings to display pertinent information and directions to the nearest available home for sale. The pertinent information could include, for example, photographs that pop-up on the display as the mobile information-collecting device travels. Likewise, the system could be used to display information concerning merchants, service providers, or tourist attractions within a particular area in a non-commercial setting. For example, the GPS in a passenger car could be linked to a database that contains information about local merchants, such as restaurants. As the driver approaches these restaurants, the system could display advertisements or other information pertaining to the restaurants.

Thus, in accordance with the present invention, the system provides location-sensitive real estate information automatically and performs other useful tasks by correlating a vehicle's instantaneous position to data stored in a remote database to identify geographically pertinent information and by transmitting the geographically pertinent information to the vehicle's occupant, by for example displaying the information on the display panel within the truck or producing an audio message of the information for the occupant to hear.

The invention also provides a method and system for listing and brokering a commercial real estate and its financial derivatives. In particular, the system of the present invention can be used in connection with the creation of financial derivatives for commercial real estate. To create these derivatives, one must have a source of comprehensive information. The system of the present invention supports derivatives for commercial real estate by providing sufficiently accurate market information that supports the creation of indexes and derivatives such as futures or hedge rental rates and occupancy rates. The system can also be used for underwriting and rating commercial mortgage banking securities.

For example, a big office tenant that must find 60,000 square feet faces entering a 5-year or 7-year deal or longer-term deal without knowing where the market will be in 7 years. If the tenant is $10 per square foot above market rate on 60,000 square feet—that is a great deal of money. Because the system of the present invention contains vast information concerning historical and current vacancy, projected absorption and demand, projected rental rates, and supply and demand figures, the system of the present invention can be used to create indexes with which commercial office tenants can hedge their occupancy costs. The tenants can basically buy futures, for example, "class A, Washington, suburban, close in office futures." This aspect enables Wall Street and the financial community to manage the building space by watching supply and demand. By watching these futures, investors can monitor and adjust building construction, making the market much more perfectly balanced. Thus, the system of the present invention cultivates the massive liquidity inherent in these markets.

Since the system includes data concerning a plurality of characteristics of the subject commodity, i.e., commercial real estate, in the database of a data processing system utilizing a real-time clock, an exchange market for the commodity, e.g., a particular type of commercial real estate "Class A space in downtown Bethesda, Md.", is established based upon a pre-selected set of the commodity's characteristics; and, after a market price for the commodity has been set, a class (or classes) of financial derivatives is established together with a financial exchange market for those derivatives. The characteristics of the derivatives comprise: a common descriptive link between varied commodity types; a contract length that runs from the purchase date of the contract to the performance date for the commodity; and, a contract price.

The system of the subject invention comprises a number of elements that include: data processing means; means for determining whether a match exists based upon a comparison of the commodity offered for sale and that requested for purchase or exchange; display means; means for selecting the matched entry for purchase and/or exchange; and, means for determining and selecting a class of financial derivatives. The data processing means of the system, in turn, further comprises a system controller which is further comprised of: a data processing system; data entry means; memory means; and, communication means for communicating data between the system controller and a plurality of input and output points.

To achieve the advantages described herein as well as other advantages, and in accordance with the purpose of the present invention, as embodied and broadly described, a preferred embodiment of the present invention is a method for allowing information providers to both distribute specified information through the Internet and control dissemination of information. This method operates within a system that includes a system operator, a plurality of information providers and a plurality of information customers. This method includes the following steps: 1) making the information provider's specified information available through a secured website on the Internet; 2) obtaining from the information provider a designation of a first subset of the information customers that are authorized to receive access to the specified information on the website; and 3) distributing to each one of the first subset of the information customers that are authorized to receive access to the specified information an ID that can be used to access the specified information.

In an aspect of this method, the system within which the method operates is used to facilitate exchange of information pertaining to commercial real estate available for sale. In addition, the information providers are owners or owner representatives that provide information concerning the availability of their respective properties for sale. Finally, the information customers are potential buyers or representatives of potential buyers.

In another aspect of this method for allowing the information providers to both distribute specified information through the Internet and control dissemination of information, the method further comprises requiring the execution of a non-disclosure agreement by each one of the first subset of the information customers that are authorized, before each one of the first subset of the information customers that are authorized can access the specified information. The execution of the non-disclosure agreement can be accomplished by clicking through an agreement posted on the Internet.

Another preferred embodiment of the present invention is a method for allowing information providers to both distribute specified information through the Internet and control dissemination of information. According to this embodiment, the method includes the following steps: 1) making the information provider's specified information available through a secured website on the Internet; 2) obtaining from the information provider a designation of a first subset of the information customers that are authorized to receive access to the specified information on the website; 3) distributing to each one of the first subset of the information customers that are authorized to receive access to the specified information an ID that can be used to access the specified information; 4) allowing a second subset of potential customers to query a searchable database containing a plurality of descriptions of information; 5) indicating to the second subset of potential customers that the specified information exists without revealing the specified information; 6) if one or more of the second subset of potential customers are interested in obtaining access to the specified information, allowing an interested potential customer to communicate a request for access directed to the system operator; 7) the system operator forwarding the request for access and information concerning the interested potential customer requesting access to the information provider in response to a request for access; and 8) allowing the information provider to make a decision to grant or deny the request for access and to communicate the decision to the system operator. In response to a deny access decision, the interested potential customer is notified of the deny decision without learning the specified information. In response to a grant access decision, the system operator grants the interested potential customer access to the specified information.

In an aspect of this embodiment of the present invention, the method further includes requiring the interested potential customer to execute a non-disclosure agreement prior to allowing the interested potential customer access to the specified information. For example, the interested potential customer executes the non-disclosure agreement by clicking through an agreement posted on the Internet.

In another aspect of this embodiment of the present invention, a profile of a member of the second subset of potential customers is obtained by the system operator and transmitted to the information provider in response to a request for access. As an additional aspect, before a profile of a member of the second subset of potential customers is transmitted to the information provider in response to a request for access, the system operator can authenticate the profile.

In another aspect of this embodiment of the present invention, the system operator, in response to a request for access, obtains a profile of the interested potential customer, authenticates the profile, and transmits the profile to the information provider in conjunction with the request for access.

In another aspect of this method, the system operator forwards the request for access to the information provider in response to a request for access, and requests a response from the information provider in real time through the Internet or through wireless data transmission. Optionally, with the request for access, the system operator can also forward a profile of the interested potential customer.

In another aspect of this embodiment of the present invention, the system is used to facilitate exchange of information pertaining to commercial real estate available for sale. The information providers are owners or owner representatives that provide information concerning the availability of their respective properties for sale. Finally, the information customers are potential buyers or representatives of potential buyers.

Another preferred embodiment of the present invention is a method for allowing information providers to both distribute specified information through the Internet and control dissemination of information. This method operates within a system that includes a system operator, a plurality of information providers, and a plurality of information customers. The method begins by making the information provider's specified information available through a secured website on the Internet and allowing potential customers to query a searchable database containing a plurality of descriptions of information. The method continues by indicating to the potential customers that the specified information exists without revealing the specified information. Then, if one or more of the potential customers are interested in obtaining access to the specified information, the method proceeds by allowing an interested potential customer to communicate a request for access directed to the system operator. The method continues by having the system operator forward the request for access and information concerning the interested potential customer requesting access to the information provider in response to a request for access. The method continues by allowing the information provider to make a decision to grant or deny the request for access and to communicate the decision to the system operator. In response to a deny access decision, the interested potential customer is notified of the deny decision without learning the specified information. In response to a grant access decision, the system operator grants the interested potential customer access to the specified information.

In an aspect of this embodiment of the present invention, the information concerning the interested potential customer requesting access is a profile of the interested potential customer. Optionally, the system operator can authenticate the profile of the interested potential customer before forwarding the profile to the information provider.

In another aspect of this embodiment of the present invention, the system operator forwards the request for access to the information provider in response to a request for access, and requests a response from the information provider in real time through the Internet or through wireless data transmission.

In another aspect of this embodiment of the present invention, if the request for access is granted, the method involves the additional step of requiring execution of a non-disclosure agreement by the interested potential customer before the system operator grants the interested potential customer access to the specified information. The execution of this non-disclosure agreement can be accomplished by clicking through an agreement posted on the Internet.

In another aspect of this embodiment of the present invention, the system within which the method operates is used to facilitate exchange of information pertaining to commercial real estate available for sale. In addition, the information providers are owners or owner representatives that provide information concerning the availability of their respective properties for sale, and the information customers are potential buyers or representatives of potential buyers.

In another aspect of this embodiment of the present invention, the system within which the method operates is used to facilitate exchange of information pertaining to residential real estate available for sale. In addition, the information providers are owners or owner representatives that provide information concerning the availability of their respective properties for sale, and the information customers are potential buyers or representatives of potential buyers.

Another preferred embodiment of the present invention is a system for correlating information stored in a remote database with a user's location, retrieving pertinent data files from the database based upon the user's location, and automatically transmitting the selected data files to the user. The system includes user equipment sets, a computer, and a database in communication with the computer. Each user equipment set includes a display and a location determining device for generating data pertaining to the user's location and for transmitting the data pertaining to the user's location to a remote computer automatically. The computer is equipped for wireless communication with geographically remote users that are equipped with the equipment sets so as to send data to the equipment sets and receive data from the equipment sets including the data pertaining to the user's location. The database stores information that includes information identifying a location of a property. Within this system, in response to receipt of the data pertaining to a user's location, the computer automatically retrieves information pertaining to the user's location and transmits the same to the user's equipment set for display on the display.

In an aspect of this embodiment of the present invention, each user equipment set further comprises a data input device for allowing the user to input data. The information is displayed on the display in a way that prompts the user to input missing information using the data input device.

In another aspect of this embodiment of the present invention, the display is a color display adapted for displaying photographic images.

In another aspect of this embodiment of the present invention, in response to receipt of the data pertaining to the user's location, the computer automatically retrieves information describing commercial or residential real estate near the user's location and transmits the same to the user's equipment set for display on the display.

In another aspect of this embodiment of the present invention, in response to receipt of data pertaining to a user's location, the computer automatically retrieves information regarding at least one of commercial enterprises and landmarks near the user's location and transmits the same to the user's equipment.

In another aspect of this embodiment of the present invention, the user's equipment set includes audio capabilities, and the information pertaining to the user's location includes audio data.

In another aspect of this embodiment of the present invention, the computer transmits the information pertaining to the user's location to the user's equipment set for color display on the display.

In another aspect of this embodiment of the present invention, the information pertaining to the user's location includes information on commercial enterprises located near the user's location. The information on commercial enterprises includes information on at least one of the products, goods, and services provided by the commercial enterprises. In addition, in response to receipt of the data pertaining to a user's location, the computer automatically retrieves the information on at least one of products, goods, and services provided by commercial enterprises near the user's location and transmits the same to the user's equipment set.

In another aspect of this embodiment of the present invention, the computer automatically retrieves information describing real estate near the user's location and the display shows a pop-up window including the information describing the real estate.

In another aspect of this embodiment of the present invention, the information stored in the database includes at least one of the following: square footage available for lease; whether a property is available for sale; property address; contact information; and price. With this information in the database, in response to receipt of the data pertaining to the user's location, the computer automatically retrieves information describing the commercial or residential real estate near the user's location and transmits the same to the user's equipment set for display on the display.

Optionally, the information stored in the database also includes at least one of the following: a digital image of the commercial real estate; square footage data representing a square footage of the commercial real estate; data characterizing the selected use of the commercial real estate; rental price of the commercial real estate; sale price of the commercial real estate; data about the tenant in the commercial real estate; a real estate submarket identification; sales comparable information; lender information; a grade indicator of the commercial real estate, the grade indicator having an alpha numerical representation and being a function of a classification system of the commercial real estate that is consistent with accepted standards and providing a representation of the quality of the real estate; a classification of the commercial real estate based upon at least one of the following: a building grade, an age of the building, and an extrapolation of comparable buildings; and information pertaining to the submarket including at least one of (i) rents, (ii) vacancy, and (iii) absorption rates for each of the submarket and nearby submarkets, and (iv) other indicators of submarket and location attractiveness.

Another preferred embodiment of the present invention is a commercial real estate information exchange and market. The exchange and market includes a database for storing information about commercial real estate, and computers and communication equipment for allowing a plurality of users to query the database, add data to the database, and retrieve the information from the database. The database contains data records, including information pertaining to lease information, sale information, comparable sales information, and tenant information.

In an aspect of this embodiment of the present invention, the database further includes at least one of: data about a tenant in the commercial real estate; building-specific information including data representing an age of the commercial real estate, and data representing financial obligations and tenancy status of the tenant in the commercial real estate;

square footage data representing a square footage of the commercial real estate; data characterizing a selected use of the commercial real estate; cost data including a rental price of the commercial real estate; a real estate submarket identification; a classification of the commercial real estate based upon at least one of a building grade, an age of the building, and an extrapolation of comparable buildings; and information pertaining to a submarket including rent data, vacancy data, and absorption rate data.

In another aspect of this embodiment of the present invention, the data records include market analytic information.

Another preferred embodiment of the present invention is a method for storing and automatically displaying descriptions and visual images of commercial or residential real estate on a display of a user. The method involves generating a plurality of digitized video images of real estate, storing data records concerning the real estate; determining a location of the user; retrieving data records corresponding to the user's location; and displaying on the display the data records corresponding to the user's location. According to the method, each digitized video image depicts a real estate. In addition, the data records include the digitized video images, textual information concerning the real estate, and information identifying the location of the real estate.

Another preferred embodiment of the present invention is a method for listing and brokering commercial real estate. The method includes the following steps: 1) identifying a characteristics of the commercial real estate and entering the characteristics into a data processing system to establish a first exchange market for the commercial real estate based upon the characteristics; 2) identifying a market value for the commercial real estate and listing the market value on the first exchange market; 3) determining a class of derivatives based upon a pre-selected subset of the characteristics; and 4) establishing a second exchange market in respect of the derivatives.

In an aspect of this embodiment of the present invention, the first exchange market and the second exchange market are co-located within the data processing system.

In another aspect of this embodiment of the present invention, the characteristics include a geographic location, a start date and a finish date, a size, a class of building, and a cost.

Another preferred embodiment of the present invention is a method for establishing a unified group of correlated databases that provides real estate data to facilitate a real estate transaction. According to this method, each database of the unified group is a discrete data module. The method includes the following steps: (a) associating real estate data entries of a first database of the unified group with corresponding real estate data entries of the remaining databases of the unified group; (b) collecting the real estate data from real estate industry data sources; (c) recording the real estate data in the first database of the unified group; (d) determining an effect of the recorded real estate data on the remaining databases of the unified group; (e) reconciling remaining real estate data in the remaining databases based on the effect; and (f) distributing the recorded real estate data and the reconciled real estate data to real estate industry professionals and to real estate industry customers.

In an aspect of this embodiment of the present invention, the real estate data includes property information and tenant information, and the unified group of correlated databases includes a property information database and a tenant information database. Optionally, the real estate data further includes comparable property information, assessment information, and market analytics information, and the unified group of correlated databases further includes a comparable property information database, an assessment information database, and a market analytics information database.

In another aspect of this embodiment of the present invention, the real estate industry data sources include at least one of property managers, proprietary databases, Internet sources, site inspections, building owners, brokerage firms, real estate investment trust filings, tenant canvassing, public records, and comparable property databases. In addition, the step of collecting the real estate data involves the following steps: (i) communicating with at least one of the property managers, the building owners, and the brokerage firms by mail, electronic mail, telephone, or facsimile, if the real estate industry data sources include at least one of the property managers, the building owners, and the brokerage firms; (ii) searching and extracting data from at least one of the proprietary databases, the Internet sources, and the real estate investment trust filings, if the real estate industry data sources include at least one of the proprietary databases, the Internet sources, and the real estate investment trust filings; (iii) recording observed data from at least one of the site inspections and the tenant canvassing, if the real estate industry data sources include at least one of the site inspections and the tenant canvassing; and (iv) extracting data from at least one of the public records and the comparable property databases, if the real estate industry data sources include at least one of the public records and the comparable property databases.

In another aspect of this embodiment of the present invention, collecting real estate data involves receiving web-based input from the real estate industry professionals and the real estate industry customers. Collecting real estate data also involves receiving communications from the real estate industry professionals and the real estate industry customers through mail, electronic mail, telephone, or facsimile. Optionally, collecting the real estate data can further involve gathering information with a mobile data acquisition vehicle.

In another aspect of this embodiment of the present invention, reconciling the remaining real estate data involves confirming that the real estate data entries and the corresponding associated real estate data entries are internally consistent.

In another aspect of this embodiment of the present invention, distributing the real estate data involves providing a web-based interface in communication with the unified group of correlated databases. Optionally, this distributing further involves providing communication between parties to a transaction, and providing transactional services in support of a transaction. Also optionally, the method further involves providing a derivatives marketplace in which to define, value, and exchange real estate commodities. These commodities could be real estate cost futures.

In another aspect of this embodiment of the present invention, distributing real estate data involves accepting a property search query from a user, and running the property search query in the unified group of correlated databases and returning property search results to the user.

Optionally, this distributing could involve adding properties to the property search results as directed by the user without running another search query, removing properties from the property search results as directed by the user without running another search query, and running negative search queries in the property search results as directed by the user to remove properties from the property search results.

Also, optionally, this distributing could involve accepting a second property search query from the user, running the second property search query on the property search results, and returning a second set of property search results to the user.

In a further embodiment of this aspect of the present invention, the property search results provide data from at least one of leasing history of a specific building, history of a market in a particular geographic area, and history of the specific building relative to the market.

In another embodiment of this aspect of the present invention, the method further involves saving the property search query as directed by the user, running the saved property search query at a periodic interval, and notifying the user of new properties that satisfy the property search query. Optionally, the saved property search query has at least one field that relates to market conditions and at least one new property satisfies the property search query because of a change in the market conditions. Also optionally, the saving, running, and notifying repeat for different users, resulting in a plurality of saved searches. With these saved searches the method continues by calculating an amount of saved searches of the plurality of saved searches that will be satisfied by entry of a new property listing, and reporting the amount to an owner or owner representative so that the owner or owner representative can maximize demand for the new property listing. The owner or owner representative can maximize demand for the new property listing by setting, for example, an optimum price. The owner or owner representative can also maximize demand for the new property listing by setting, for example, an optimum building grade.

In another aspect of this embodiment of the present invention, distributing real estate data involves disseminating location-sensitive information to a mobile information receiving device. The mobile information receiving device determines its location and the unified group of correlated databases receives the location of the mobile information receiving device and transmits the location-sensitive information to the mobile information receiving device.

In another aspect of this embodiment of the present invention, distributing real estate data involves displaying a user interface; displaying a display element on the user interface to indicate a property for which information is recorded in the unified group of correlated databases; providing a link to the information on the user interface proximate to the display element; allowing a user to select the display element; and in response to the selection, retrieving and displaying the information. The user selects the display element by dragging a pointer proximate to the display element, in which case the information is automatically displayed. The information can be displayed in, for example, a pop-up window.

Another preferred embodiment of the present invention is a system for collecting, distributing, and using real estate data. The system includes data sources, data mining applications in communication with the data sources, a contact management system in communication with the data sources and the data mining applications, a core data warehouse in communication with the data mining applications, database processes in communication with the core data warehouse, and network integration applications in communication with the database processes. The data sources gather and generate real estate data. The data mining applications receive and organize the real estate data into separate interrelated modules, and evaluate the real estate data and reconcile the real estate data among the interrelated modules. The contact management system directs the data mining applications to conduct continuous pollings of the data sources to update the real estate data. The core data warehouse receives and stores the reconciled and updated real estate data from the data mining applications. The database processes access the reconciled and updated real estate data from the core data warehouse and create database sets. The network integration applications manipulate the database sets in response to commands from a user and present results of the manipulation to the user.

In an aspect of this embodiment of the present invention, the network integration applications comprise at least one of a look up property application, a search database application, and an add listing application. The search database application can accept property search queries from the user, run the property search queries, and return property search results to the user. The search database application can also add properties to the property search results as directed by the user without running another search query, remove properties from the property search results as directed by the user without running another search query, and run negative search queries as directed by the user to remove properties from the property search results.

In another aspect of this embodiment of the present invention, the data sources include at least one of property managers, proprietary databases, Internet sources, site inspections, building owners, brokerage firms, real estate investment trust filings, tenant canvassing, public records, and comparable property databases.

In another aspect of this embodiment of the present invention, data mining applications include at least one of a property information database, a tenant information database, an assessment information database, a comparable property information database, and a market analytics information database.

In another aspect of this embodiment of the present invention, the system further includes a mobile information collection device that provides functions of the data sources and the network integration applications. The mobile information collection device includes a global positioning system, an output device, and an input device. The global positioning system determines a location of the mobile information collection device. The output device is in communication with the database processes and the global positioning system. The output device reads the location provided by the global positioning system and retrieves and displays the database sets corresponding to the location. The data input device receives changes to the database sets corresponding to the location and transmits the changes to the data mining applications.

Another preferred embodiment of the present invention is a method for securely facilitating buying and selling of real estate properties. The method involves the following steps: (a) maintaining a unified group of interrelated databases accessible through a global information network; (b) accepting a property listing from an owner or owner representative and recording the property listing in the unified group; (c) providing confidentiality agreements to preapproved buyers or buyer representatives named by the owner or owner representative; and (d) providing access to the property listing for buyers or buyer representatives that agree to the confidentiality agreement. The confidentiality agreements require that the property listing remain confidential in return for viewing the property listing.

In an aspect of this embodiment of the present invention, the buyer or buyer representative is provided with an electronic identification key to access the property listing. The key generates a variable password at a predetermined frequency.

In another aspect of this embodiment of the present invention, the accepting and recording of the property listing involves determining if the owner or owner representative is fraudulent by posting the property listing for viewing by a true owner representative.

In another aspect of this embodiment of the present invention, the method includes the following additional steps: (e) indicating to an unapproved buyer or buyer representative that the property listing exists; (f) accepting from the unapproved buyer or buyer representative a request to view the property listing; (g) forwarding the request to the owner or owner representative for approval; (h) if the owner or owner representative approves the request, requiring the unapproved buyer or buyer representative to agree to a confidentiality agreement requiring that the property listing remain confidential in return for viewing the property listing; and (i) if the unapproved buyer or buyer representative agrees to the confidentiality agreement, providing access to the property listing for the unapproved buyer or buyer representative.

According to this aspect, optionally, the unapproved buyer or buyer representative subscribes to an access service that indicates the existence of property listings in the unified group of interrelated databases.

Also according to this aspect, optionally, the buyer or buyer representative agrees to the confidentiality agreement by clicking through an agreement posted on the Internet.

Also according to this aspect, optionally, forwarding the request further involves forwarding a profile of the buyer or buyer representative to the owner or owner representative. The forwarding of the request could also involve authenticating the profile of the buyer or buyer representative.

Also according to this aspect, optionally, accepting a request to view the property listing further involves obtaining a profile of the buyer or buyer representative, authenticating the profile, and transmitting the profile to the owner or owner representative.

Also according to this aspect, optionally, forwarding the request to the owner or owner representative involves requesting a response from the information provider in real time through the Internet or through wireless data transmission.

Another preferred embodiment of the present invention is a method for securely facilitating buying and selling of real estate properties. The method includes the following steps: (a) maintaining a unified group of interrelated databases accessible through a global information network; (b) accepting a property listing from an owner or owner representative and recording the property listing in the unified group; (c) indicating to an unapproved buyer or buyer representative that the property listing exists; (d) accepting from the unapproved buyer or buyer representative a request to view the property listing; (e) forwarding the request to the owner or owner representative for approval; (f) if the owner or owner representative approves the request, requiring the unapproved buyer or buyer representative to agree to a confidentiality agreement requiring that the property listing remain confidential in return for viewing the property listing; and (g) if the unapproved buyer or buyer representative agrees to the confidentiality agreement, providing access to the property listing for the unapproved buyer or buyer representative.

In an aspect of this embodiment of the present invention, the unapproved buyer or buyer representative is provided with an electronic identification key to access the property listing. The key generates a variable password at a predetermined frequency.

In another aspect of this embodiment of the present invention, the accepting and recording the property listing include determining if the owner or owner representative is fraudulent by posting the property listing for viewing by a true owner representative.

In another aspect of this embodiment of the present invention, the unapproved buyer or buyer representative subscribe to an access service that indicates the existence of property listings in the unified group of interrelated databases.

In another aspect of this embodiment of the present invention, the unapproved buyer or buyer representative agrees to the confidentiality agreement by clicking through an agreement posted on the Internet.

In another aspect of this embodiment of the present invention, forwarding the request involves forwarding a profile of the unapproved buyer or buyer representative to the owner or owner representative. Optionally, the profile of the unapproved buyer or buyer representative can be authenticated.

In another aspect of this embodiment of the present invention, forwarding the request to the owner or owner representative involves requesting a response from the information provider in real time through the Internet or through wireless data transmission.

Another preferred embodiment of the present invention is a method for underwriting loans for real estate property. The method begins by establishing a unified group of correlated databases that provides data to facilitate a real estate transaction. Each database is a discrete module of real estate data. The method continues by providing quotes on individual loan programs in response to customer requests. The quotes are based on property data in the unified group. The method continues by providing soft loan quotes based on property data in the unified group. The method ends by providing pre-approved loan quotes to owners of particular properties based on real estate data for the particular properties and market information in the unified group.

In an aspect of this embodiment of the present invention, providing pre-approved loan quotes involves examining a financial profile of an owner, examining a property owned by the owner, evaluating the property to determine value and market analytics, and formulating a pre-approved credit line for the owner based on the property.

Another preferred embodiment of the present invention is a method for listing and brokering real estate commodities and financial derivatives of the real estate commodities. The method involves identifying characteristics of the real estate commodities; entering the characteristics into a data processing system utilizing a real-time clock; establishing an exchange market for the real estate commodities based on a pre-selected set of the characteristics; setting a market price for the real estate commodities; and establishing classes of the financial derivatives.

In an aspect of this embodiment of the present invention, the characteristics can be geographic location, lease term start date range, lease term end date range, building class, volume, or cost.

In another aspect of this embodiment of the present invention, entering the characteristics into a data processing system involves the following steps: (i) determining whether or not a commodity is being identified to the data processing system for a first time; (ii) storing the characteristics in a commodity database if the commodity is being identified to the data processing system for the first time; and (iii) determining a status of the commodity with respect to being a candidate for purchase, sale, or trade, if the commodity is not being identified to the data processing system for the first time.

In another aspect of this embodiment of the present invention, the classes of financial derivatives can be all commercial real estate available during a particular time period in a particular region, all commercial real estate of a certain class, all commercial real estate of a certain cost, a lease space equivalent use, or combinations thereof. The lease space equivalent use can include a common descriptive link between varied commodity types, a time period that runs from a date of a contract to a performance date of the commodity, and a contract price.

Another preferred embodiment of the present invention is a system for listing and brokering real estate commodities and financial derivatives of the real estate commodities. This system includes: (a) a data processing means for accepting and storing parameters of an available commodity available for sale or exchange; (b) data processing means for entering a description of a desired commodity desired for purchase or exchange; (c) means for determining that a match exists between the available commodity and the desired commodity; (d) means for displaying the match to a system operator; (e) means for selecting the match for purchase, exchange, or purchase and exchange; (f) means for determining a class of financial derivatives based on a pre-determined set of characteristics resident in commodity descriptions stored in a database; and (g) means for selecting a class of derivatives for purchase, exchange, or purchase and exchange.

In an aspect of this embodiment of the present invention, the data processing means includes a system controller comprising a data processing system, a data management program, data entry means for entering data into the data processing system, memory means for storing memory, and communication means for communicating data between the system controller and a plurality of input and output points. The plurality of input and output points can include, for example, one or more commodity input points, one or more commodity receiver points, one or more commodity brokerage points, and one or more derivative exchange points.

Another preferred embodiment of the present invention is a method for shopping for real estate and completing real estate transactions. This method involves providing a mobile information transmitting and receiving device that is in communication with a database containing real estate data; determining a location of the mobile information transmitting and receiving device using a global positioning system; downloading from the database to the mobile information transmitting and receiving device real estate data corresponding to the location; and displaying on the mobile information transmitting and receiving device summary information corresponding to a property listed in the real estate data to which the mobile information transmitting and receiving device is nearest.

In an aspect of this embodiment of the present invention, this method includes the additional steps of providing communication between a buyer or buyer representative and a seller or seller representative of the property for approval by the seller or seller representative for the prospective buyer to view details of the property; displaying details on the mobile information transmitting and receiving device, if approved by the seller or seller representative; and communicating an offer from the buyer or buyer representative to the seller or seller representative using the mobile information transmitting and receiving device. In addition to these added steps, the method could also further involve completing an electronic agreement to transfer title of the property if the offer is accepted by the seller or seller representative.

Another preferred embodiment of the present invention is system for use in information exchange between a system operator, a plurality of information providers, and a plurality of information customers. The system allows the information providers to both distribute specified information through the Internet and control dissemination of information. The system includes means for making the information provider's specified information available through a secure website on the Internet; means for obtaining from the information provider a designation of a first subset of the information customers that are authorized to receive access to the specified information on the website; and means for distributing to each one of the first subset of the information customers that are authorized to receive access to the specified information an ID that can be used to access the specified information.

In an aspect of this embodiment of the present invention, the system is used to facilitate the exchange of information pertaining to commercial real estate available for sale. In addition, the information providers are owners or owner representatives that provide information concerning the availability of properties for sale, and the information customers are buyers or buyer representatives.

In another aspect of this embodiment of the present invention, the system also includes means for providing a description of the specified information in a searchable database containing a plurality of descriptions of information; means for allowing a second subset of customers to query the searchable database and retrieve information sufficient to show the existence of information responsive to the query without revealing all of the information; means for allowing one or more of the second subset of customers that are interested in obtaining access to the complete information to communicate their interest in access to the information responsive to the query; means for forwarding the request for access and information concerning the interested customer requesting access to the information provider in response to a request for access; and means for allowing the information provider to make a decision to grant or deny the request for access to the information responsive to the query. Within this system, in response to a deny access decision, the interested customer is notified of the deny decision without learning the identity of the information provider. In response to a grant access decision, the interested customer receives access to the specified information.

According to this aspect, optionally, the means for allowing one or more of the second subset of customers that are interested in obtaining access to the complete information to communicate their interest in access to the information responsive to the query, includes: 1) means for allowing the interested customer to send a request for access directed to the system operator; 2) means for allowing the system operator to forward the request for access and information concerning the interested customer requesting access to the information provider in response to a request for access; and 3) means for allowing the information provider to make a decision to grant or deny the request for access and to communicate the decision to the system operator. In response to a deny access decision, the interested customer is notified of the deny decision without learning the identity of the information provider. In response to a grant access decision, the system operator grants the interested customer access to the specified information responsive to the query. Optionally, the system can further include data records containing a profile of each of the second subset of customers and means for transmitting the profile information to information providers in response to a request for access. Also, optionally, the system includes means for forwarding a request for access and information concerning the customer requesting access to the information provider in response to a request for access, and requesting a response from the information provider in real time through the Internet or through wireless data transmission.

According to this aspect, optionally, the system further includes means for obtaining a non-disclosure agreement from the interested potential customer as a condition of receiving access to the specified information. Optionally, the means for obtaining a non-disclosure agreement from the interested potential customer as a condition of receiving access to the specified information includes means for obtaining an electronic signature.

Another preferred embodiment of the present invention is a system for use in information exchange between a system operator, a plurality of information providers, and a plurality of information customers. The system allows the information providers to both distribute specified information through the Internet and control dissemination of information. This system includes: (a) means for making the information provider's specified information available through a secure website on the Internet; (b) means for providing a description of the specified information in a searchable database containing a plurality of descriptions of information; (c) means for allowing a customers to query the searchable database and retrieve information sufficient to show the existence of information responsive to the query without revealing all of the information; (d) means for allowing one or more of the customers that are interested in obtaining access to the complete information to communicate their interest in access to the information responsive to the query; (e) means for forwarding the request for access and information concerning the interested customer requesting access to the information provider in response to a request for access; and (f) means for allowing the information provider to make a decision to grant or deny the request for access to the information responsive to the query. In response to a deny access decision, the interested customer is notified of the deny decision without learning the identity of the information provider. In response to a grant access decision, the interested customer receives access to the specified information.

In an aspect this embodiment of the present invention, the means for allowing one or more of the customers that are interested in obtaining access to the complete information to communicate their interest in access to the information responsive to the query, includes: 1) means for allowing the interested customer to send a request for access directed to the system operator; 2) means for allowing the system operator to forward the request for access and information concerning the interested customer requesting access to the information provider in response to a request for access; and 3) means for allowing the information provider to make a decision to grant or deny the request for access and to communicate the decision to the system operator. In response to a deny access decision, the interested customer is notified of the deny decision without learning the identity of the information provider. In response to a grant access decision, the system operator grants the interested customer access to the specified information responsive to the query.

In another aspect of this embodiment of the present invention, the system is used to facilitate the exchange of information pertaining to commercial real estate available for sale. In addition, the information providers are owners or owner representatives that provide information concerning the availability of properties for sale, and the information customers are buyers or buyer representatives.

In another aspect of this embodiment of the present invention, the system also includes means for obtaining a non-disclosure agreement from the interested potential customer as a condition of receiving access to the specified information. The means for obtaining a non-disclosure agreement from the interested potential customer as a condition of receiving access to the specified information could include, for example, means for obtaining an electronic signature.

In another aspect of this embodiment of the present invention, the system also includes data records containing a profile of each customer and means for transmitting the profile information to information providers in response to a request for access.

In another aspect of this embodiment of the present invention, the system includes means for forwarding a request for access and information concerning the customer requesting access to the information provider in response to a request for access, and requesting a response from the information provider in real time through the Internet or through wireless data transmission.

Another preferred embodiment of the present invention is a system for correlating information stored in a remote database with a user's location, retrieving pertinent data files from the database based upon the user's location, and transmitting the selected data files to the user. The system includes user equipment sets, a computer, and a database in communication with the computer. Each user equipment set including means for inputting or determining a user's geographic location and for transmitting information pertaining to the user's location to a remote computer. The computer is equipped for communication with geographically remote users that are equipped with the equipment sets so as to send data to the equipment sets and receive data from the equipment sets including data pertaining to a user's location. The database stores information that includes information identifying the location of a property. In response to receipt of data pertaining to a user's location, the computer retrieves information pertaining to the user's location and transmits the same to the user's equipment set for display on the display.

In an aspect of this embodiment of the present invention, the information pertaining to the user's location includes information concerning comparable properties.

In another aspect of this embodiment of the present invention, the information pertaining to the user's location includes information concerning three dimensional video description of properties.

In another aspect of this embodiment of the present invention, the information pertaining to the user's location includes information concerning historical performance of commercial properties.

In another aspect of this embodiment of the present invention, the information pertaining to the user's location includes information concerning comparable lease data for commercial properties.

In another aspect of this embodiment of the present invention, the information stored in the database includes information pertaining to commercial or residential real estate located proximate to the user's location. The information includes at least one of data and images describing the commercial real estate. In response to receipt of data pertaining to a user's location, the computer retrieves information describing the commercial real estate near the user's current location and transmits the same to the user's equipment set for display on the display.

In another aspect of this embodiment of the present invention, in response to receipt of data pertaining to a user's location, the computer retrieves geographically pertinent information and transmits the same to the user's equipment set for display on the display.

In another aspect of this embodiment of the present invention, the display includes a map of a geographic area; an indicator on the map to indicate a property for which information is recorded in the database; and (iii) a pop-up window linked to the indicator. The pop-up window appears when the user's location is proximate to the property for which information is recorded in the database. The pop-up window displays the information recorded in the database. The information can include, for example, at least one of a photograph of the property, an address of the property, a building class size of the property, a building size of the property, a number of floors of the property, a year in which the property was built, a buyer of the property, a sale price of the property, a price per square foot of the property, and a cap rate of the property.

Another preferred embodiment of the present invention is a system for storing and automatically displaying descriptions and visual images of real estate on a user's display. The system includes means for generating a plurality of digitized video images of selected real estate, means for storing data records concerning the real estate, means for determining a user's geographic location, means for retrieving data records corresponding to the user's geographic location, and means for displaying on a single display the digitized video images and textual information. Each digitized video image depicts a view of a specified area of a real estate property. The data records include, for example, the digitized video images, textual information concerning the real estate, and information identifying the geographic location of the real estate in a computer database.

In an aspect of this embodiment of the present invention, the system also includes means for generating and displaying three dimensional video depictions.

In another aspect of this embodiment of the present invention, the single display includes a map of a geographic area; an indicator on the map to indicate a location of a property for which a data record exists; a link to the data record on the map proximate to the indicator; and a pop-up window proximate to the indicator. The pop-up window appears when the link is activated and includes at least a portion of the data record. The link is activated by, for example, dragging a pointer over the indicator, touching a touch screen at the indicator, or voicing a command to a voice activated response system.

Another preferred embodiment of the present invention is a system for facilitating commercial real estate information loan transactions. The system includes at least one searchable database, a search engine, communication equipment, and a computer. The at least one searchable database contains data records. The data records identify a plurality of commercial real estate properties, associate at least one lender with each of the commercial real estate properties, associate a loan commitment with each of the commercial real estate properties, provide information sufficient to evaluate the investment value of the property, and provide a list of qualified buyers or information sufficient to evaluate the credit worthiness of prospective buyers. The search engine allows potential customers to query the searchable database. The communication equipment allows potential customers that are interested in purchasing a commercial real estate property to communicate their interest and lock in the loan commitment associated with that commercial real estate property subject to qualification of the potential customer as a qualified buyer. The computer determines whether the potential customer is a qualified buyer and prompts the potential customer to provide further information, if required.

In an aspect of this embodiment of the present invention, the data records that identify commercial real estate properties include information pertaining to: square footage data representing a square footage of the commercial real estate; data characterizing the selected use of the commercial real estate; cost data; data about the tenant in the commercial real estate; a real estate submarket identification; a classification of the commercial real estate based on at least one of a building grade, an age of the building, and an extrapolation of comparable buildings; information pertaining to the submarket including at least one of rent data, vacancy data and absorption rate data; and building-specific information. The system also includes computers and communication equipment for allowing a plurality of users to query the database, add data to the database, and retrieve information from the database.

Another preferred embodiment of the present invention is a method for facilitating commercial real estate information loan transactions. The method begins by providing at least one searchable database that contain data records. The data records identify a plurality of commercial real estate properties, associate at least one lender with each of the commercial real estate properties, associate a loan commitment with each of the commercial real estate properties, provide information sufficient to evaluate the investment value of the property, and provide a list of qualified buyers or information sufficient to evaluate the credit worthiness of prospective buyers. The method continues by allowing potential customers to query the searchable database to identify commercial real estate properties of interest. In response to such queries, the method continues by presenting the potential customers with information sufficient to evaluate the investment value of each property and the loan commitment associated with that commercial real estate property. The method continues by allowing potential customers that are interested in purchasing a commercial real estate property to communicate their interest and lock in the loan commitment associated with that commercial real estate property subject to qualification of the potential customer as a qualified buyer. The method ends by determining whether the potential customer is a qualified buyer and prompting the potential customer to provide further information, if required.

Another preferred embodiment of the present invention is a system for facilitating commercial real estate information loan transactions. The system includes at least one searchable database, a search engine, and communication equipment. The at least one searchable database contains data records that identify a plurality of qualified buyers of commercial real estate together with information sufficient to evaluate the credit worthiness of each of the qualified buyers listed, and associate either a category of interest or past purchase information indicative of a category of interest with each qualified buyer. The search engine allows potential sellers of commercial real estate to query the searchable database. The communication equipment allows potential sellers of commercial real estate property to communicate information concerning their property to qualified buyers.

In an aspect of this embodiment of the present invention, the data records that contain information concerning commercial real estate properties include information pertaining to square footage data representing a square footage of the commercial real estate; data characterizing the selected use of the commercial real estate; cost data including a rental price of the commercial real estate; data about the tenant in the commercial real estate; a real estate submarket identification; a classification of the commercial real estate based upon at least one of a building grade, an age of the building, and an extrapolation of comparable buildings; information pertaining to the submarket including rent data, vacancy data and absorption rate data; and building-specific information. In addition, the system also includes a computer for allowing qualified buyers to access the information concerning commercial real estate properties for which they receive information from potential sellers.

Another preferred embodiment of the present invention is a method for facilitating commercial real estate information loan transactions. The method begins by providing at least one searchable database containing data records. The data records identify a plurality of qualified buyers of commercial real estate together with information sufficient to evaluate the credit worthiness of each of the qualified buyers listed; and associate either a category of interest or past purchase information indicative of a category of interest with each qualified buyer. The method continues by providing a search engine for allowing potential sellers of commercial real estate to query the searchable database. The method ends by allowing potential sellers of commercial real estate property to communicate information concerning their property to qualified buyers. The information includes market information and building-specific information.

Another preferred embodiment of the present invention is a method for providing information concerning real estate property. The method involves displaying a user interface; displaying a display element on the user interface to indicate a real estate property; linking the display element to a data entry for the real estate property; allowing a user to select the display element; and, in response to selection of the display element, retrieving and displaying information from the data entry.

In an aspect of this embodiment of the present invention, the user selects the display element by dragging a pointer proximate to the display element, in which case the information from the data entry is automatically retrieved and displayed. Optionally, the information from the data entry is displayed in a pop-up window. Also, optionally, the method also involves allowing the user to click on the pop-up window to receive more information from the data entry.

In another aspect of this embodiment of the present invention, the user selects the display element clicking through the indicator, using a touch screen, or using a voice activated response system.

In another aspect of this embodiment of the present invention, the information includes one or more of an image of the real estate property, audio content relating to the real estate property, video of the real estate property, and textual information on the real estate property. The textual information includes one of an address of the real estate property, a building class size of the real estate property, a building size of the real estate property, a number of floors of the real estate property, a year in which the real estate property was built, a buyer of the real estate property, a sale price of the real estate property, a lease price of the real estate property, a price per square foot of the real estate property, and a cap rate of the real estate property.

In another aspect of this embodiment of the present invention, the user interface is a chart and the display element is a textual listing of the real estate property.

In another aspect of this embodiment of the present invention, the user interface is a map and the display element is an icon. The icon can signify a characteristic of the real estate property. For example, the icon could signify that the real estate property is an office space, an industrial space, or a retail space. Or, the icon could signify that the real estate property is a condominium, a townhouse, or a single family home. The icon could also signify the price range of the real estate property or the price of the real estate property.

Underlying the seemingly automatic retrieval of location-based information of the previous preferred embodiment of the present invention, another preferred embodiment of the present invention is a database containing data concerning real estate information and/or other information of interest, including merchant information, tourist information, service provider information, and the like. The information in the database is correlated with geographic location information to allow data pertaining to a particular geographic location to be retrieved. Information may be retrieved on demand in response to user queries or searches, or the information may be retrieved in response to predetermined system queries. The use of the predetermined system queries allows the seemingly automatic display of pertinent information as mentioned before.

The ability to automatically retrieve information corresponding to a geographic location in response to predetermined queries can be used in various contexts. As mentioned before, the information can be used in conjunction with a GPS or other position determining system to automatically display geographically relevant information based on a user's position, whether in a vehicle or using a handheld system. The automatic retrieval can also be used to provide a user-friendly graphical user interface for accessing information stored in the database.

In accordance with one important aspect of the present invention, the system includes software for providing a unique graphical user interface for displaying information retrieved from a database. Specifically, when data is retrieved from the database (either as a result of a user query or a predetermined query), only a portion of the data retrieved is displayed. The remaining data is stored locally for quick retrieval, such as in a cache. The portion of the data that is displayed may be displayed in a text grid/spreadsheet/chart format. Optionally, the data may be displayed in a map format.

In accordance with one aspect of the present invention, to provide an uncluttered, yet user-friendly interface, only a subset of the data that is retrieved is displayed. Additional data is automatically displayed in response to a user input, such as passing a pointing device icon over text on the grid/spreadsheet/chart or over an icon on the map display. In the embodiment described herein, the data retrieved, but not initially displayed, is a digital image of the property presented with address and/or price information. The interface further includes a means for users to optionally retrieve even further information from the database by, for example, selecting (e.g., with a pointing device) text or an icon representing the desired information. It should be understood, however, that this graphical user interface feature is more widely applicable and, indeed, can be used in connection with any system where there is an advantage to use of this display technique.

In accordance with another important aspect of the present invention, icons can be used to provide information about the properties shown in the text grid/spreadsheet/chart or on the map view of the user interface. In the map view, for instance, an icon's location on a map provides geographic location information. To provide further information, the icon may be in a shape or appearance that conveys information concerning the type of property, the cost of the property, or the identity of the broker listing the property. Further, the icon may be a small digital image (thumbnail image) of the property itself to convey further information.

The graphical user interface features described herein may be used in various combinations to customize functionality for different purposes to leverage the use of the database. For example, it is possible for the system operator to provide custom content for individual brokers by using predetermined queries to display only properties listed by a particular broker and by displaying the information as an essentially seamless part of the broker's web site. The hierarchical display of information retrieved from the database can be used in other contexts in which display of too much information is confusing or impractical, and resubmitting queries to get basic information is too cumbersome for users. Thus, the present invention also provides graphical user interface tools with broad applicability.

These and other objects, aspects, and advantages of the present invention are described in greater detail in the detailed description of the invention, the appended drawings, and the claims. Additional features and advantages of the invention will be set forth in the description that follows, will be apparent from the description, or may be learned by practicing the invention.

BRIEF DESCRIPTION OF THE DRAWINGS

FIGS. 35–71 are web screen shots that depict a preferred embodiment of the system and method for collection, distribution and use of information according to the present invention.

DETAILED DESCRIPTION

Figure 1:
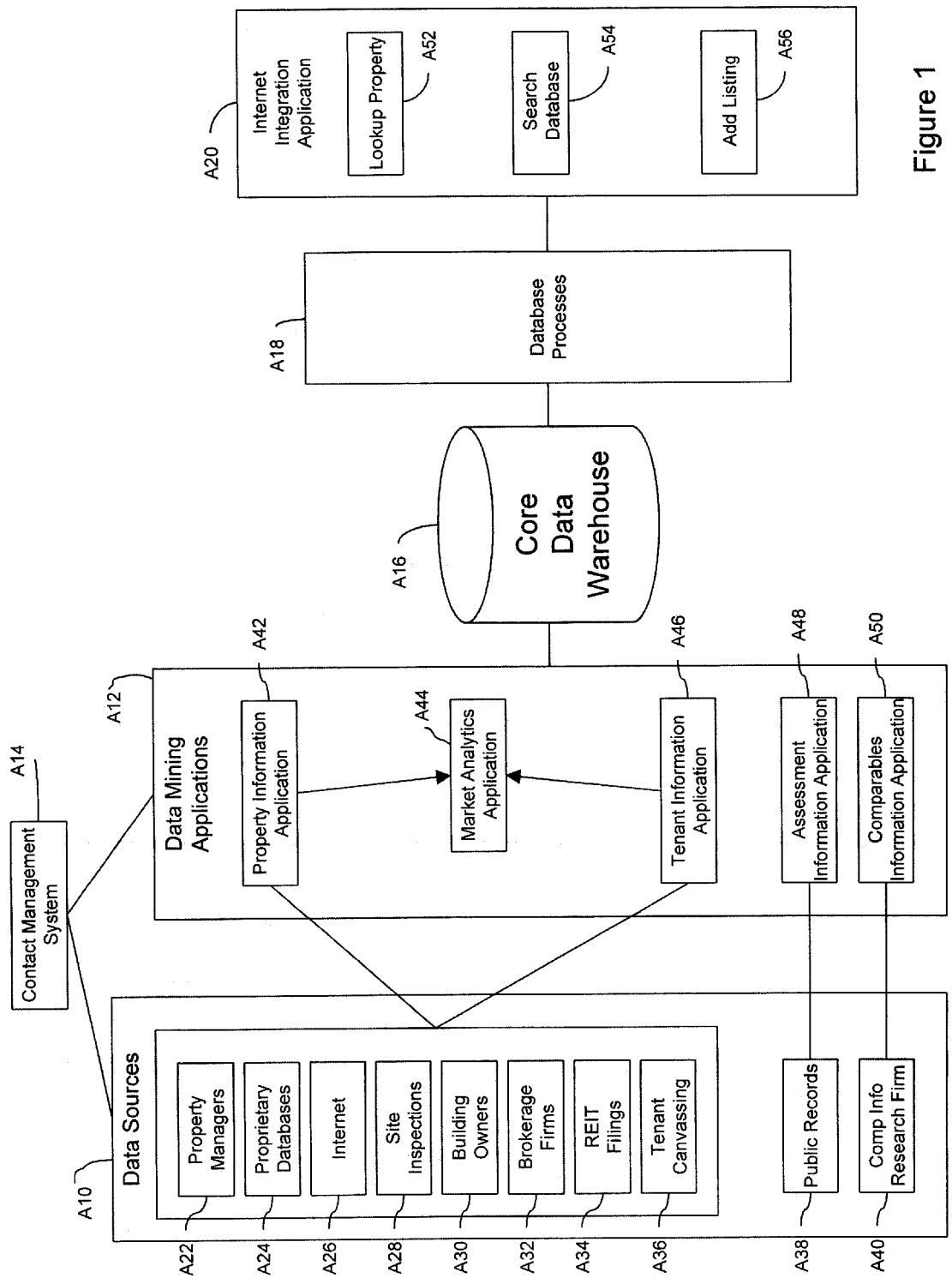
FIG. 1 shows the overall system architecture of the present invention, according to a preferred embodiment of the present invention.

The system of the present invention, the preferred embodiment of which is referred to as COSTAR EXCHANGE™, is a web-based marketplace that efficiently and securely facilitates the buying and selling of commercial properties.

The invention includes, but is not limited to the following: a large-scale database of commercial properties for sale (over 38,000 commercial properties with a combined asset value in excess of $40 billion in the preferred embodiment); a secure web service, the preferred embodiment of which is known as COSTAR EXCHANGE,™ for distributing the information; and communication and data processing equipment that allow sellers of properties to list extensive information about their properties for sale on the site at no cost. The site affords an efficient means for these sellers to reach a large universe of potential buyers. In the currently preferred embodiment, potential buyers pay a subscription fee to access the system. Sellers of investment-grade properties have the additional option of selecting limited, secure distribution of their properties in order to address confidentiality requirements.

The system of the present invention makes it possible for a user to extract data relating to virtually every aspect of a commercial real estate transaction. Although the data is described as being contained within a "database", data can be stored in a plurality of linked physical locations or data sources. The significant aspect is that the database contains information relating to areas that have previously been only accessible in isolation from one another. By providing a unified data model and a system for forming a variety of queries against the unified database, it is possible to understand with precision the relationship between market factors that have heretofore only been understood in an anecdotal way. For example, prior to the present invention, a commercial real estate investor might have recognized the value of investing in a particular building that had low vacancy but was located in an area of extremely high vacancy. If so, this investor might also be interested in knowing that a building that is on the market has lost a big tenant. Prior to the system of the present invention, however, there has been no unified way of storing an investor's investment criteria and continually monitoring the market so as to have the ability to provide a real-time alert when a property matching the investor's investment criteria has become available. This advantage is achieved because databases containing leasing information are linked with databases concerning buildings for sale, which are linked to databases that store a particular investor's investment criteria, which are linked to databases that store the data necessary to determine market conditions, and so on. It is through the connections of previously discrete databases that the synergies and advantages of the present invention arise.

In this sense, the present invention resides in the interconnection of related pieces of information that allows a true understanding and deep appreciation of a commercial real estate market. The user of the system of the present invention has the ability to understand data in context, because the data in one data source is influenced by other data sources that have heretofore not been connected.

The data stored in the databases of the present invention is from various sources. For example, property information can be obtained by researching information sold and information available. Tenant information can be obtained through personal inspection of properties and from brokers. Market analytics is obtained through an historical analysis. In addition, tax assessment information provides yet another source of information.

Another way of gathering information is through a mobile information-collecting device, according to another aspect of the present invention. The mobile information-collecting device is a truck or other vehicle that is equipped with a GPS system and a link to the databases of the system of the present invention. The device further includes a display screen and input device, and can include a web camera. The system is designed such that the location of the truck or other mobile information gathering device at any particular instance is correlated to the database so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important thing is that the system automatically retrieves and displays the entirety of the currently available information so that the operator can determine if pieces of information are missing or need to be updated.

The mobile information gathering system of the present invention has other applications as well. For example, a similar device is used in connection with residential real estate listings to display pertinent information and directions to the nearest available home for sale. The pertinent information could include, for example, photographs that pop-up on the display as the mobile information-collecting device travels. Likewise, the system displays information concerning merchants, service providers, or tourist attractions within a particular area in a non-commercial setting. For example, the GPS in a passenger car is linked to a database that contains information about local merchants, such as restaurants. As the driver approaches these restaurants, the system displays advertisements or other information pertaining to the restaurants.

Thus, in accordance with the present invention, the system provides location-sensitive real estate information automatically and performs other useful tasks by correlating a vehicle's instantaneous position to data stored in a remote database. The system identifies geographically pertinent information and transmits the geographically pertinent information to the vehicle for display on the display panel within the vehicle or, perhaps, for audio announcements to the vehicle occupant.

System Architecture

FIG. 1 shows the overall system architecture of a preferred embodiment of the present invention. As shown, the principal components of the system architecture include data sources A10, a contact management system A14, data mining applications A12, a core data warehouse A16, database processes A18, and Internet integration applications A20. Broadly stated, contact management system A14 directs data mining applications A12 to obtain commercial real estate information from data sources A10; data mining applications A12 gather, organize, and transmit the information to core data warehouse A16; database processes A18 access the information from core data warehouse A16 and organize it for manipulation by Internet integration application A20 (e.g., by building database sets); and Internet integration application A20 presents the information to the end user for review and manipulation by the user. In terms of input and output, data sources A10, contact management system A14, and data mining applications A12 represent the input side of the system architecture, while database processes A18 and Internet integration application A20 represent the output side to which an end user of the system is connected.

Data sources A10 represent a vast network of entities generating information about commercial real estate. Each entity maintains information specific to the business or process in which it is involved. Contact management system A14 directs the input systems of data mining applications A12 to conduct continuous pollings of data sources A10. By conducting continuous, periodic polling of data sources A10, data mining applications A12 ensures that core data warehouse A16 contains up-to-date information.

Data sources A10 include such data repositories as property managers A22, proprietary databases A24, Internet A26, site inspections A28, building owners A30, brokerage firms A32, REIT filings A34, tenant canvassing A36, public records A38, and comparable information research firms A40. Property managers A22, building owners A30, and brokerage firms A32 maintain records on the individual properties in which they are involved, concerning such information as transaction histories and characteristics of a property. To obtain this information, contact management system A14 supports communications (e.g., by telephone or email) between representatives operating the present invention and the personnel of property managers A22, building owners A30, and brokerage firms A32.

Proprietary databases A24, Internet A26, and REIT filings A34 are data source entities that require review by personnel associated with contact management system A14 and data mining applications A12. The personnel pull the pertinent information from these data sources for gathering by data mining applications A12 and storage by core data warehouse A16.

Site inspections A28 and tenant canvassing A36 are data source entities that target specific regions or properties on which to obtain commercial real estate information. Typically, this information is obtained manually by visiting a particular location and recording observations and/or by using a mobile information gathering system.

Public records A38 and comparable information research firm A40 are automated data source services that digitally record information and automatically transmit the information to data mining applications A12.

Data mining applications A12 receives the information from data sources A10 into separate modules or applications, including, in a preferred embodiment of the present invention, property information application A42, market analytics application A44, tenant information application A46, assessment information application A48, and comparables information application A50.

Property information application A42 and tenant information source A46 receive information from property managers A22, proprietary databases A24, Internet A26, site inspections A28, building owners A30, brokerage firms A32, REIT filings A34, and tenant canvassing A36. Assessment information application A48 receives information from public records A38. Comparables information application A50 receives information from comparable information research firm A40. As sort of a hybrid of property information application A42 and tenant information application A46, market analytics application A44 receives information from data sources A10 through property information application A42 and tenant information application A46 and conducts analyses of the data to present historical evaluations of transactions.

Property information application A42 includes sales information on properties, such as physical characteristics, available space, selling price, and income expense statements. Tenant information application A46 includes leasing information such as lease turnover dates, average price per square foot, and the types of tenant under lease. Market analytics application A44 draws on information from property information application A42 and tenant information application A46 to analyze transactions over a long period of time (e.g., ten years) to provide valuable historical performance data. Assessment information application A48 includes property valuations, e.g., tax assessments. Comparables information application A50 includes broad market information that enables accurate comparisons of property values based, for example, on type of building structure and geographic proximity.

Each of the modules of data mining applications A12 is highly interrelated with other modules, such that a change of information in one module necessitates a change of information in another. For example, if tenant canvassing A36 learns that a tenant has moved out of property A and into property B, tenant information application A46 must note under the tenant's information the new space the tenant occupies; additionally, and as a direct result of the transaction, property information application A42 must note the new vacant space in property A and the now occupied space in property B. In turn, the adjustments in occupancy affect the analysis performed by market analytics application A44, e.g., if property A is now left with a low occupancy rate, it compares unfavorably to other properties similarly situated. In addition, considering the likely scenario that property B was occupied by a previous tenant who moved elsewhere, the seemingly singular event of the initial transaction (tenant's move from property A to property B) is actually a part of a series of transactions through the interrelated modules of data mining applications A12. As a helpful analogy, data mining applications A12, with its group of interrelated modules, is effectively an enormous accounting ledger that tracks property space instead of dollars, and records a series of related transactions in zero-sum fashion, akin to credits and related debits. After recording a single transaction, the present invention reconciles the entries in each interrelated module by confirming that the interrelated entries are internally consistent.

As data mining applications A12 receive real estate information from data sources A10 and process the impact of that information through the modules or applications, the information is stored and constantly updated in core data warehouse A16. Database processes A18 access this data from the output side of core data warehouse A16 and create database sets compatible with formats required by Internet integration application A20. Internet integration application A20 manipulates the database sets in response to commands from a user, and presents the results of database manipulations, e.g., search query results, to the user in the form of graphical user interfaces. The specific manipulations executed by Internet integration application A20 are described below in more detail under the subheading "Detailed Description—Website Operation."

Figure 2:
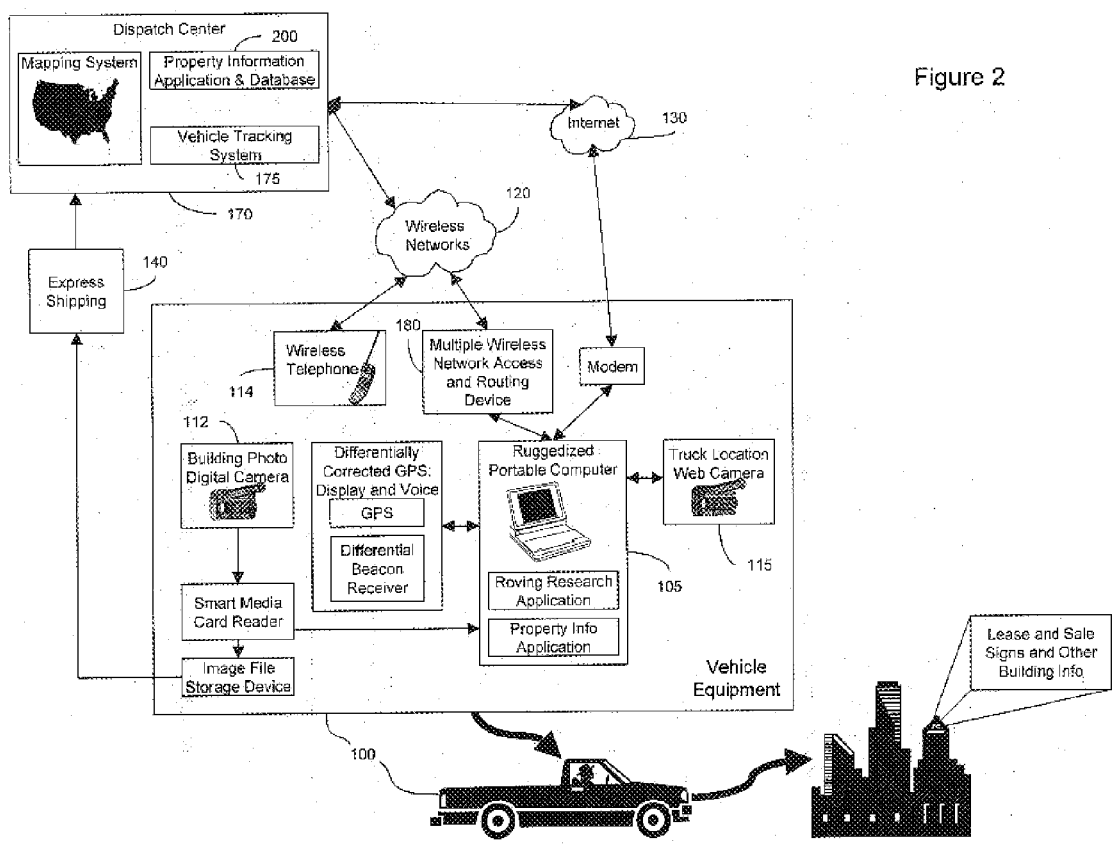
FIG. 2 is a schematic representation of the mobile information gathering system and related system architecture, according to a preferred embodiment of the present invention.
Figure 3:
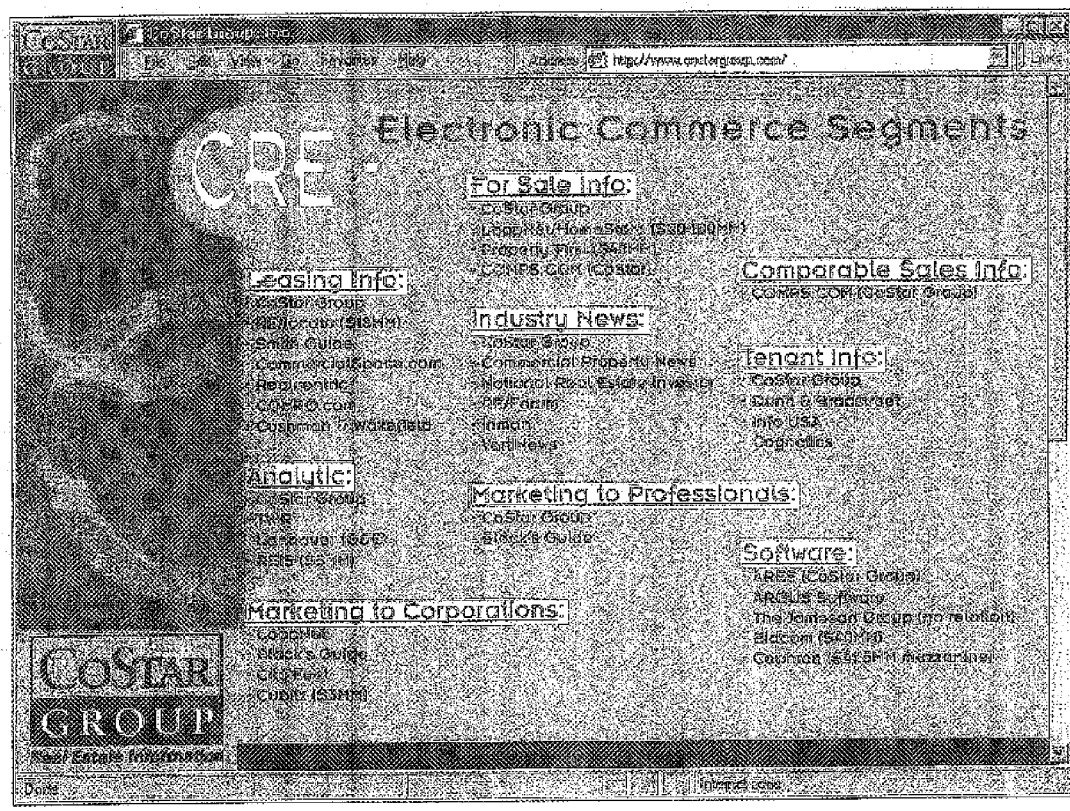
FIGS. 3–16 are slides that graphically depict the commercial real estate market and the process for transactions within that market, to provide the context in which a preferred embodiment of the present invention operates.

FIG. 2 is a schematic representation of the mobile information gathering system and related system architecture. As shown, the mobile information-collecting device is a truck 100 that is equipped with a GPS system 110 and a link for data transmission (through wireless network 120, the Internet 130 and/or by express shipping 140) to the databases 200 of the system of the present invention which are shown at a dispatch center 170. The device (truck) 100 further includes a display screen, audio output and data input device (here in the form of a portable computer 105), and can also include a web camera 115 that transmits a continuous "driver's eye" view to the dispatch center 170. Other equipment includes digital camera 112, wireless telephone 114, and other computer and communication equipment.

The system is designed such that the location of the truck or other mobile information gathering device 100 at any particular instance is correlated to the database 200 so that information concerning properties in the vicinity of the truck is automatically displayed on the display screen located in the truck. Thus, as a truck passes a particular commercial real estate building, information pertaining to that building is displayed, and the operator can determine whether additional information has to be gathered or whether information obtained in the database should be modified. The important thing is that the system automatically retrieves and displays the entirety of the currently available information so that the operator can determine if pieces of information are missing or need to be updated.

As shown, in the context of the system of the present invention, the mobile data gathering and dissemination vehicle 100 is coordinated by a central system 170 for tracking and dispatch of mobile vehicles 100. Using a multiple network access and routing device 180, the system employs least cost routing for data transfer system for transmitting data from the mobile vehicle. The mobile data gathering and dissemination vehicle plays an important role in quality control and synchronization of data stored in data sources by periodically verifying and filling gaps in the data stored in the databases. The system also cross checks data sources and prompts the input agent (whether in the field or a central office) to make necessary changes in databases affected.

An important and more widely applicable aspect of the present invention is correlation of data stored in a remote location to vehicle position in real time. This feature is applicable in the context of commercial real estate, residential real estate, and as part of a merchant directory. For example, a similar device can be used in connection with residential real estate listings to display pertinent information and directions to the nearest available home for sale. Likewise, the system could be used to display information concerning merchants within a particular area in a non-commercial setting. For example, the GPS in a passenger car could be linked to a database that contains information about local merchants, such as restaurants. As the driver approaches these restaurants, the system could display advertisements or other information pertaining to the restaurants.

Thus, in accordance with the present invention, the system is able to provide location-sensitive real estate information automatically and perform other useful tasks by correlating a vehicle's instantaneous position to data stored in a remote database to identify geographically pertinent information and by transmitting the geographically pertinent information to the vehicle, by for example displaying the information on the display panel within the vehicle or by playing audio announcements of the information.

In the context of commercial real estate, the mobile information collection and dissemination system for correlating data to a vehicle's location and for transmitting the data to the vehicle in real time includes the vehicle 100 equipped with equipment for both transmitting and receiving data. The vehicle position is preferably determined by GPS and the system links GPS data to real estate information. The system intelligently correlates vehicle position to real estate data, retrieves the appropriate real estate data as the vehicle travels and then transmits information back and forth over a network, preferably the global information network (i.e., the Internet or web). As the vehicle drives down the street, pictures of the buildings are automatically displayed on a display screen. The user need not search, because the information just pops up on the display screen. This information could include, for example, descriptions and photographs of buildings. The data changes automatically as the user drives down the street. The user (in this example a field researcher) is prompted to gather and transmit information that is missing.

In addition to using the system of the present invention to research properties, the system brokers or customers could use the system such that as the broker or prospective tenant drives around, the information on the property nearest them comes up. Such a system is also useful for residential real estate brokers. Naturally, access to data and the amount of content provided must be tailored to the particular user to address security and market concerns. Using data available on the database of the present invention, however, the system could provide a virtual tour of a commercial building. The same approach could be employed in the residential context provided one had access to a database of residential property information.

Linking position data to commercial information is valuable in other contexts as well. For example, position location information could be correlated with information concerning commercial establishments, such as restaurants, for advertising or directory assistance purposes. In context of advertising or marketing, the system intelligently correlates vehicle position to merchant data, retrieves the appropriate merchant data, and then transmits information back and forth over a network, preferably the global information network (i.e., the Internet or web). As the vehicle drives down the street, ads, promotions, tourist information, or other merchant or general interest information, including pictures of the buildings, are automatically displayed on a display screen. The user need not search nor do anything, as the information just pops up. The data changes automatically as the user drives down the street. The system operator could sell advertisements to be displayed in cars via GPS. The information may be audio and/or a visual on a screen.

The system also stores the recent history or sequence of vehicle movement so that the speed and the direction of movement can be ascertained. Direction of movement information is useful in the real estate information gathering and display context since it helps the central system track, dispatch, and route mobile vehicles. Direction of movement information is useful in the merchant directory/advertising/marketing context since the direction of movement affects the geographic desirability of commercial establishments. For example, if a user is driving 80 miles an hour going South, restaurants that are 5 miles back are not as desirable as restaurants that are 5 miles ahead (establishments 5 miles East or West are also not too desirable). Thus, as the vehicle moves the system preferably takes speed and direction of travel into account when correlating data such as ads, promotions, tourist information, or other merchant or general interest information, including pictures of the buildings, with vehicle position for display on the display screen.

The information to be retrieved and displayed to the user based on the user's location can be stored locally with the user or transmitted to the user from a remote database. As the display content becomes data rich, however, storing the information locally and keeping information uniform and current becomes difficult. For this reason, transmission from a remote repository is preferred whenever sufficient transmission bandwidth is available.

Linking position data to commercial information is also useful in contexts other than the mobile vehicle. The system could be used to transmit location sensitive real estate information to a user's PDA or laptop computer, for example. For example, PDA's such as those made by Palm™ will soon have both a GPS capability and a data transmission capacity. Using the system of the present invention, information could be retrieved from the database of the present invention and displayed on the user's PDA or laptop computer based on the user's location. The information can be stored locally with the user or transmitted to the user from a remote database. For example, a user in Loudoun County investigating a property, looking at 5 or 6 adjoining parcels could have a Palm VII telling the user who owns the parcels around where the user is standing, who the tenants are, what the rent is, and what the sale points are.

System Operation

FIGS. 3–17 are slides that graphically depict the commercial real estate market and the process for transactions within that market, to provide the context in which a preferred embodiment of the present invention operates.

Referring now to FIGS. 3 through 17, FIG. 3 shows the electronic commerce segments involved in commercial real estate. Specifically, there is a need for leasing information, sale information, industry news, comparable sales information, tenant information, information for marketing to professionals, and information for marketing to corporations and software. These will be described below. Concerning "for sale information," the information will list what types of buildings are for sale. Concerning leasing information, the information pertains to buildings that are available for lease or to space within buildings that are available for lease. Concerning industry news, the information can be any of a wide variety of information that provides industry professionals with news that they need. Concerning tenant information, information will relate to the needs and financial characteristics of commercial real estate tenants. Analytic information relates to the types of information that real estate investors or landlords use to assess the market and the value of any particular property.

The commercial real estate market is enormous. Within the United States alone, the collective value of commercial real estate assets is estimated to be in excess of $4 trillion dollars. Approximately one hundred thousand building sale transactions occur each year. The value of these transactions is estimated to exceed $300 billion. Every transaction involves multiple parties. Notwithstanding the enormity of this market, the prior art system for facilitating these transactions is enormously inefficient.

Figure 4:
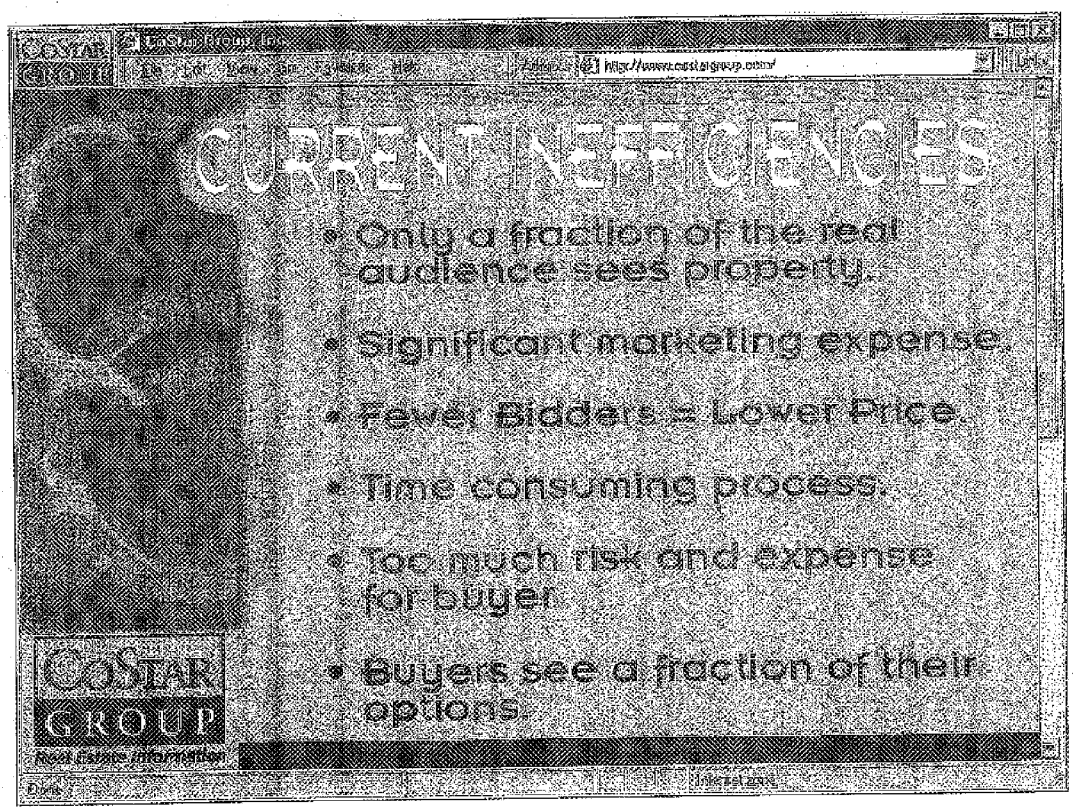

As shown in FIG. 4, the current prior art inefficiencies in the market include the fact that only a fraction of the real audience ever sees any particular property. In particular, the conventional way of selling commercial real estate is through buyers' brokers representing the buyers, and sellers' brokers representing the sellers. Unlike the sale of single family homes, the availability of high-value commercial real estate is not widely advertised. This is because of the way that high-value commercial real estate properties have typically been marketed in the past. In particular, when a seller's broker is prepared to offer a seller's building, the seller prepares a lengthy offering document and distributes the lengthy offering document to a very small group of select potential purchasers. These potential purchasers may be thought of as being within the inner circle of the seller's agent. This practice is so prevalent that if a potential buyer or buyer's broker receives a building offering from a broker and the buyer's broker or potential investor knows that they are not within that sellers broker's inner circle, they will assume that all potential buyers within the sellers broker's inner circle have passed on the building and that the mere receipt of the building offering indicates a building value that is tarnished in some way.

Other inefficiencies in the current prior art way of selling commercial real estate include the fact that there is a significant marketing expense involved since the marketing involves preparation of lengthy documentation and because the system in place is not highly automated.

Another inefficiency in the prior art is a basic economic inefficiency of the market. Because the number of bidders is limited, the price is lower than it might otherwise be if all possible bidders or a greater number of bidders were allowed to bid on the property. In addition, the current system is inefficient because it is very time-consuming. Moreover, there is too much risk and expense for the buyer, and buyers see only a fraction of their options.

Figure 5:
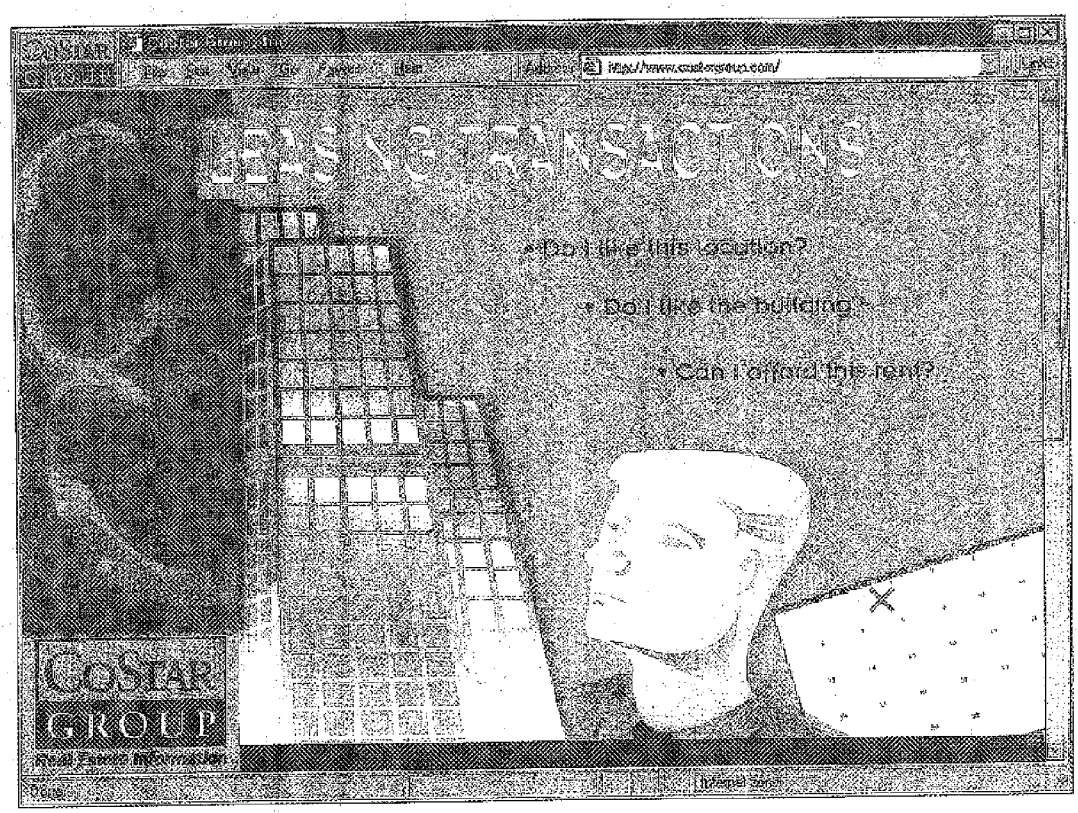
Figure 6:
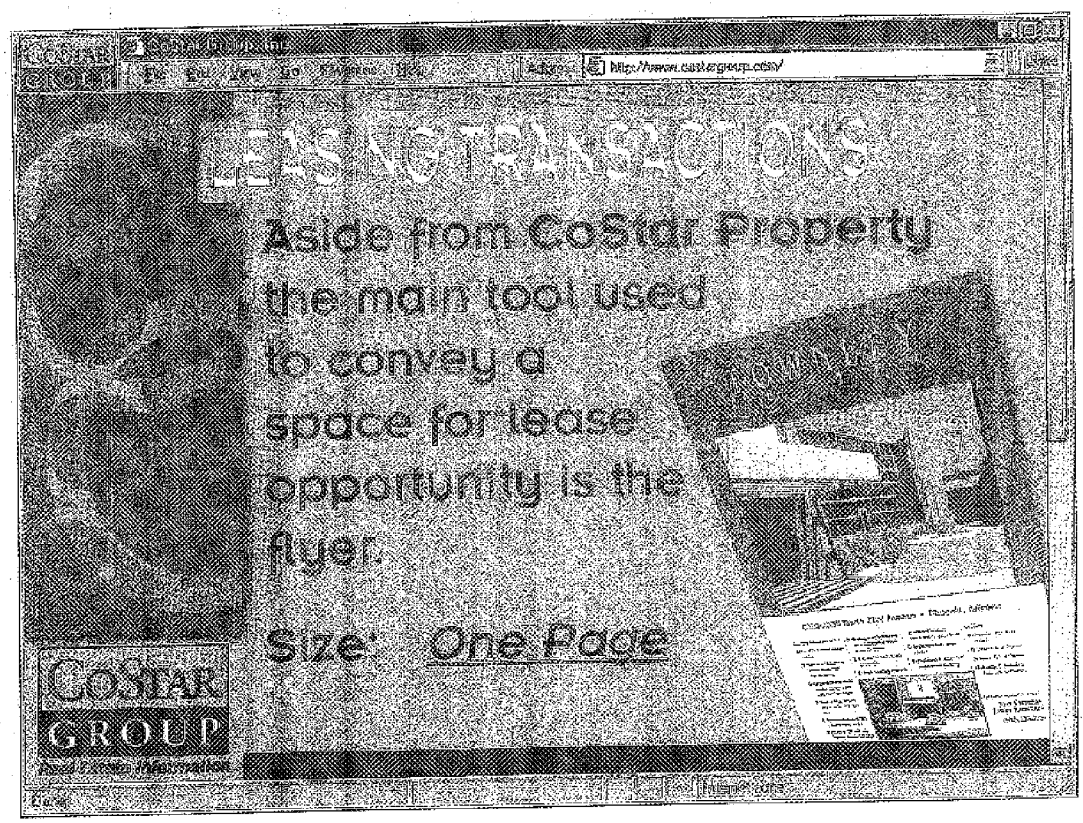
Figure 7:
Figure 8:
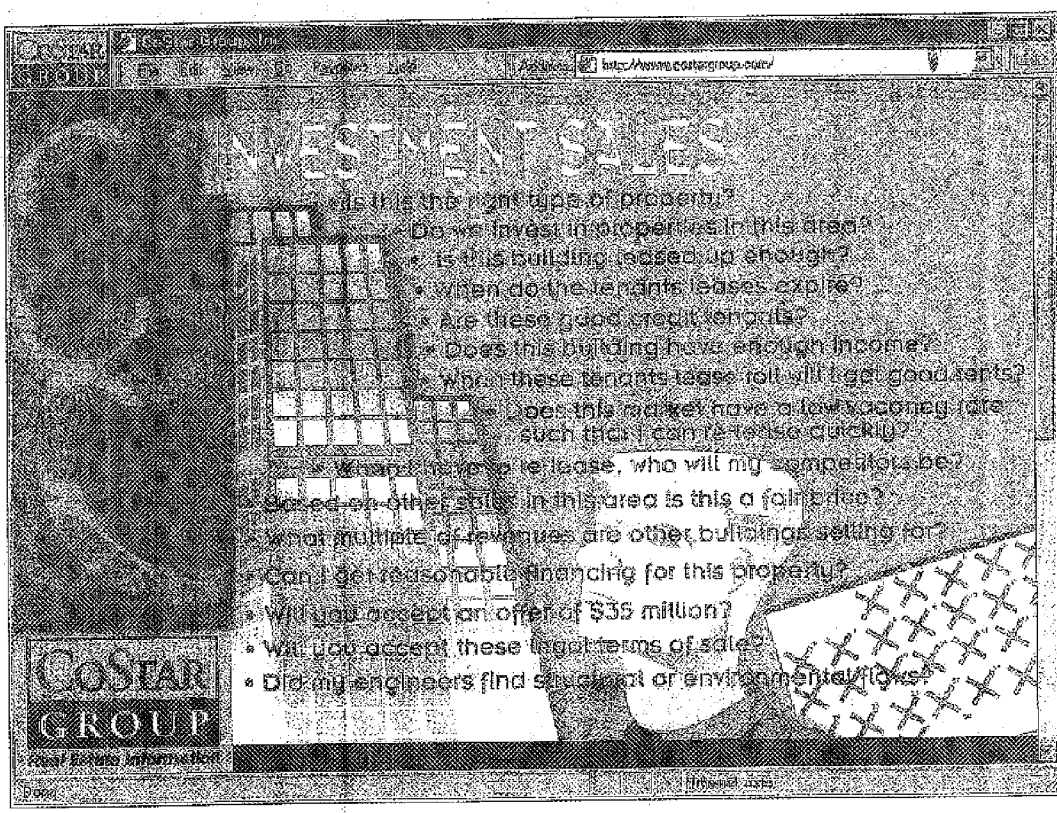

The commercial real estate process will now be described beginning with the conventional prior art process for leasing transactions. As shown in FIG. 5, from the vantage point of the prospective tenant, the leasing transaction is basically decided based upon three considerations: 1) Do I like this location? 2) Do I like the building? and 3) Can I afford this rent? As shown in FIG. 6, the main tool used to convey a space for a lease opportunity is a one-page flyer. Thus, the conventional prior art marketing approach for marketing a property for leasing is to distribute 300 to 500 one-page flyers locally, as shown in FIG. 7.

Figure 9:
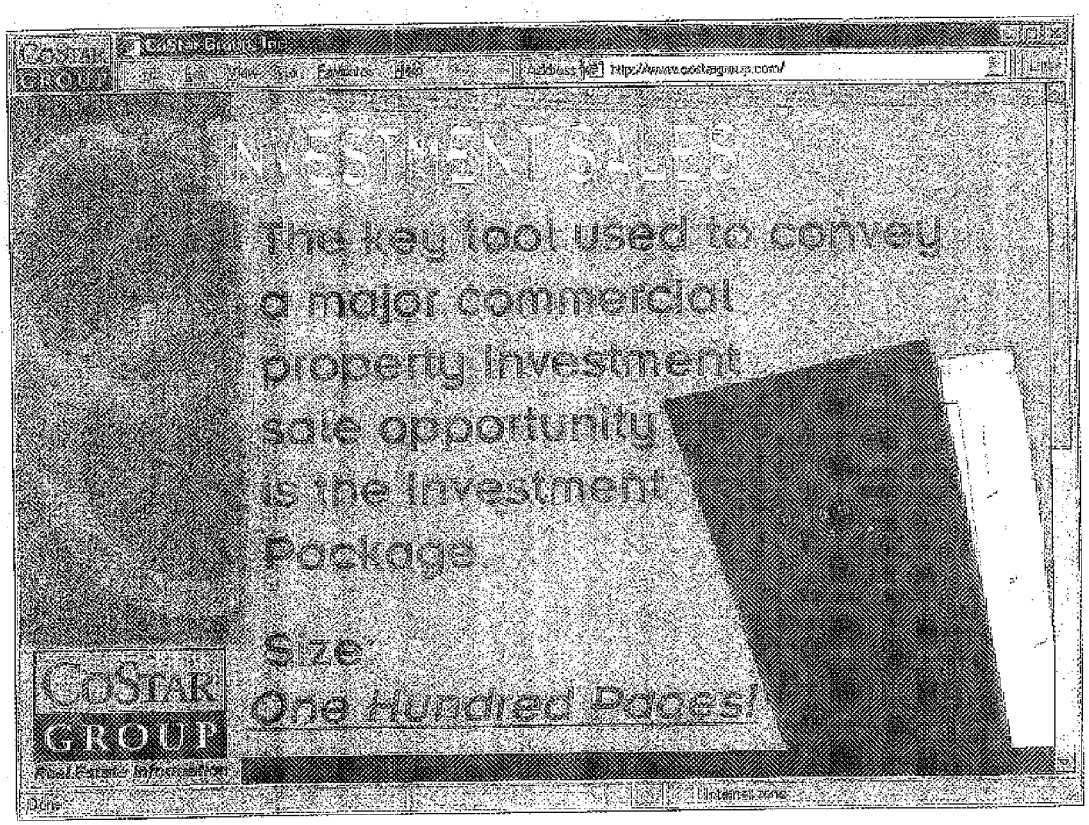

In contrast, the prior art investment sales process is considerably more complex. To begin with, there are many more considerations as summarized on FIG. 8. These include: 1) Is this the right type of property?; 2) Do we invest in properties in this area?; 3) Is this building leased up enough?; 4) When do the tenants' leases expire?; 5) Are these good credit tenants?; 6) Does this building have enough income?; 7) When these tenants' leases roll, will I get good rents?; 8) Does this market have a low vacancy rate, such that I can re-lease quickly?; 9) When I have to re-lease, who will my competitors be?; 10) Based on other sales in this area, is this a fair price?; 11) What multiple revenues are other buildings selling for?; 12) Can I get reasonable financing for this property?; 13) Will the seller accept an offer of $35 million?; 14) Will the seller accept these legal terms of sale?; and 15) Did my engineers find structural or environmental flaws? Because of the complexity of issues that must be considered, the main tool used in the prior art to convey a major commercial property investment sale opportunity is the investment package, which typically is a document on the order of 100 pages, as shown in FIG. 9.

Figure 10:
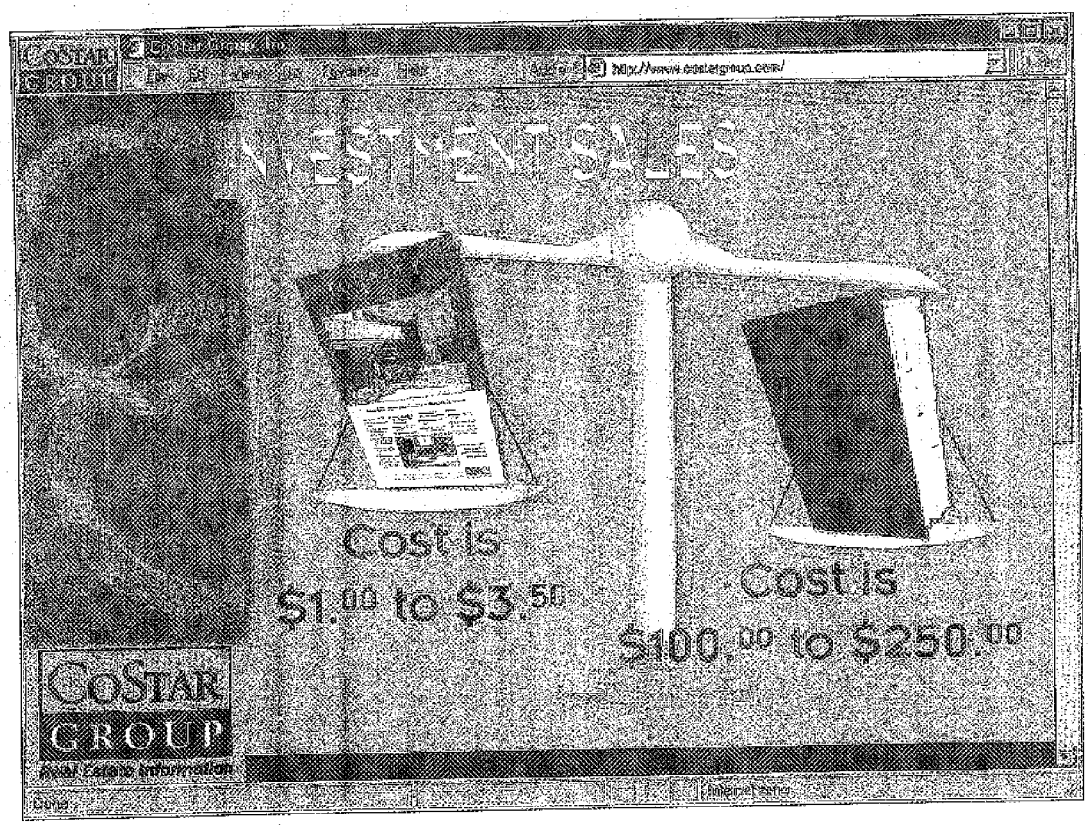
Figure 11:
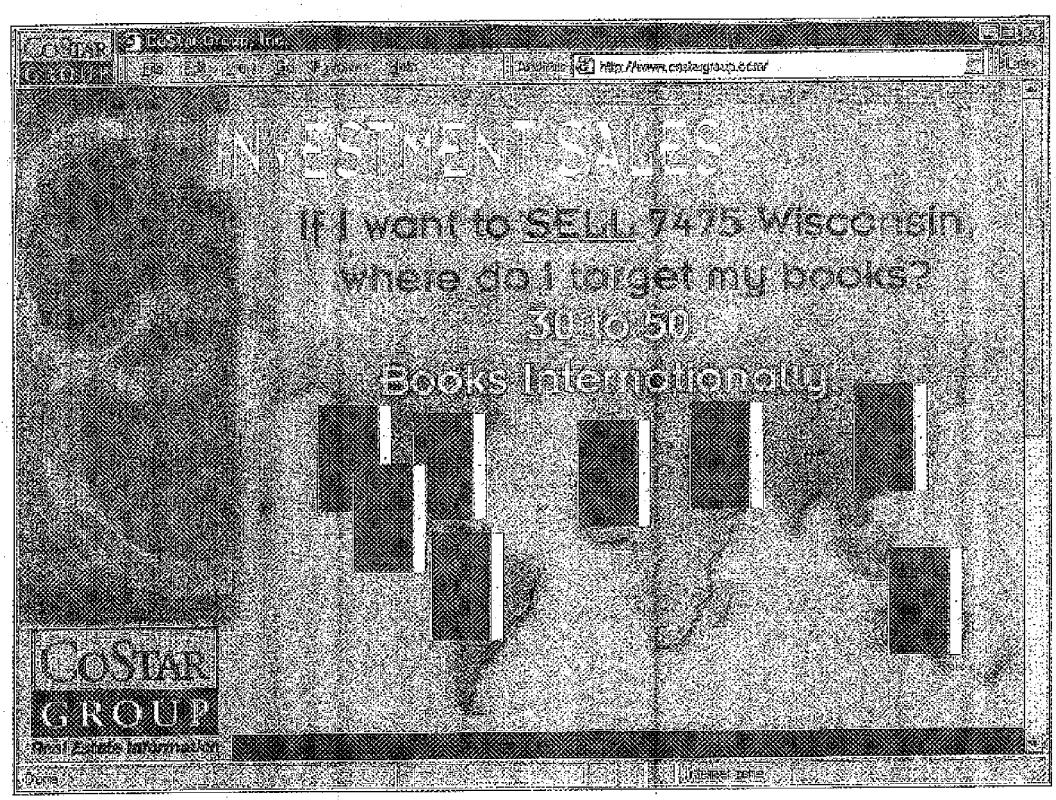

FIG. 10 shows the relative comparison between commercial leasing and investment sales. As noted before, in the case of commercial leasing, the main tool is a one-page flyer that typically costs $1.00 to $3.50 per copy. In contrast, the main tool for investment sales, i.e., the investment package, costs between $125.00 to $250.00 per copy. The distribution of these books is very different, as well. In particular, as shown in FIG. 11, if one wishes to sell a particular building, the books are distributed to a group of 30–50 sophisticated real estate investors and brokers internationally.

Figure 12:
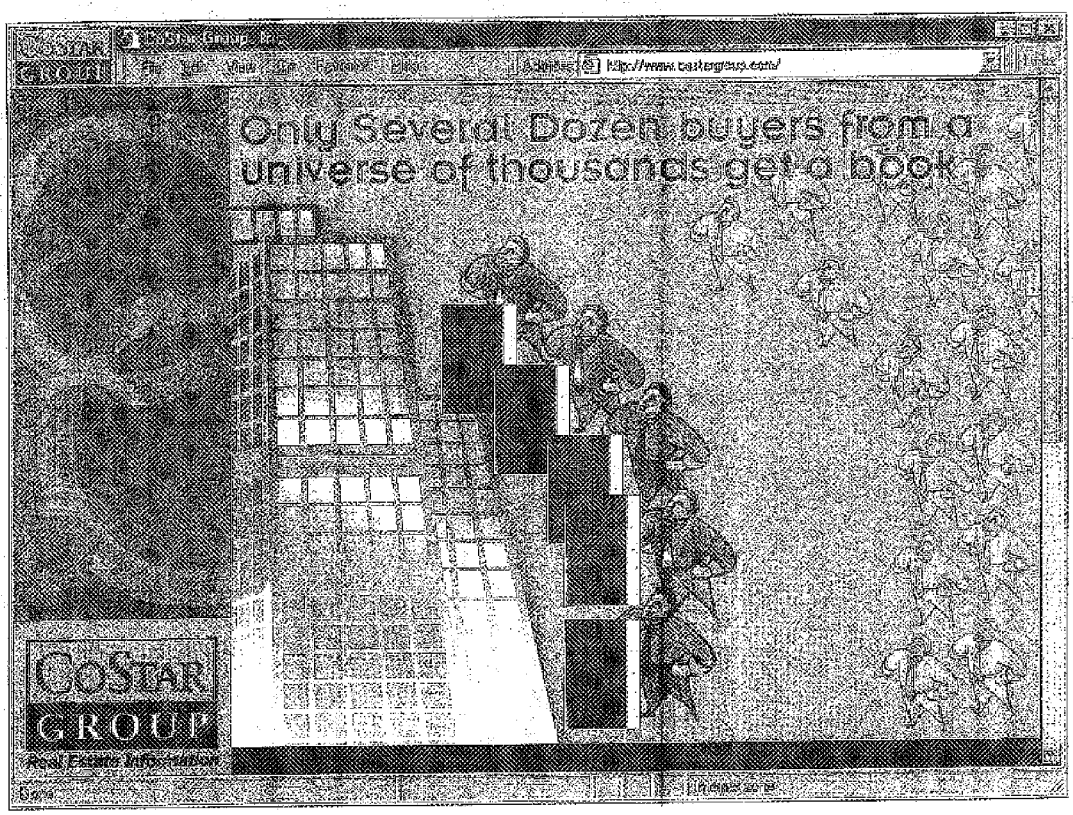
Figure 13:
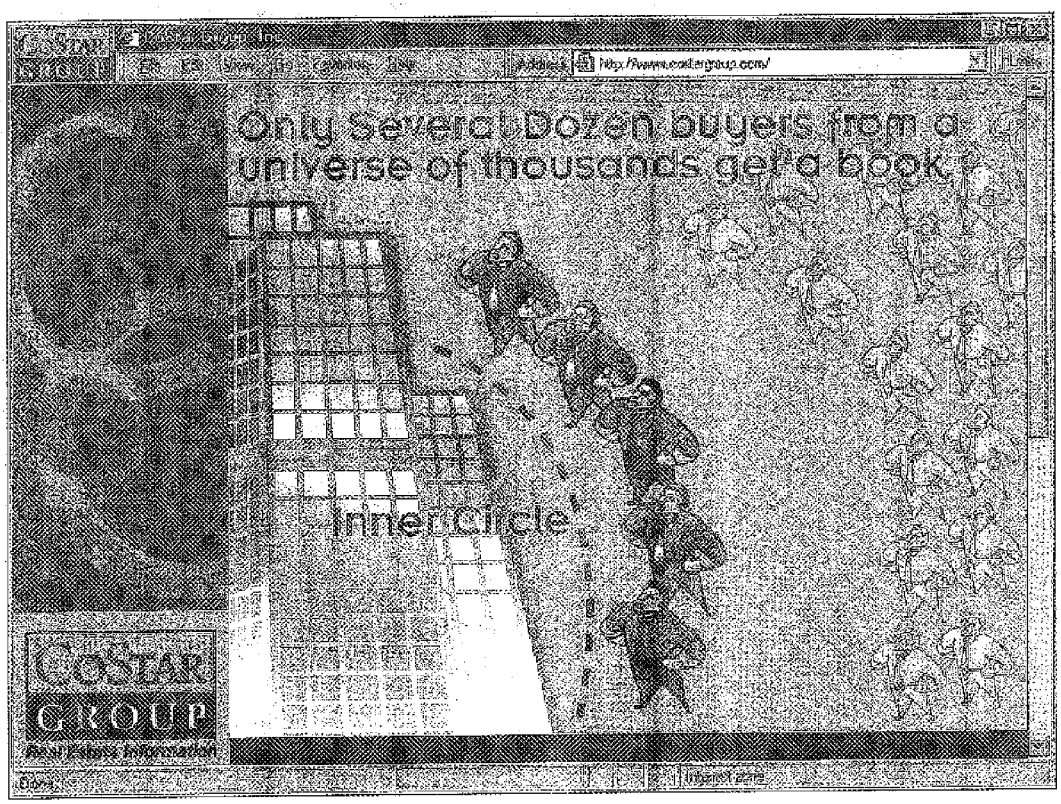
Figure 14:
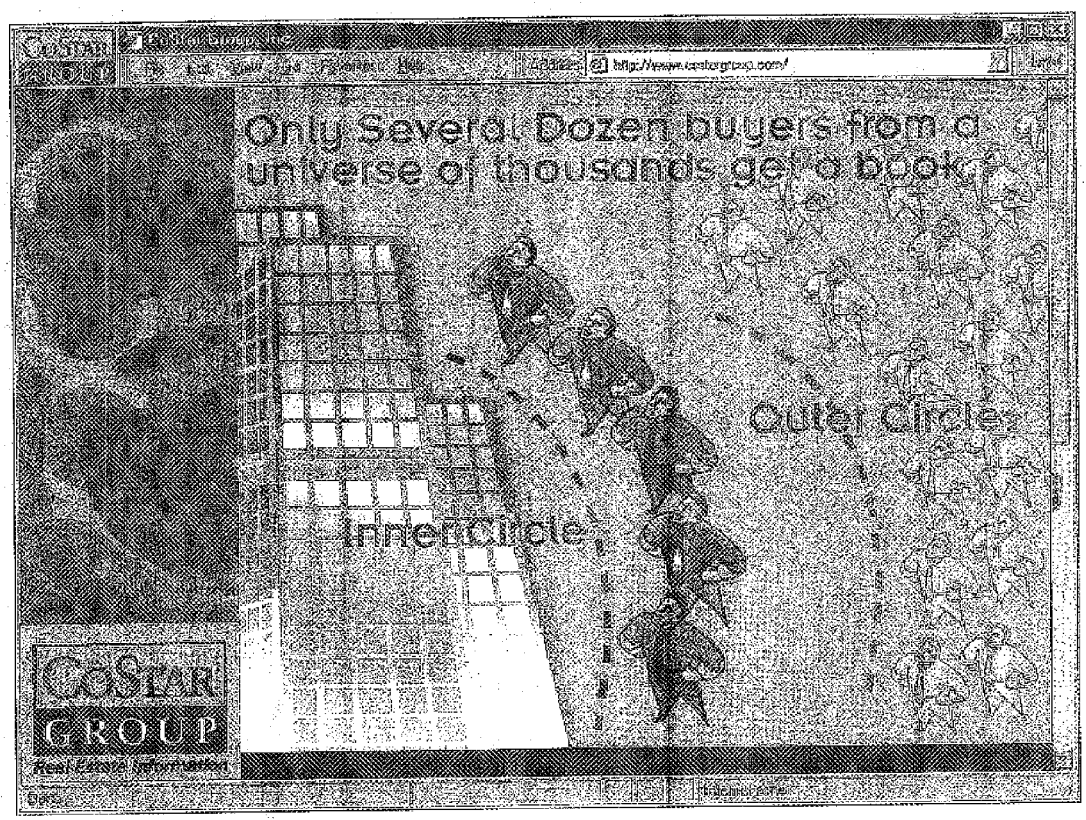

Consequently, only several dozen buyers from a universe of thousands get a copy of the "book," i.e., the investment package, as graphically illustrated by FIG. 12. The select few buyers from the universe of thousands that get a book are typically referred to as the inner circle of the seller's agent as shown in FIG. 13. The remaining universe of potential buyers that are not selected, i.e., that are not in the inner circle of the seller's agent, are referred to as the outer circle, as graphically illustrated in FIG. 14.

Figure 15:
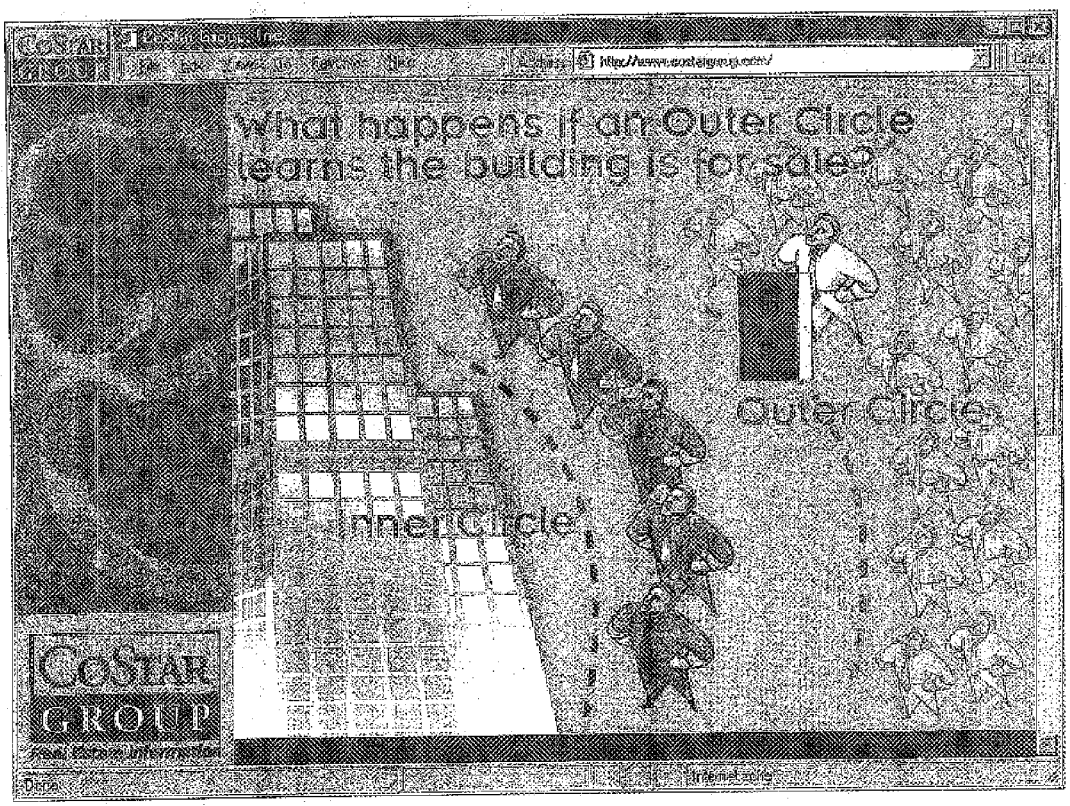

As alluded to earlier, a distinctive characteristic of the commercial real estate industry is what happens if a broker or investor in the outer circle learns that the building is for sale as graphically illustrated in FIG. 15. In this instance, the property is immediately tarnished and the value of the property is reduced. This is because the practice of distribution of the investment book to only those buyers, agents, or investors within the broker's inner circle is so prevalent that, if a buyer's broker or investor that is not in the seller's agent's inner circle receives a copy of the book, they will assume that all of the individuals in the inner circle have passed on the property and, for that reason, the property is tarnished, and the value is reduced. Thus, for acceptance within the commercial real estate community, the present invention includes a secure way of controlling distribution.

Figure 16:
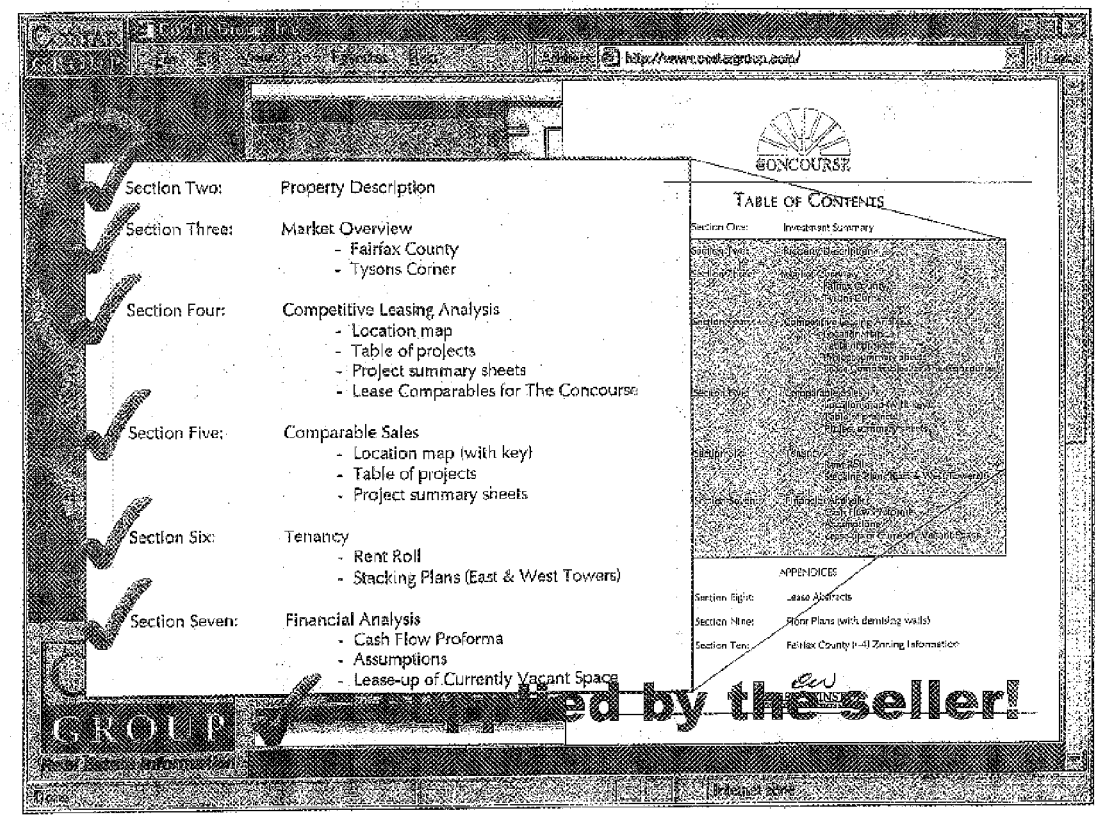

FIG. 16 shows an example of the table of contents of a prior art investment book for a high-value commercial property. As shown therein, the investment book typically includes an investment summary, a property description, a market overview, a competitive leasing analysis, information concerning comparable sales, information concerning tenancy, and a financial analysis. In a conventional setting, all of this information is supplied by the seller—an interested party. Because the seller has an interest in selling the property, this information is naturally suspect. Thus, notwithstanding the tremendous amount of effort that is necessary to compile the information, the information is ultimately of little value to a potential buyer, and must be verified with an objective provider of real estate information, or independently verified.

FIGS. 17–34 are slides that graphically depict a preferred embodiment of the system and method for collection and distribution of information according to the present invention. This system and method operate within the above-described commercial real estate market and transactional process.

Figure 17:
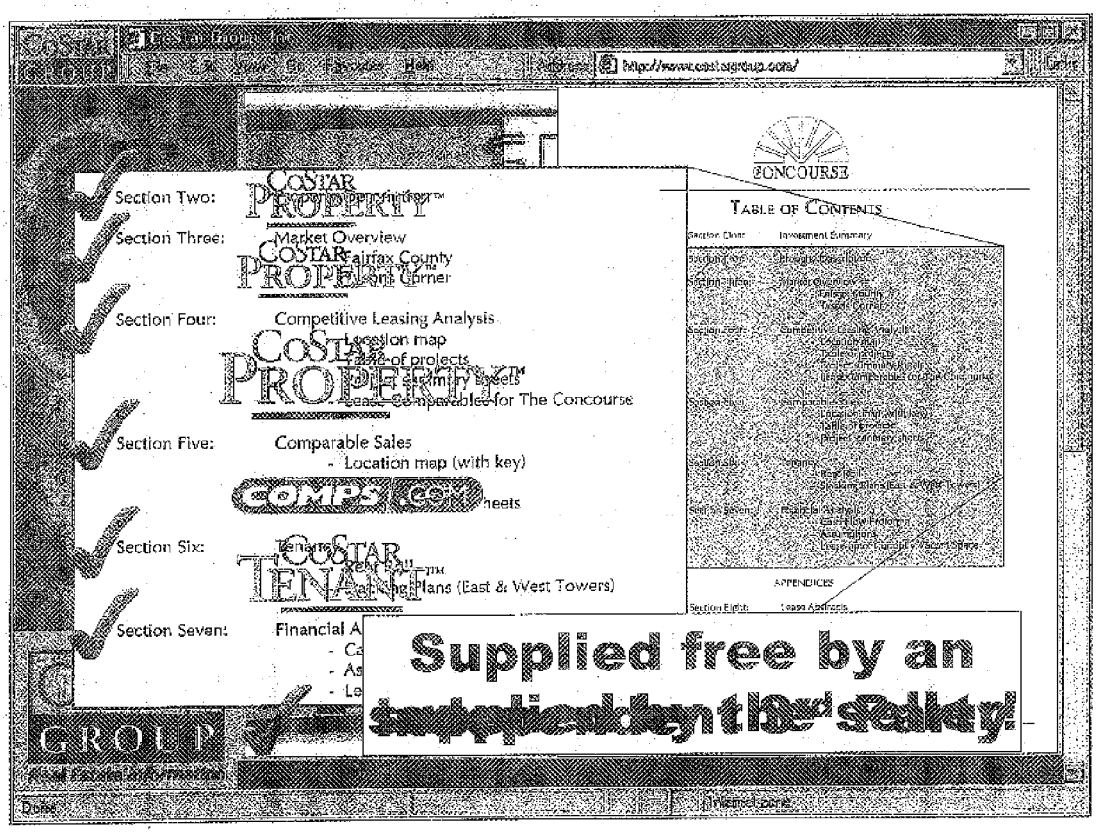
FIGS. 17–34 are slides that graphically depict a preferred embodiment of the system and method for collection and distribution of information according to the present invention.

An important aspect of the present invention is the provision of networked databases that can provide much of the information required in the investment book. FIG. 17 illustrates networked databases of a preferred embodiment of the present invention correlated to the typical contents of a prior art investment book.

Referring to the graphical depiction in FIG. 18, the system of the present invention will now be described. In the figure, the system of the present invention is referred to as COSTAR EXCHANGE™. COSTAR EXCHANGE™ is a system that allows owners to list their properties for sale on an Internet website at no cost. A generation of the product is derived from a master database, incorporating much of the data from, for example, tenant and property databases, but emphasizing the sales process as opposed to the listing process. Emphasized information includes tenant information, leasing information, and income and expense data.

Figure 18:
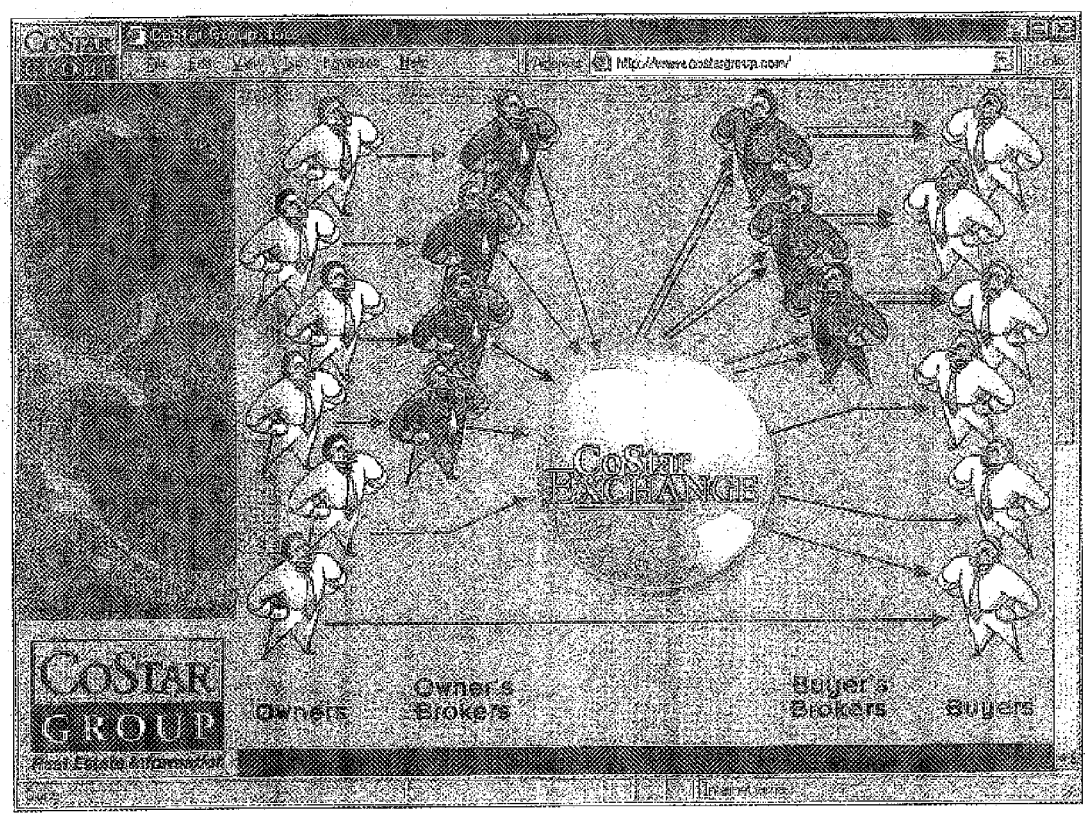

The system, i.e., COSTAR EXCHANGE™, is intended as a tool for facilitating commercial real estate transactions of various forms, as illustrated in FIG. 18. In particular, the system can facilitate transactions between owners' and buyers' brokers, transactions between owners' brokers and buyers' brokers and transactions between owners' brokers and buyers. The system currently contemplated would not be used to facilitate direct owner to buyer transactions, as indicated by the arrow passing directly from owners to buyers that that does not involve the COSTAR EXCHANGE™.

Figure 19:
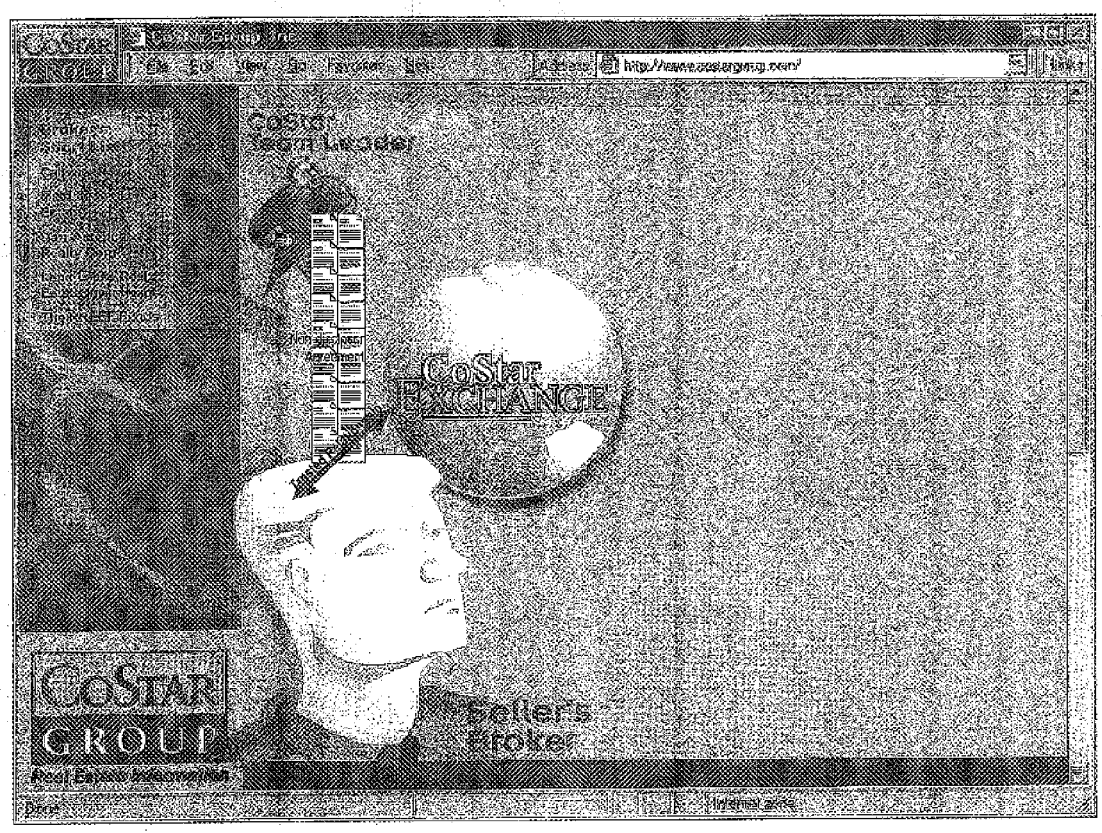

In accordance with the present invention, the system operator, in this case, COSTAR, maintains a database. The database is preferably accessible through the global information network, i.e., Internet or web. In accordance with the invention, property owners list their properties for sale in COSTAR's database without being charged. As indicated in FIG. 19, owners list properties in the database typically through a seller's broker that has a trusted relationship with the system operator of the COSTAR EXCHANGE™. Indeed, for properties worth more than $5 million, there is preferably a contractual arrangement between the system operator and the seller's broker specifying, among other things, a non-disclosure agreement. In the system of the present invention, the system operator designates a team leader to interact with each of the seller's brokers.

For certain properties, it is critically important that distribution of the information pertaining to the property be strictly limited. To most closely replicate the conventional system under which the seller's broker has complete control over to whom the property is "shown," the system includes means for limiting distribution of information on the website. More particularly, the seller's broker that has listed the property has complete control over who has access to the information pertaining to the property that they have listed. In the currently preferred embodiment, the seller's broker works with the team leader to designate individuals that are to receive the information pertaining to the property. This would typically be those buyers or brokers within the "inner circle" of the seller's broker.

Figure 20:
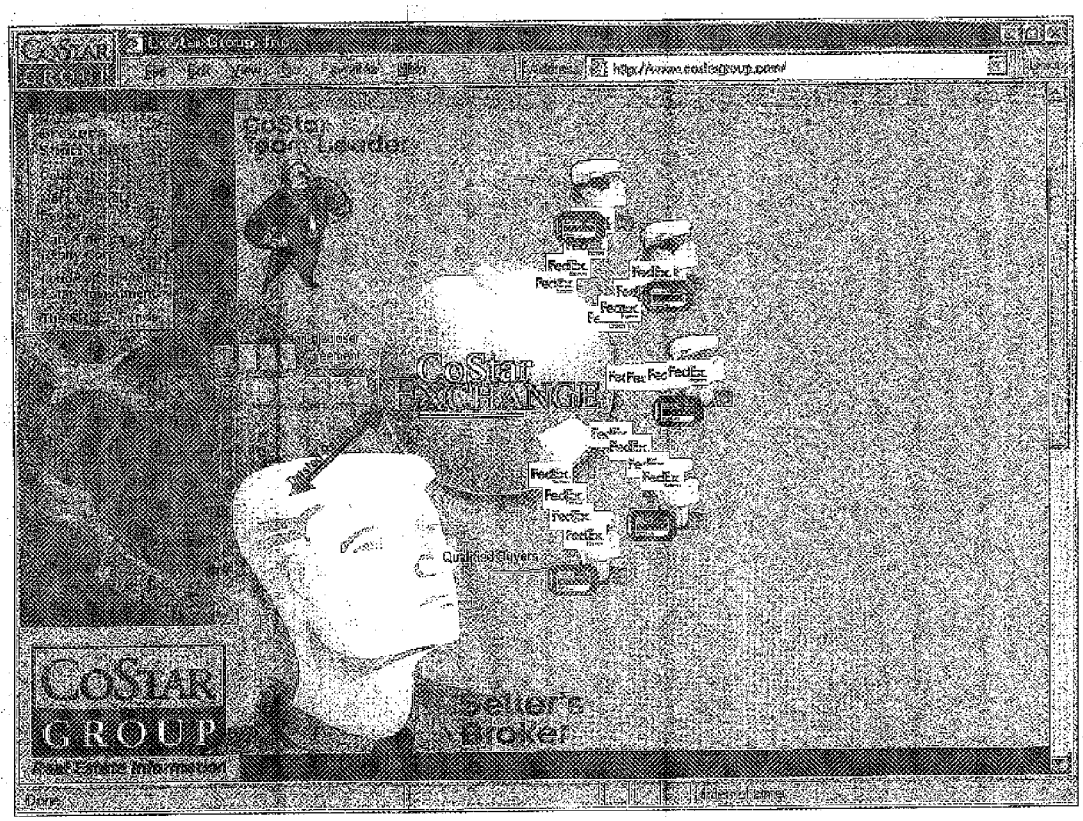

As shown in FIG. 20, the seller's broker has designated five qualified buyers to receive access to the information on the website. Often, these qualified buyers are not subscribers to the general listing features of the system, and, therefore, do not have the ability to learn of the property listing on the system.

Once the seller's broker designates the qualified buyers, the system operator sends to the qualified buyers, preferably by overnight courier, an electronic ID, along with instructions for accessing the system. The qualified buyers use the electronic key to gain access to property listing.

Figure 21:
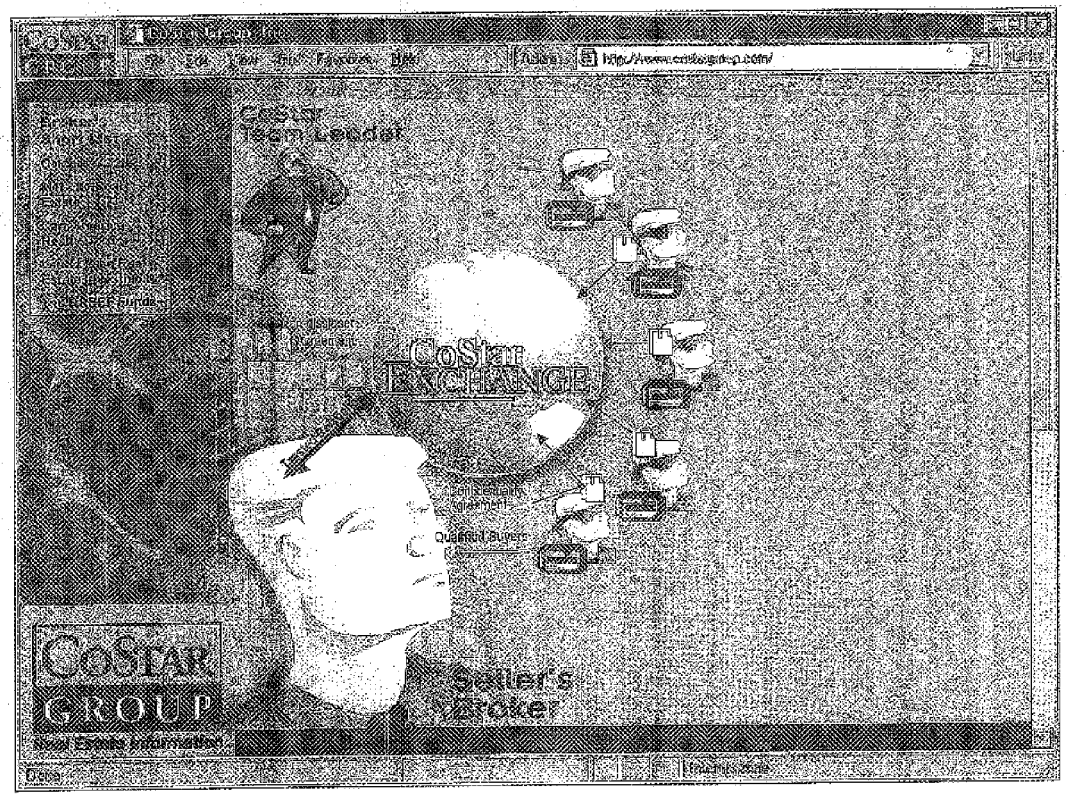
Figure 22:
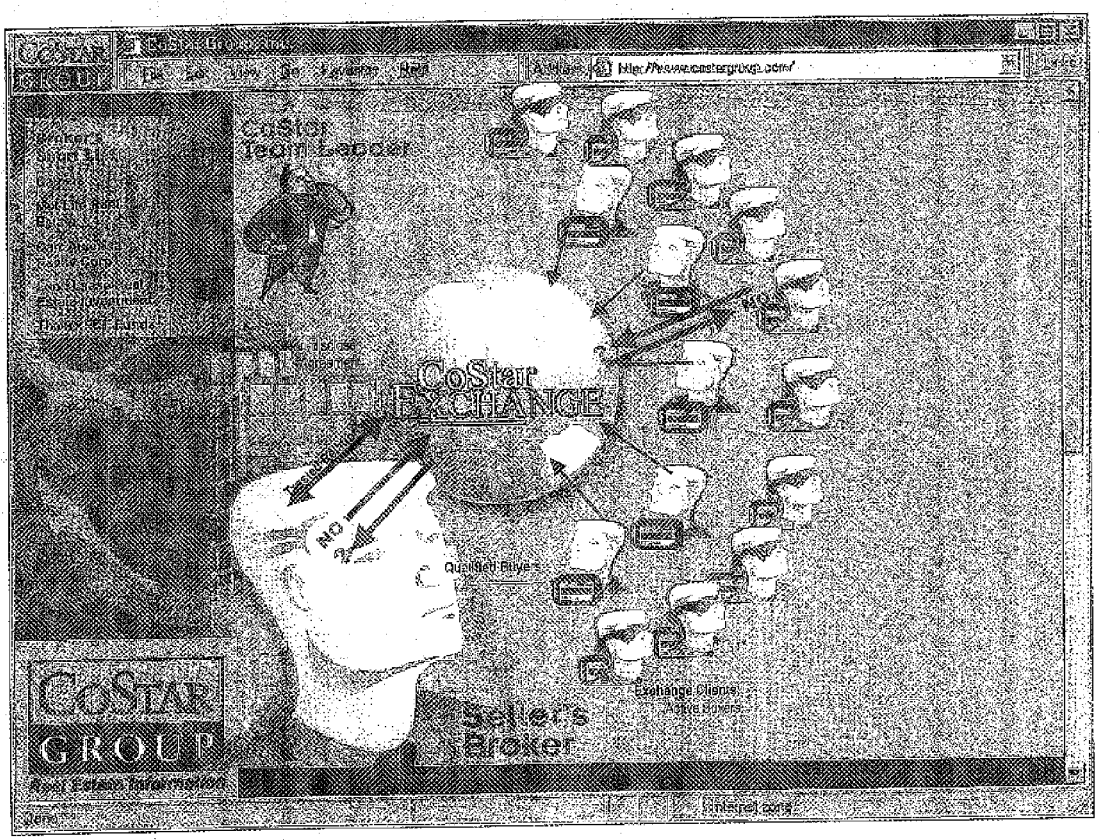

Optionally, before the qualified buyers are allowed to view the information pertaining to the property, the system requires the qualified buyers to first enter into a confidentiality agreement. Preferably, the qualified buyers enter into the agreement by electronically executing and submitting an online confidentiality agreement as indicated in FIG. 21. Executing and submitting the confidentiality agreement could occur, for example, by clicking-through an "accept" button for an agreement posted online or by exchanging electronic documents having electronic signatures. Upon receipt of the executed confidentiality agreement, the system operator allows qualified buyers to access the information pertaining to the property, using the electronic key as described hereinafter. FIG. 22 graphically indicates that the qualified buyers now have access to the system by showing the buyers with their blindfolds removed.

In accordance with another aspect of the present invention, the system operator has a plurality of clients (i.e., subscribers), who presumably are paying for access to information on the COSTAR EXCHANGE™. These exchange clients are active buyers and brokers of buyers of investment properties. Since COSTAR EXCHANGE™ preferably lists a wide variety of properties, including many properties that are not subject to the confidentiality concern, these exchange clients are assumed to routinely query the system for properties meeting certain descriptions, and, indeed, the system allows such queries.

In accordance with an important aspect of the present invention, when a confidential property meets the needs of one of these exchange clients, that fact is indicated in a general way without providing information that would allow the exchange client to easily identify the specific property. In other words, the exchange client is notified that there is a property in a particular city meeting the exchange client's requirements, but he is not told what that property is or who the seller's broker is. As clients of COSTAR, however, exchange clients all have access to the system as indicated by the graphical depiction of the ID key. Thus, in FIG. 22, the exchange clients are shown as a second ring of potential buyers that do not yet have access to the specific information concerning the building, as indicated by the blindfolds, but can learn of its existence.

In accordance with an important aspect of the present invention, if one or more of the clients are interested in learning more about the property, they can indicate their interest through e-mail or alternative communication directed to the system operator. The system operator will then forward the inquiry to the seller's broker so that the seller's broker can determine whether or not the particular client will receive access to the information. In the example shown in FIG. 22, the seller's broker, in response to the query, has determined not to disclose the details of the property to the exchange client that requested information. This "no" answer is conveyed, by the system operator, to the exchange client that raised the request, as indicated by arrows in FIG. 22. The system, therefore, does not divulge the property listing to the denied client.

Figure 23:
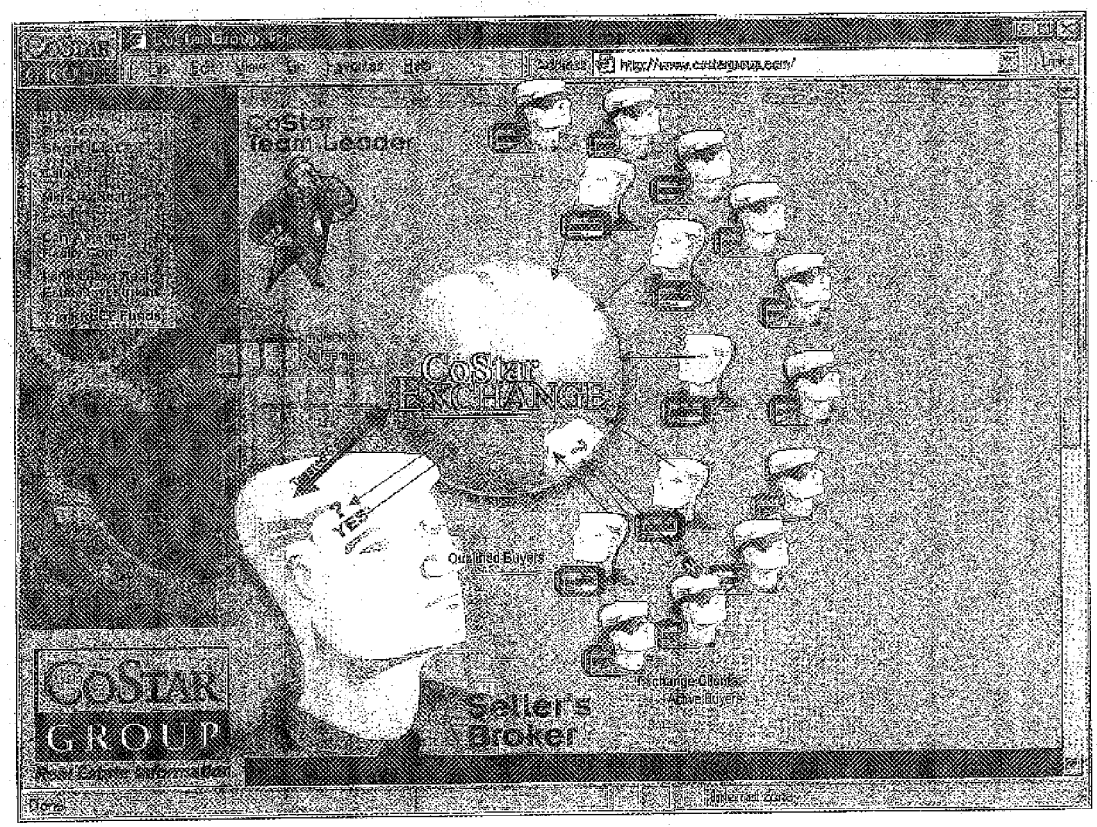

FIG. 23 shows an alternative arrangement in which the seller's broker has indicated "yes" to the request for information. In response to this "yes" indication, the system operator grants the accepted client access to the property listing.

Optionally, before the system grants the accepted client access, the system provides the newly authorized potential buyer with a confidentiality agreement. After executing and submitting the confidentiality agreement, the system allows the newly authorized potential buyer to access to the listing for that property. Preferably, the newly authorized potential buyer enters into the agreement by electronically executing and submitting an online confidentiality agreement. Executing and submitting the confidentiality agreement could occur, for example, by clicking-through an "accept" button for an agreement posted online or by exchanging electronic documents having electronic signatures.

Figure 24:
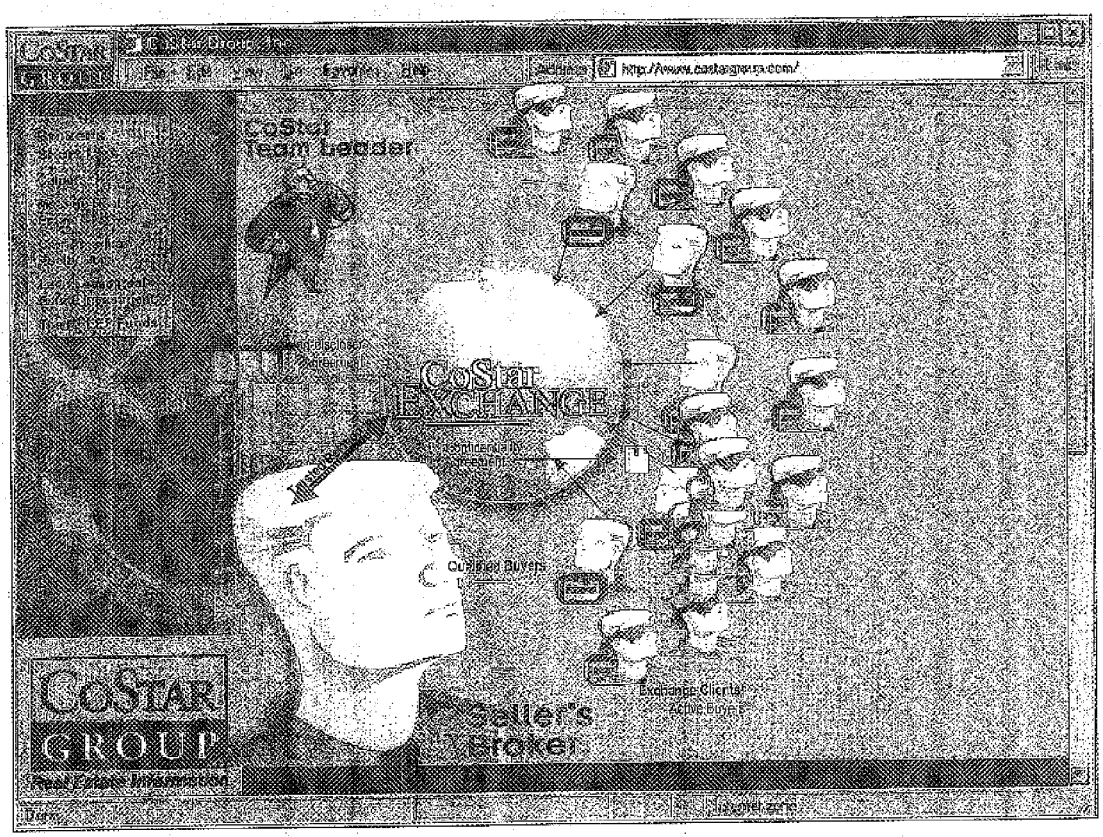
Figure 25:
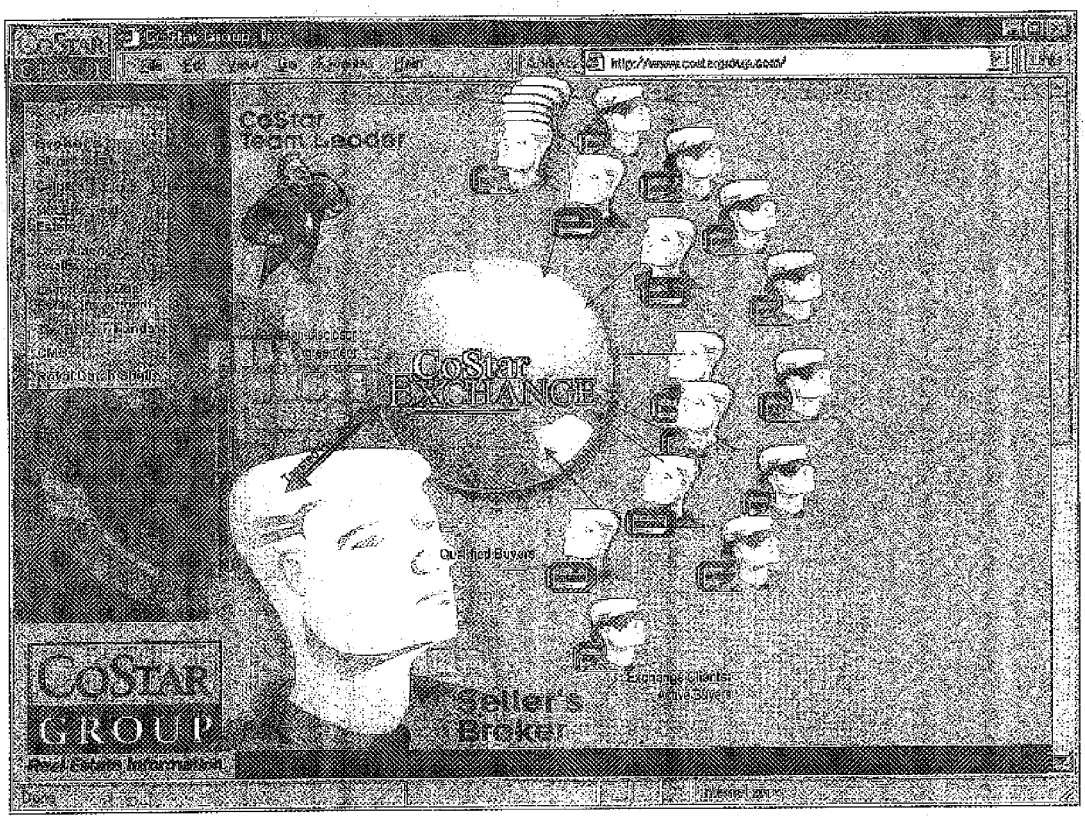

FIGS. 24 and 25 illustrate this aspect of the present invention. FIG. 24 shows, graphically, the confidentiality agreement being provided to the newly authorized buyer. FIG. 25 shows that having executed and submitted the confidentiality agreement, the newly authorized buyer moves into the inner circle and has his blindfold removed so that he can see the information. In this way, the pool of qualified buyers can be greatly increased, but the seller's broker still maintains complete control over who is allowed to see the listing. Thus, the present invention allows the seller's and seller's brokers to access a far greater pool of qualified buyers without the highly undesirable act of distributing the information to all interested parties.

It will naturally be appreciated that this system of information distribution is useful in contexts other than the commercial real estate context, such as purchases of business enterprises.

In accordance with yet another aspect of the present invention, the listings on the system are made available not only to qualified buyers and clients of the system, but to all potential buyers so as to encompass an extremely wide pool of potential buyers.

Figure 26:
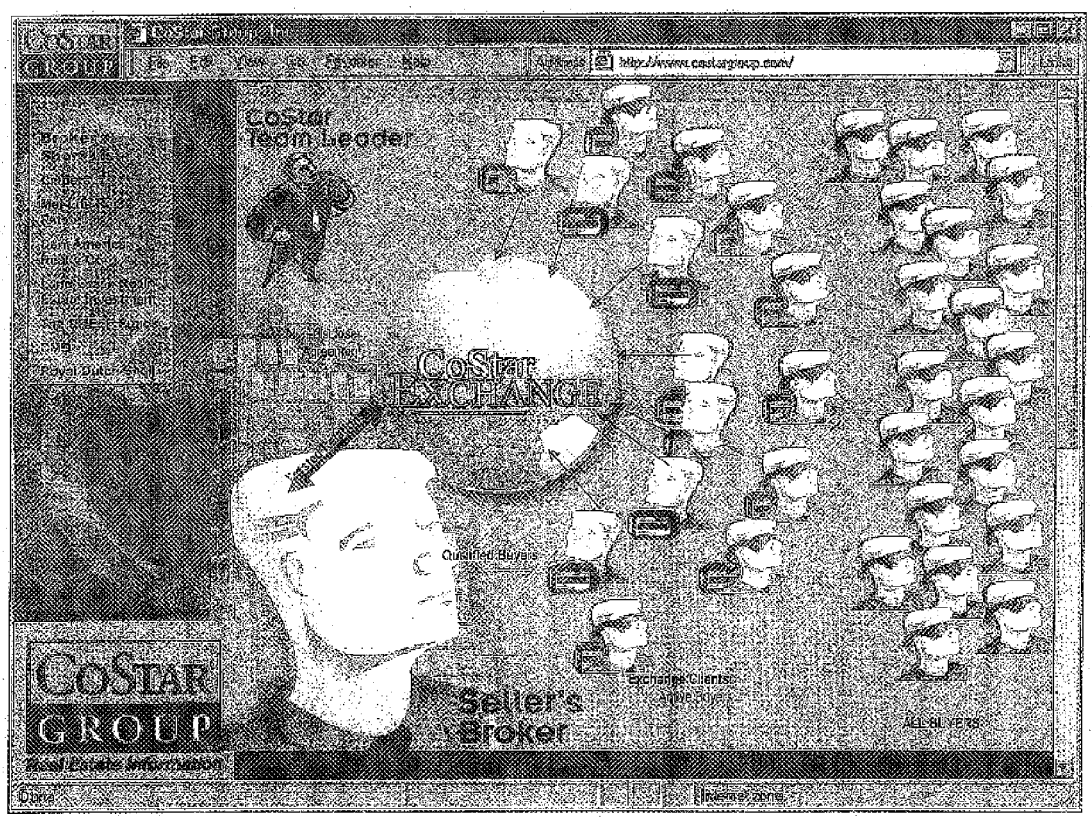

In the preferred embodiment of the present invention, the pool of potential buyers that are not clients of the system is given limited access to the database and can be allowed more detailed access on a pay-per-view basis, for example. As indicated in FIG. 26, this large pool of buyers does not have detailed access to the listing, but could be allowed access, or the opportunity to gain access to learn of the existence of the listing. The lack of detailed information, is, again, indicated by the blindfold on the depiction of the potential buyer in FIG. 26.

In accordance with the preferred embodiment of the present invention, the more wide spread dissemination of the information may be delayed for a period of time to allow preferential access to persons within the seller's inner ring, or to exchange clients. This is not required, however, and the pool of potential buyers could be extended immediately.

Figure 27:
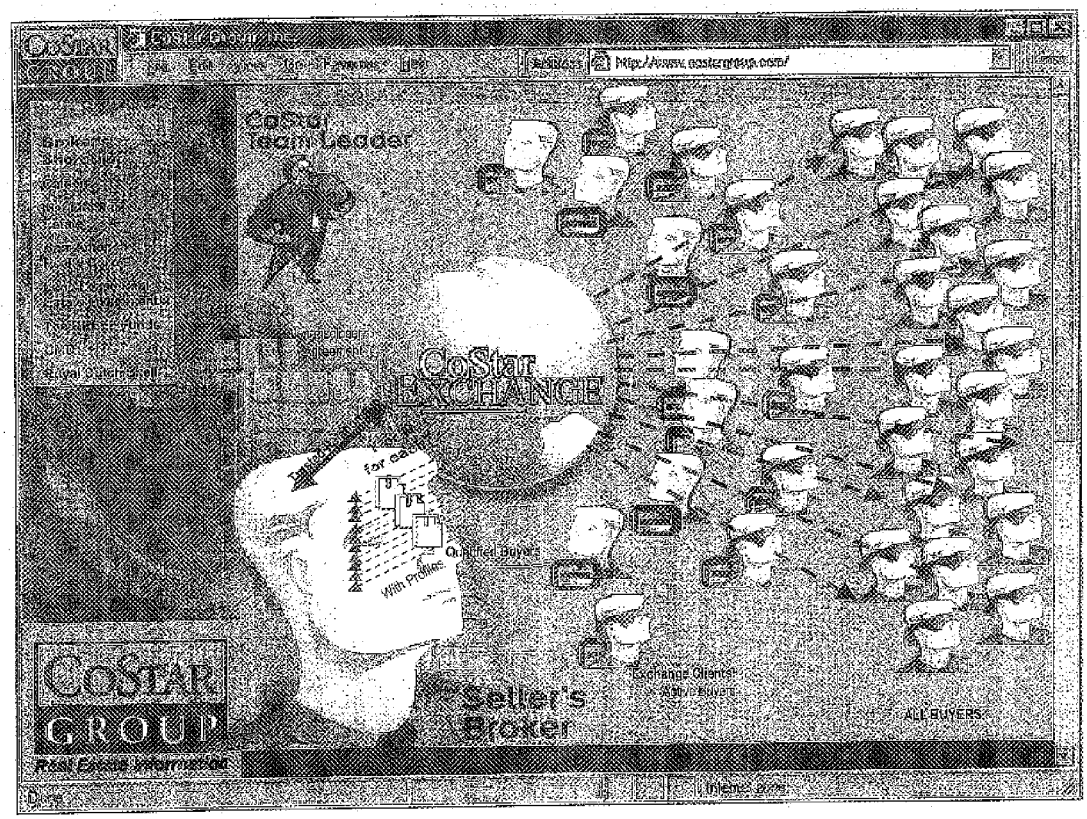

As shown in FIG. 27, through COSTAR EXCHANGE™, the existence of a listing, without the details of the listing, is disseminated to the entire pool of potential buyers as shown by the broken arrows. Any interested buyers can send an expression of interest or a request for information query back to the COSTAR EXCHANGE™, and, since these potential buyers are not current clients, the system operator obtains a profile of the potential buyers and transmits the request along with the profiles to the sellers brokers for a determination of which, if any, of the requesting potential buyers should receive access to the information.

Figure 28:
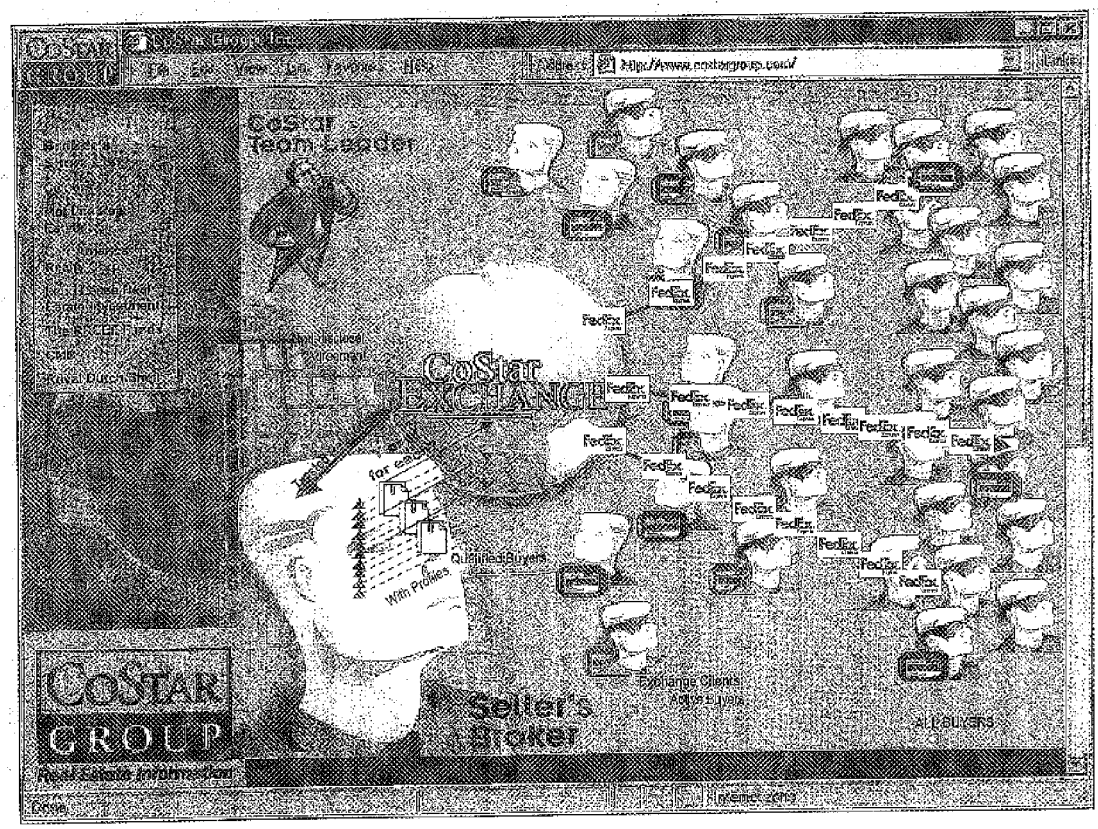
Figure 29:
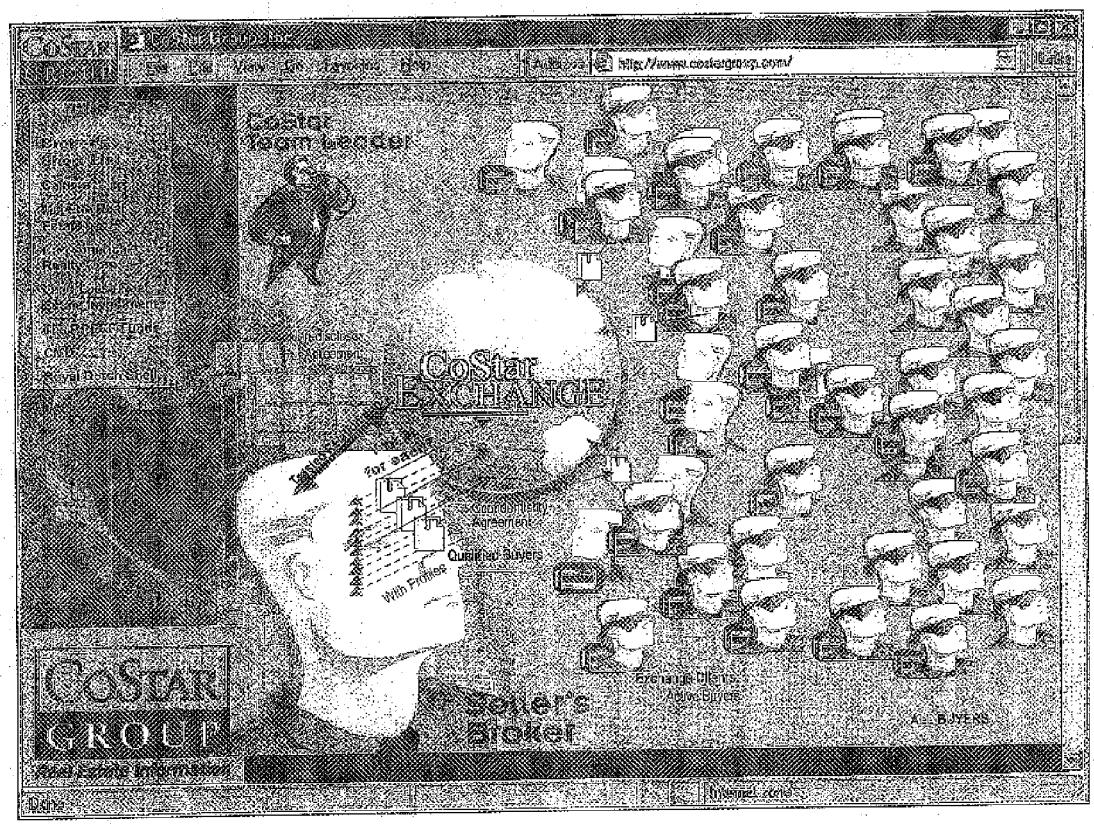
Figure 30:
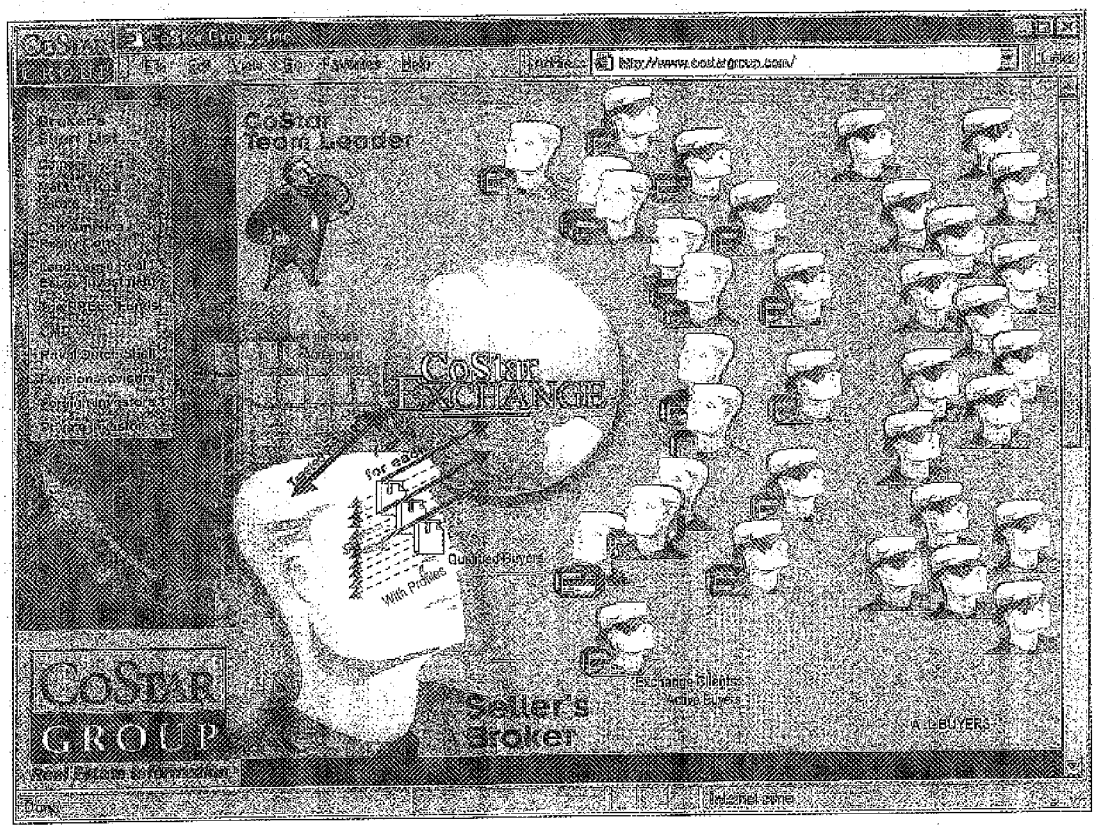
Figure 31:
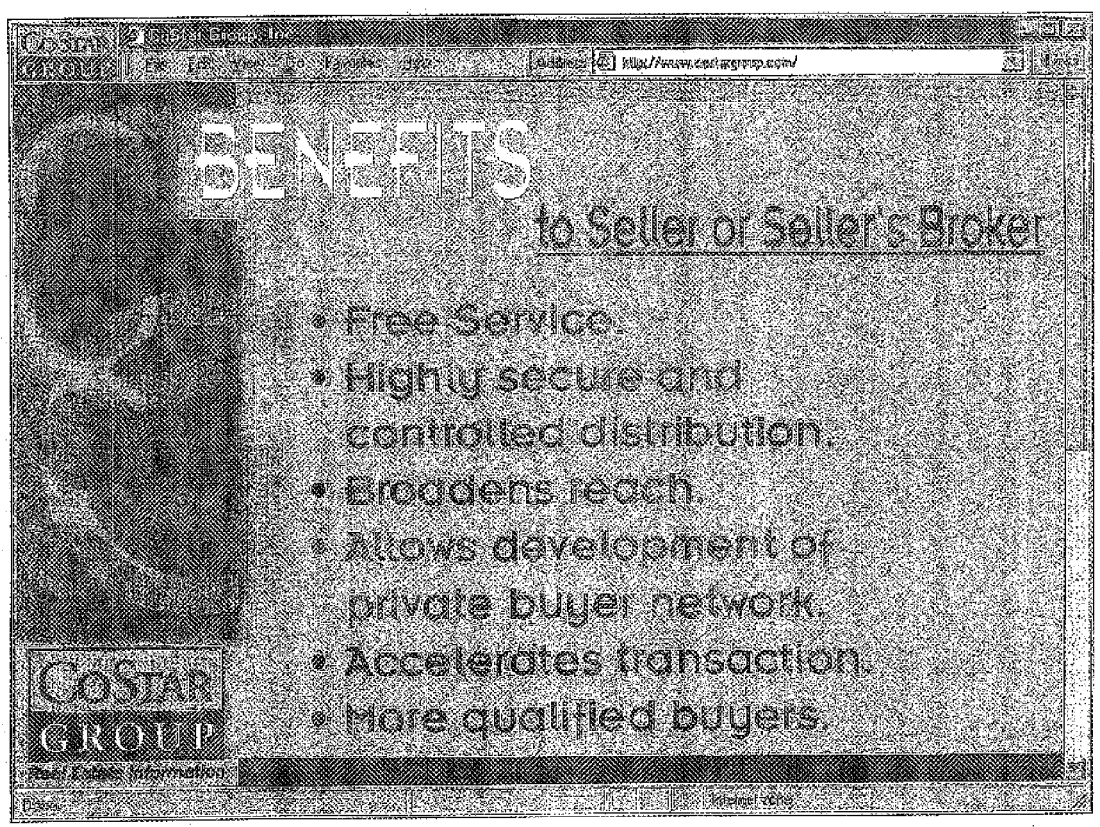

As before and as shown in FIG. 28, for those buyers to which the seller's broker has authorized distribution of the information, a packet containing an ID key is sent to the potential buyer. As shown in FIGS. 29 and 30, after first executing and submitting confidentiality agreements (if so required), these potential buyers are moved into the inner circle of qualified buyers who can obtain access to property information. FIG. 30 depicts these potential buyers moved into the inner circle with their blindfolds removed. In this way, the entire pool of potential buyers can be brought into the bid process, but only to the extent authorized by the seller or seller's broker.

It should be apparent that the system of the present invention provides numerous benefits and creates great efficiencies in the commercial real estate market.

The benefits to the seller or seller's broker include the fact that the listing service is free. In addition, the distribution of information leading to their property is highly secure and controlled closely, and is at the seller or seller's broker's complete discretion. In addition, the system broadens the reach of their offering without tarnishing the value of the offering. The system also allows the development of a private buyer network, i.e., allows the seller's broker or seller to increase their inner ring of buyers by identifying new qualified buyers with whom the seller's broker or seller may not have previously had a relationship. In addition, the system greatly accelerates the transaction and brings buyers that are more qualified into the system, which is likely to provide a more competitive market for the seller and, thus, bring the seller a higher price. The benefits are summarized in FIG. 31.

Figure 32:
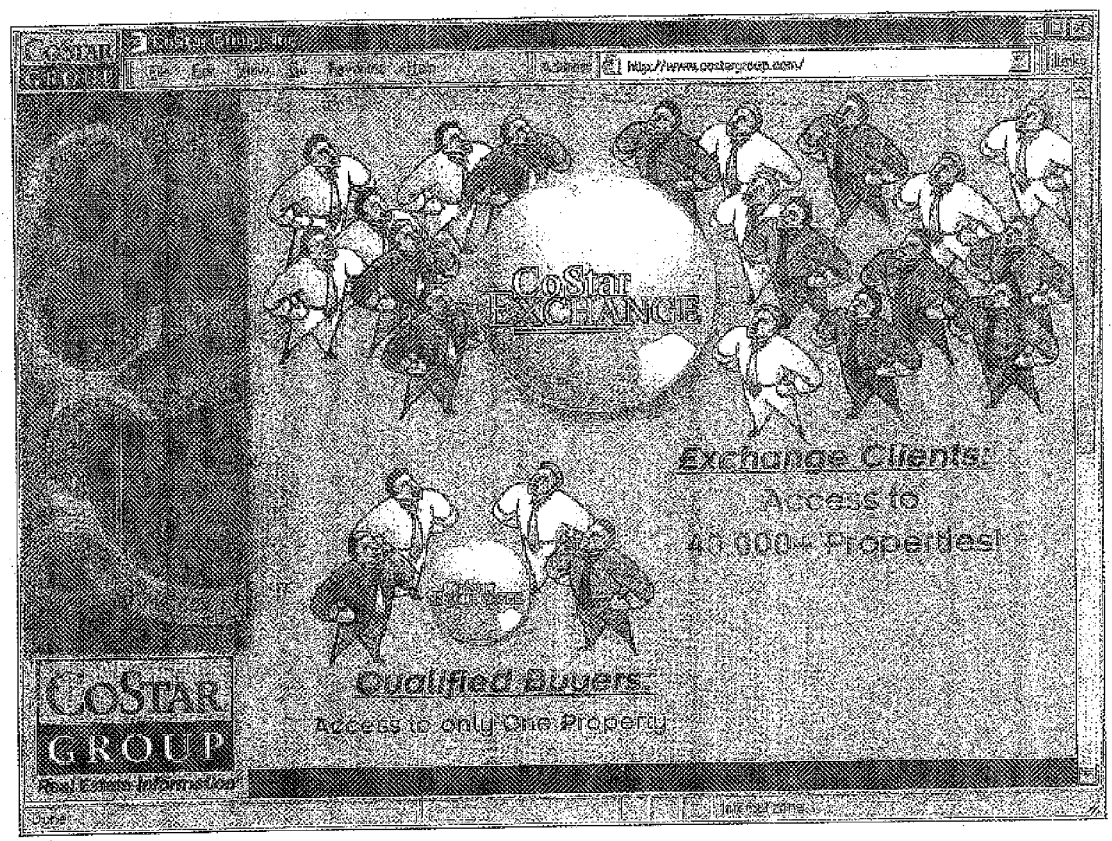
Figure 33:
Figure 34:
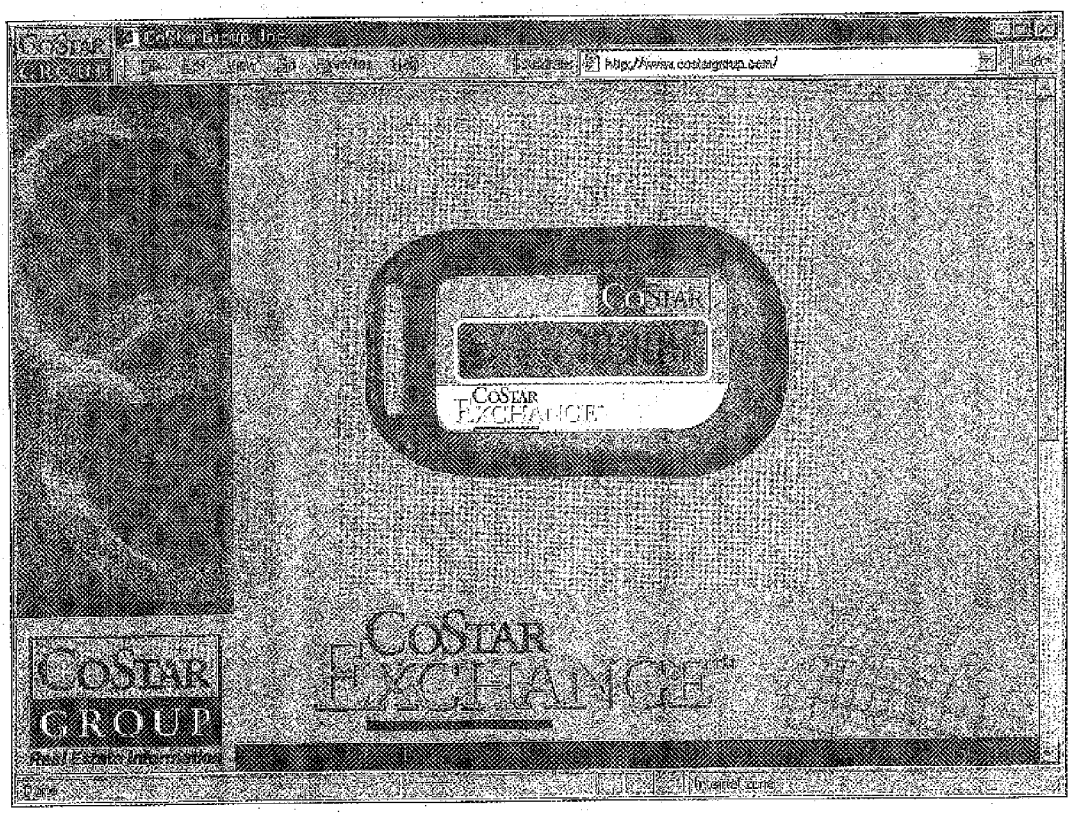

As indicated in FIG. 32, the system also provides benefits to qualified buyers. In particular, in the current system, the qualified buyer may have access to only the properties of select agents that place that qualified buyer into their inner circle. And, in connection with the present invention, the persons within a particular participating seller's inner circle are allowed access to a single property on COSTAR EXCHANGE™. However, there is a great benefit for potential buyers to become clients of the system, in that they will have access to over 40,000 properties.

There are numerous possible sources of operating revenue for the system operator using the system in the present invention. In particular, as summarized in FIG. 33, the system operator can obtain revenue through a subscription service by charging for access to the system. In addition, the system operator can obtain revenue through banner advertising and lender referral fees. In addition, the system operator could obtain revenues through buyer/seller matching fees, click-through revenue, and fees for enhanced listings on the database. Also, the system operator obtains value through information posted onto the system since it memorizes the cost of independently obtaining such data.

In accordance with the present invention, the ID key (shown in FIG. 34) includes a unique serial number printed on the back and generates a six-digit password that changes at a predetermined frequency, preferably once every minute. Thus, the user's ID is always changing so that it provides a high level of security.

The system of the present invention also facilitates mortgage lending. For example, using the information concerning the building characteristics and the information concerning prospective borrowers that is maintained within the system, the system facilitates matching borrowers with lenders. Alternatively, the system can list all available lenders, either generally or only those lenders that are willing to borrow money from a particular property, and the borrower can click on a particular lender and obtain information or submit information for loan pre-approval. In addition, the system functions as a due diligence tool for lenders, providing the information necessary to determine whether to provide a loan to buy a building, based on information about the building.

As a further aspect of the present invention, a lending product is provided on COSTAR EXCHANGE™ that lists every lender that CoStar tracks. The present invention enables customers to click on a lender's name in the list to request a free package of materials free from that lender. COSTAR EXCHANGE™ facilitates this communication between the customer and a prospective lender.

The remaining figures illustrate a graphical presentation and description of the present invention, as well as a series of screen images presented during operation of the invention. The screen images provide a self-evident and exemplary description of the flow through the system by a user as detailed hereinafter.

Website Operation

Figure 35:
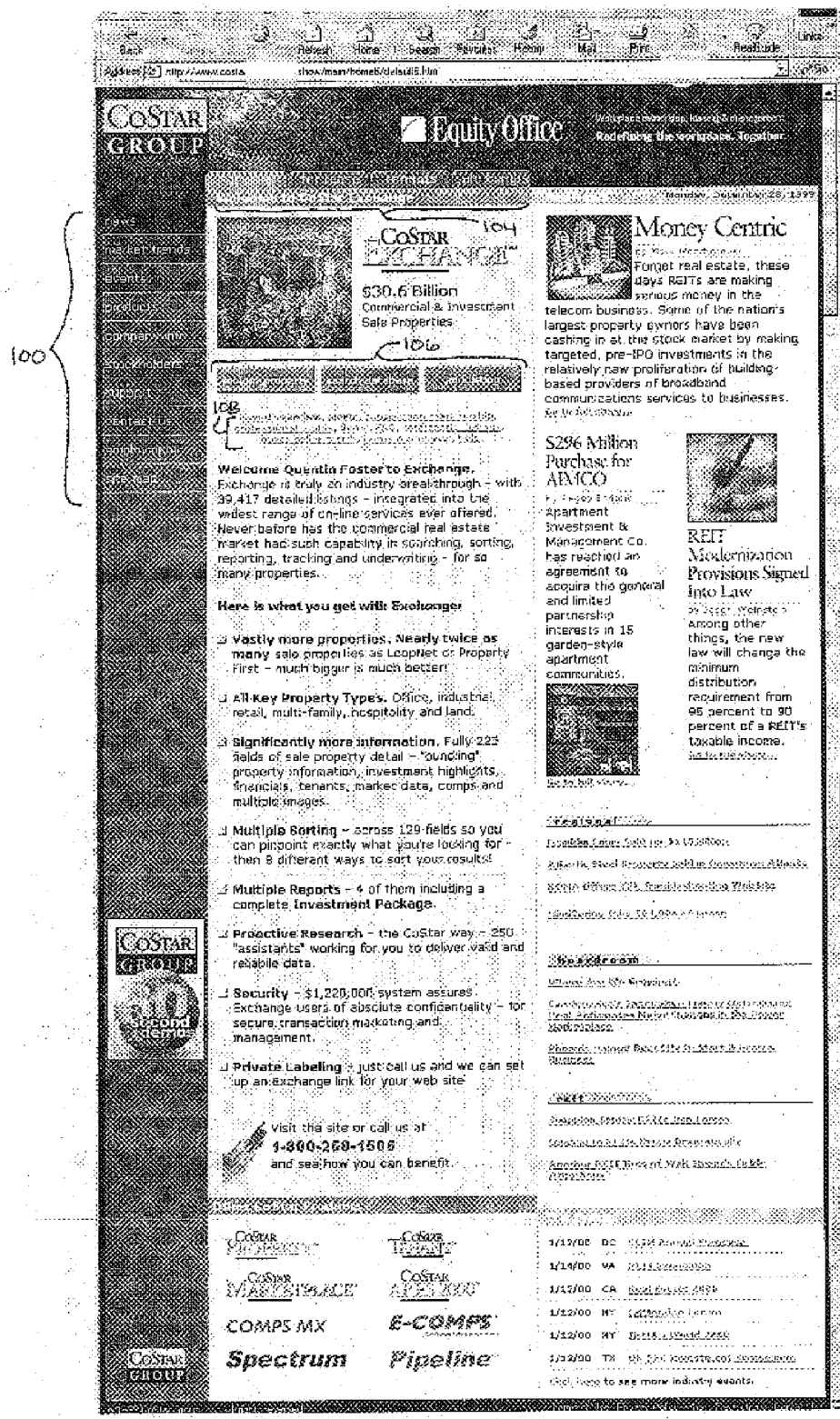

In a preferred embodiment, the website operates in the following manner. Through an Internet connection provided by an Internet service provider, a user enters the Internet address of the present invention to access the website of the present invention. To ensure secured access, the website presents the user with a login page, requesting a user name and password. Once the user enters an authorized user name and password and agrees to the Terms of Use, the website presents a homepage, as shown in FIG. 35, with the following features. One section of the homepage includes a menu 100 with labeled buttons, such as 'News,' 'Market Trends,' 'Events,' 'Products,' 'Company Information,' 'Stockholders,' 'Technical Support,' 'Contact Us,' 'Employment,' and 'Site Map.' By clicking on a button, a user can obtain more information and further sub-menus on the labeled topic. Another section of the homepage lists summaries of news articles 102 related to the commercial real estate industry. In this section, the homepage provides additional buttons and links to further information concerning the news articles. The final section of the homepage presents a group of structured tabs 104 that a user can click through to access the functions of the present invention. The structured tabs subdivide the functions of the present invention into four categories: (1) For Sale, (2) For Lease, (3) Tenants, and (4) Sale Comps.

Under the For Sale structured tab, a user has three primary functions 106 and several secondary functions 108. The primary functions 106 are represented by buttons through which the user can click to access the functions. The three primary functions are Lookup Property, Search Database, and Add Listing. The secondary functions include, but are not limited to, Saved Searches, Alerts, Membership, Professional Profile, Demonstration, Frequently Asked Questions (FAQ), Confidential Listings, Buyer-Seller Match, Forms & Contracts, and Help.

Figure 36:
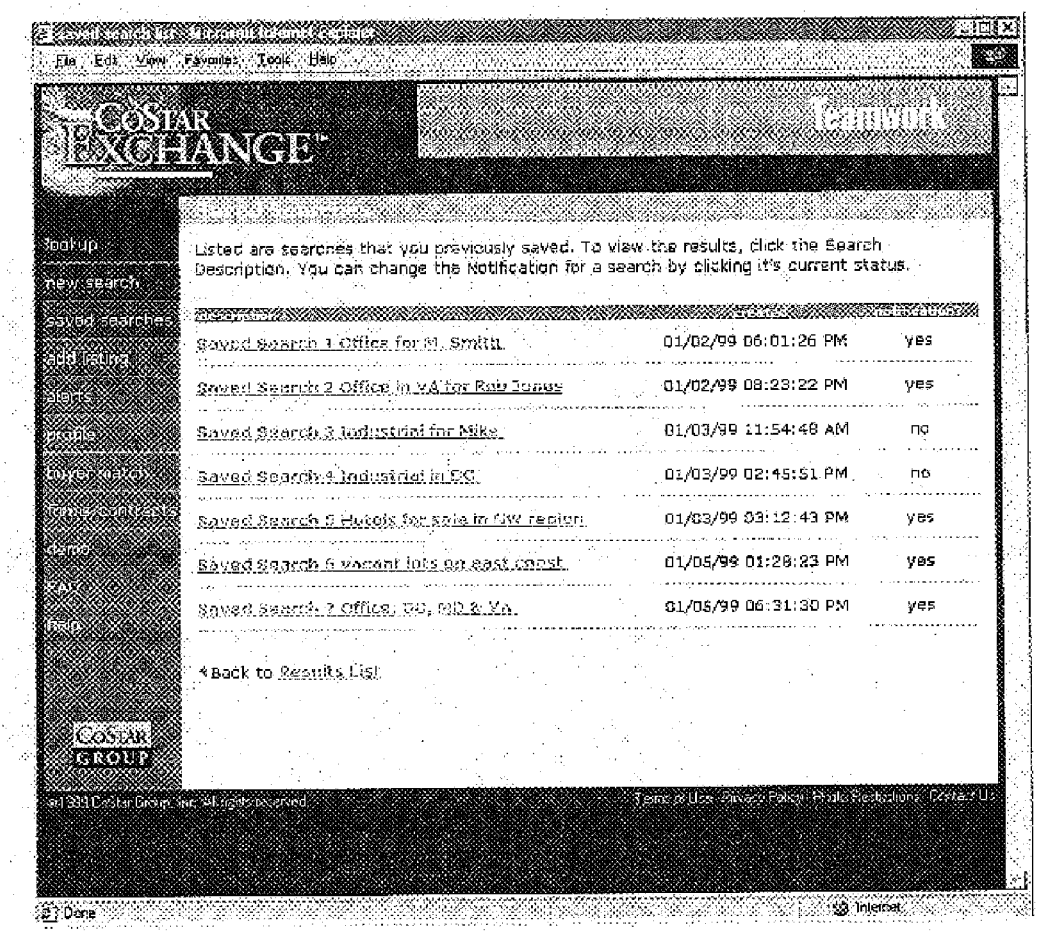

By clicking through Saved Searches, a user can view a list of searches that were previously saved, as shown in FIG. 36. The list includes a description of the search, the date and time the searches were created, and whether or not an alert notification was activated (to be described below). A user clicks on the description of the search to view the results of that search. A user can also change the alert notification of a search by clicking the check box on the list. Finally, a user can delete a search by clicking on a delete button (not shown).

Figure 37:
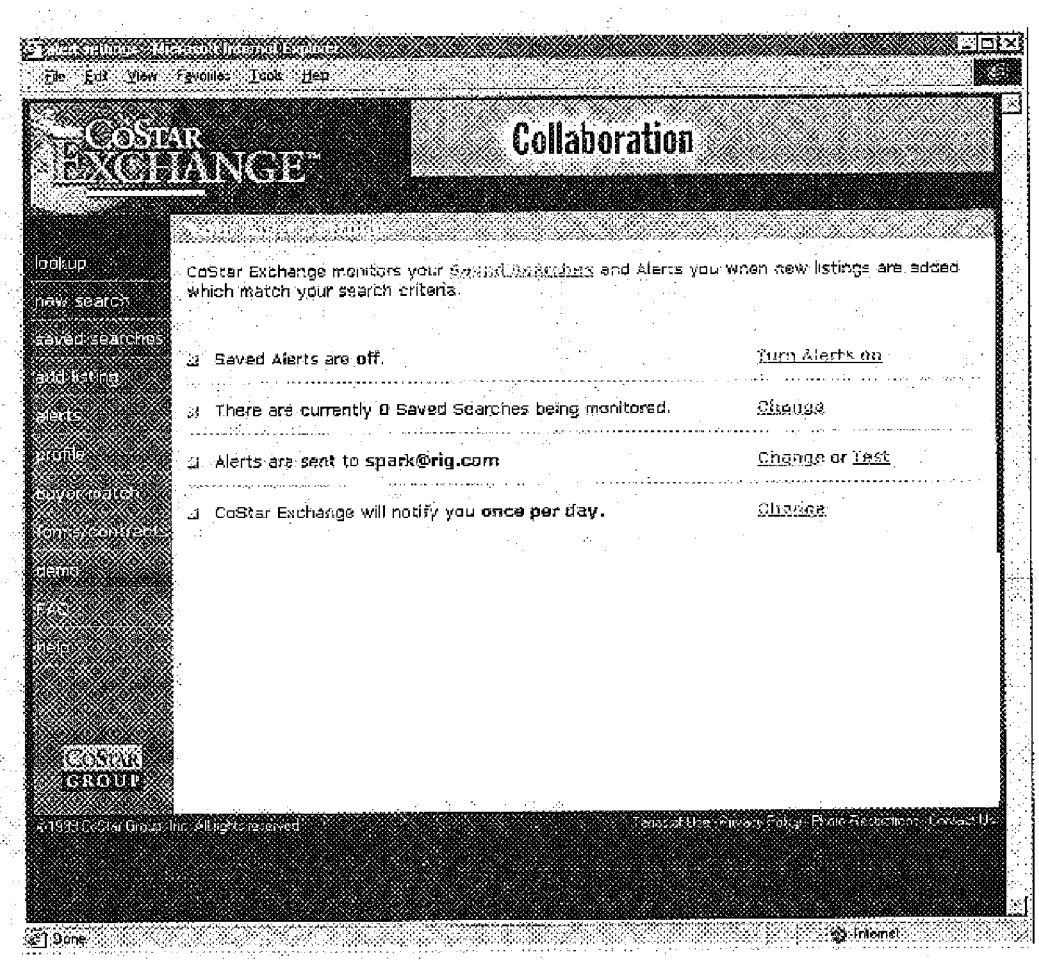

Returning to the homepage, under the For Sale structured tab, clicking on the secondary function Alerts presents the user with that user's Alert settings as shown in FIG. 37. The present invention monitors the saved searches and alerts a user when new listings are added that match the existing saved search criteria. There are four Alert settings: (1) an on/off indicator to activate or deactivate the Alert feature, (2) the number of saved searches being monitored and which individual searches are being monitored, (3) the e-mail address to which the Alerts are sent, and (4) frequency with which alerts are sent (e.g., once per day). From the Alert Setting page, a user can click on the appropriate buttons for each of these settings to change them as desired.

Figure 38:
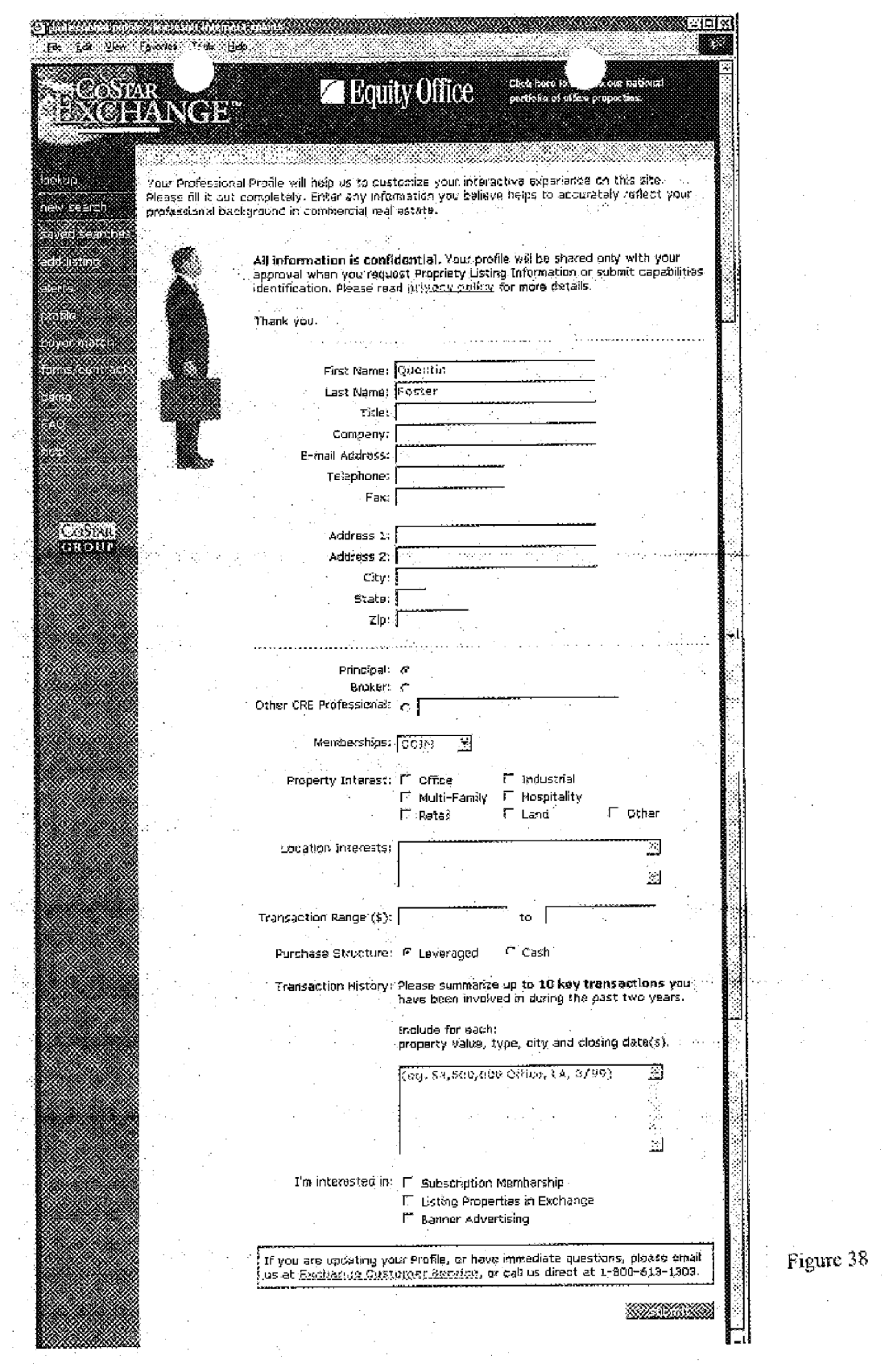

Returning again to the homepage, by clicking through the secondary function Membership, a user can view his or her membership status. Also from the homepage, by clicking on the Professional Profile secondary function a user can access her professional profile, as shown in FIG. 38, which includes information that the present invention uses to customize operation of the website according to a user's particular professional background in commercial real estate. The profile information is used to alert the user to new or updated properties of the website operation, which the user might find useful. On the Professional Profile page, the present invention presents various data entry fields prompting for such information as the user's name, title, company website, business e-mail address, and other contact information. The Professional Profile page also asks for information describing the user such as the type of customer the user is (e.g., owner, individual, investor, corporate, or seller), the type of property the user is typically interested in purchasing, the investment range the user anticipates, the type of financing the user will use (leveraged or all cash), the locations in which the user is interested, recent transactions completed by the user, and the annual transaction activity targets of the user. The Professional Profile page also enables a user to indicate interest in subscription membership, listing properties, and banner advertising.

Returning to the homepage, under the For Sale structured tab, a user can click through the Demonstration button to view an example operation of the website for tutorial purposes. Also from the homepage, a user can click through the Frequently Asked Questions, or FAQ button, to view more information for tutorial purposes.

Figure 39:
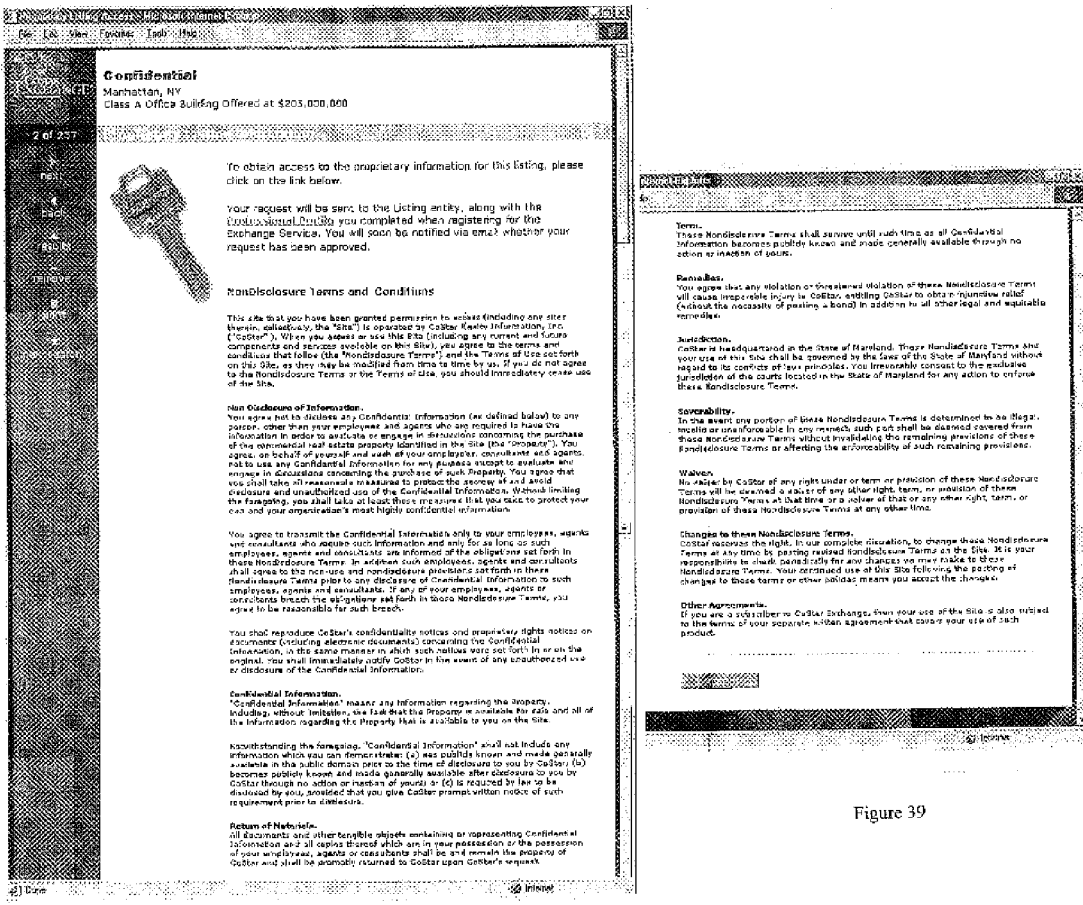
Figure 40:
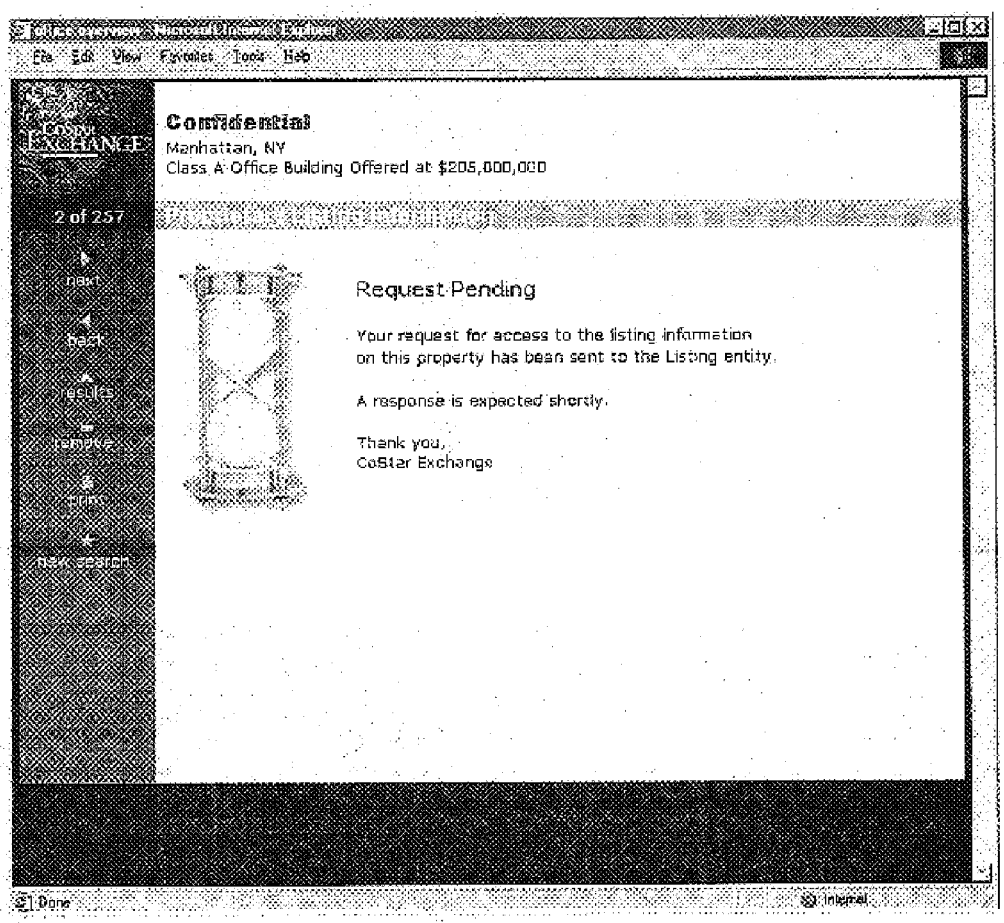
Figure 41:
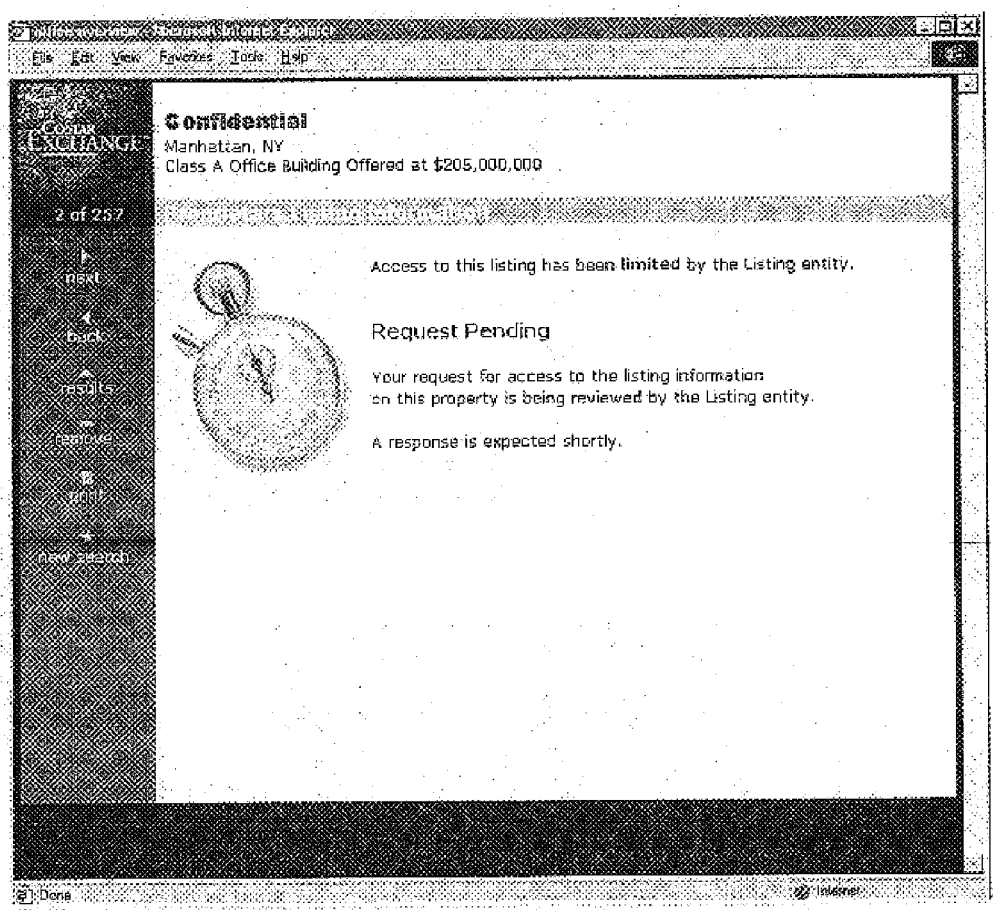
Figure 42:
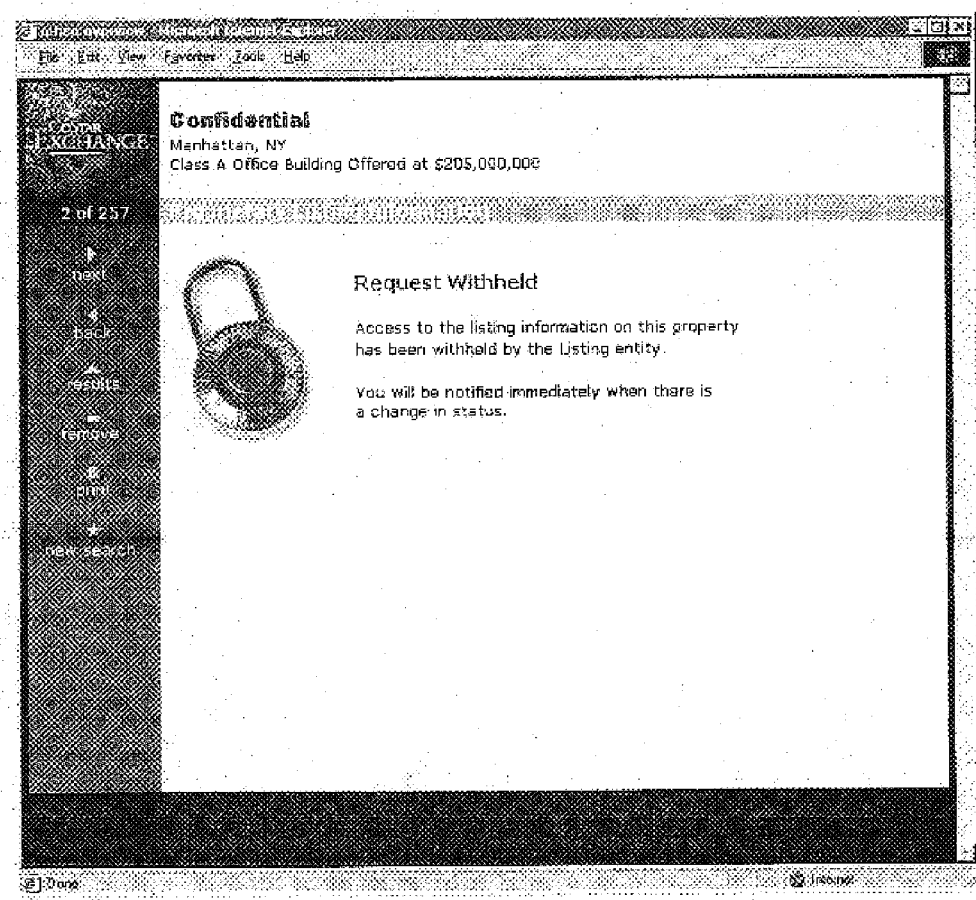

From the homepage, under the For Sale structured tab, a user can click through the Confidential Listings button to view real estate information maintained in secured access. After the Confidential Listings button is clicked, the website presents a Proprietary Listing Information access page, as shown in FIG. 39. The website maintains secured access to the proprietary listings. A user must enter a valid password and have a professional profile on file. In this manner, the present invention can forward the user's (potential buyer) information to the listing entity to initiate the unique buyer-seller matching feature. Once the user enters a valid password, the website displays a Request Pending screen, as shown in FIG. 40, and contacts the listing entity to request access for the user/buyer. As shown in FIG. 41 and 42, the website returns a results page indicating whether the listing entity has approved the user's/buyer's request. FIG. 41 shows access that has been limited, while FIG. 42 shows access that has been withheld. If access is approved, admitting the buyer into the "inner-circle," the website presents the subject property on a Property Details page (described below).

Also from the homepage under the For Sale structured tab, a user can click through the Buyer-Seller Match button to view real estate listings that match buyer criteria or seller criteria. Also from the homepage, a user can click through the secondary function of Forms & Contracts to view, download, and print standard documents used in the commercial real estate industry. This feature also autopopulates the documents with appropriate buyer, seller, and proprietary information.

Finally, under the secondary functions listed on the homepage under the For Sale structured tab, a user can click on the Help button to receive technical information concerning the operation of the website as well as administrative information concerning enrollment in the use of the present invention.

Figure 43:
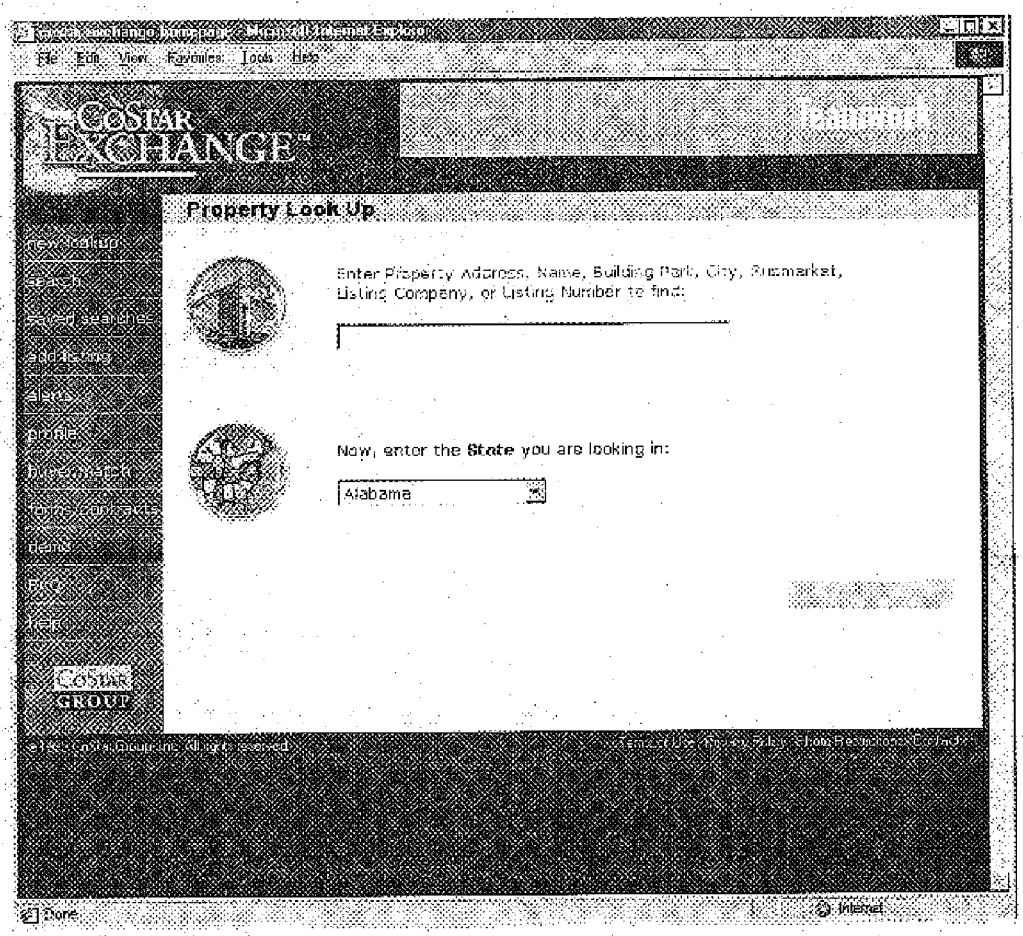
Figure 44:
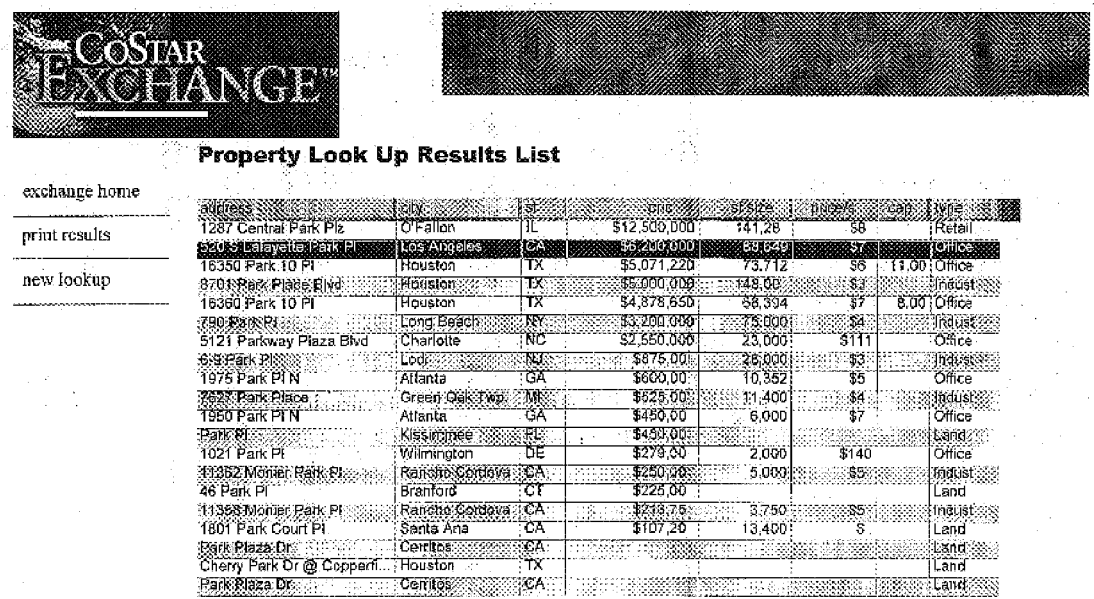

Turning attention to the primary functions of the For Sale structured tab, by clicking on the Lookup Property button on the homepage, a user can search for a particular property. After clicking through this button, the present invention presents a Property Lookup page, as shown in FIG. 43, which asks for the property address, property name, listing number, building park, city, sub-market or listing company of the property to be found. The Property Lookup page also asks the user for the state in which the property is located. As an example of a property lookup, a user can enter the name "Park Place" in the data entry field for the property name. Then, when the user presses a Get Results button, the website returns a property lookup results list listing (FIG. 44) all of the properties in the database with the name "Park Place." The property list includes information such as address, city, state, price, square foot size, price per square foot, cap rate, and type of property (e.g., office, industrial, and land). As an example of another property lookup, to narrow the search, a user could specify the state in which "Park Place" property resides, for example, New York. With this search criteria, upon clicking through the Get Results button, the user would view a property lookup results list containing only the entry that reads "790 Park Place, Long Beach, N.Y." in FIG. 44. After entering the search criteria and viewing the property lookup results list, a user can double-click on a property listing to obtain the details about that property, including an overview of the property, financial information, tenant information, market statistics, comps, and a map of the area in which the property resides. During operation of the property lookup function, the present invention provides a menu on the screen for ongoing options such as Return to Homepage, Print Results, or Enter a New Lookup Criteria.

Figure 45:
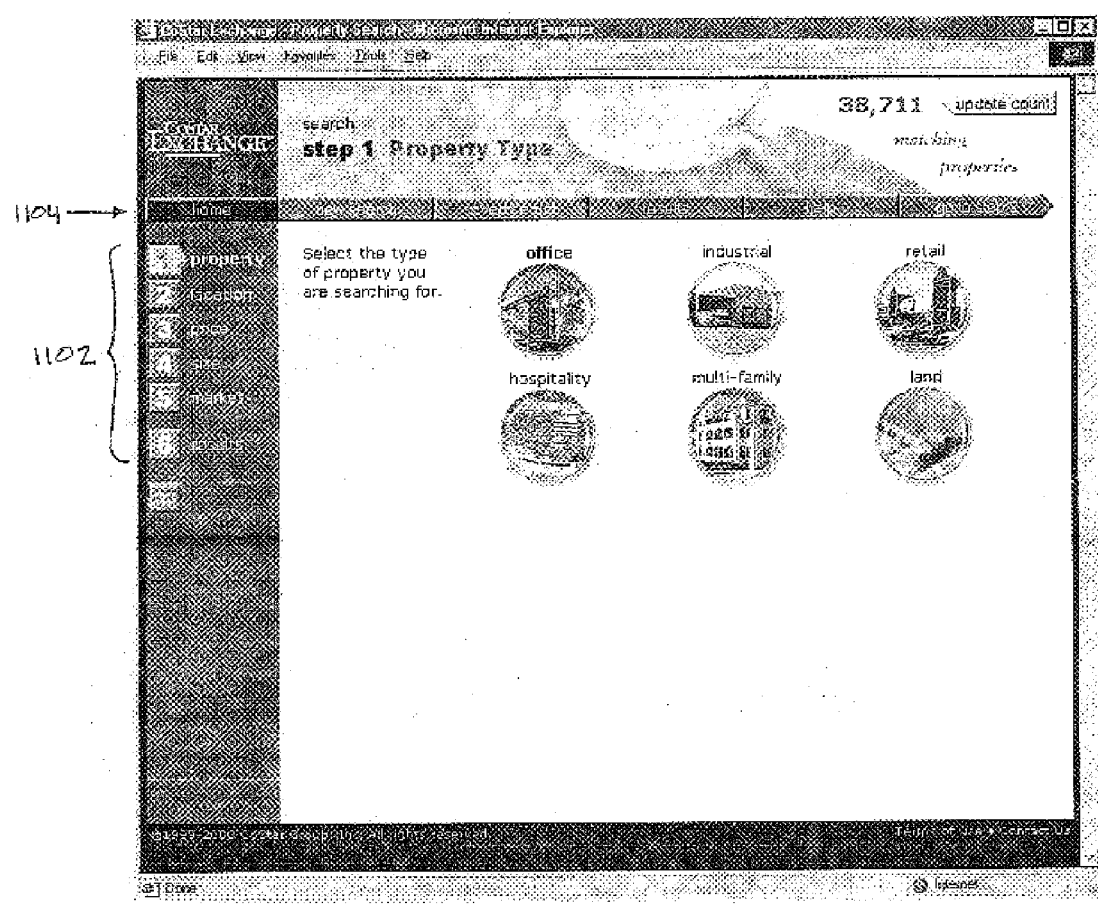

Returning to the homepage under the For Sale structured tab, the second primary function is Search Database. After clicking on the Search Database button, the user activates a series of web pages that execute the search function of the present invention, beginning with the page shown in FIG. 45. The search function is broken down into six steps by which a user enters search criteria and receives results. Each web page of the search function presents six buttons 1102 that can be clicked through to access the six steps of the search function. Each web page also includes general function buttons 1104, including a button to return to the homepage, a New Search button, a Saved Search button, a Results button, a Help button, and a Go to the Next Step button. The six steps of the search function include five steps for entering search criteria and a sixth step for obtaining the results of the search. The search criteria for steps one through five include property, location, price, size, and market. The general function buttons 1104 can be activated during any step, such that, e.g., a user can specify search criteria for only the first two steps, and then can skip directly to obtaining results. Also, a user can skip back and forth between steps to revise information (the steps do not have to be completed in order).

The web page corresponding to Step One, Property Type, presents six options or categories of property types from which to choose. These property types include office, industrial, retail, hospitality, multi-family, and land. From this Step One page, the user has the option of selecting a property type by clicking on one of the six categories of property types or skipping the selection of a property type by clicking on the Location button or the Go to the Next Step button.

Figure 46:
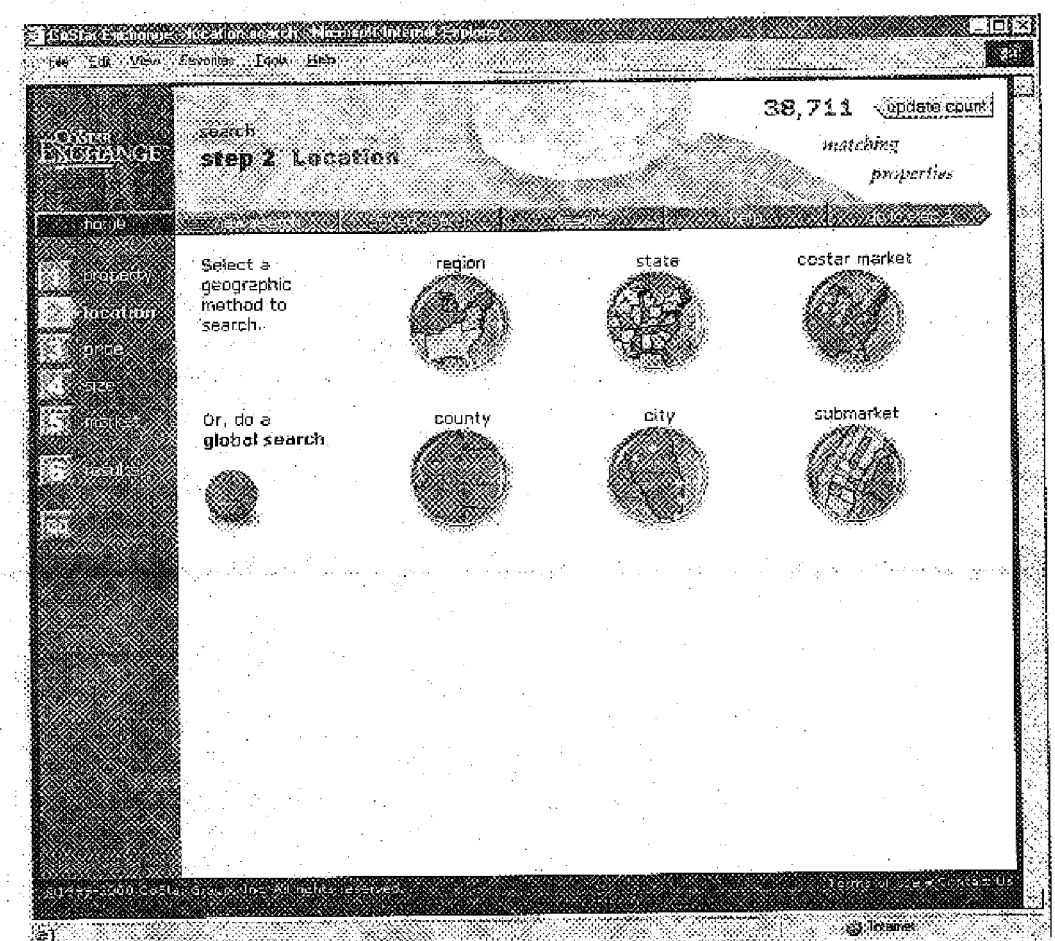
Figure 47:
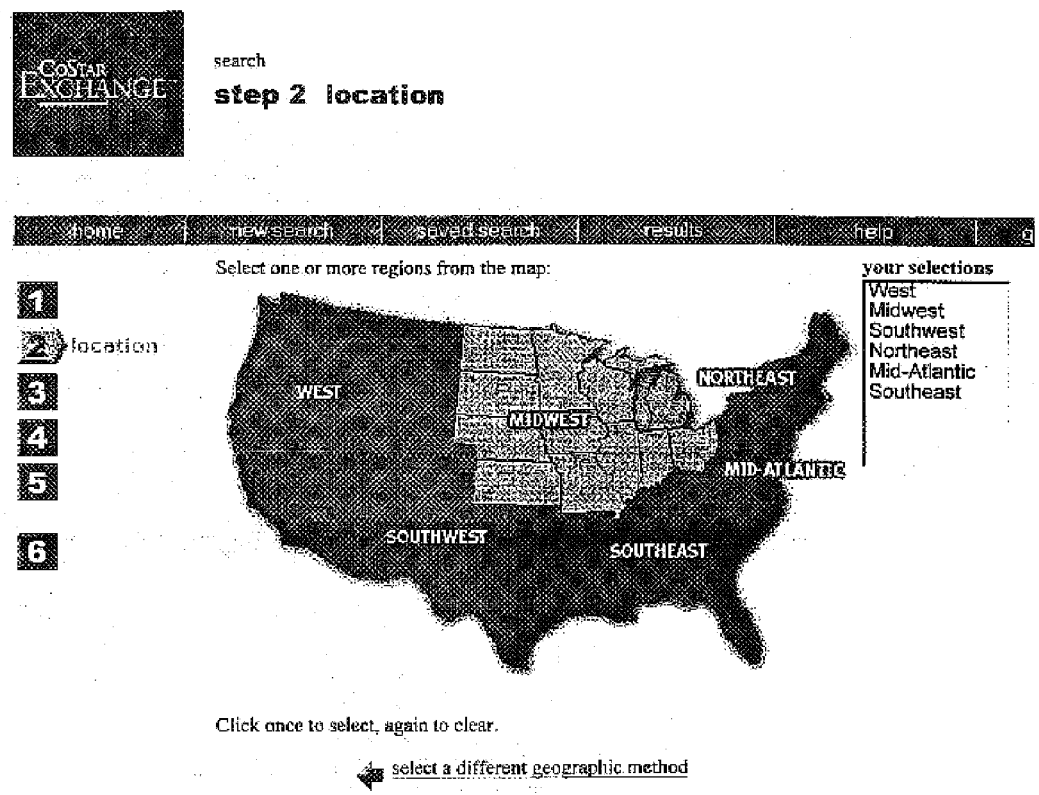

The web page corresponding to Step Two of the search function (FIG. 46) asks the user to select a geographic method by which to search the database or to select the option of conducting a global search. The geographic methods by which a user can search the database include searching by region, state, market, county, city, or sub-market. The user can proceed to the next step of the search function by clicking on one of the six categories of geographic search methods, by choosing to conduct a global search, or by skipping a preferred geographic search method by clicking on the Step Three Price button or the Go to the Next Step button. If the user chooses to use a geographic search method, the website presents another page-asking for more detail on that search method. For example, if the user chooses to conduct a regional geographic search, the present invention presents a map showing each region, as shown in FIG. 47. The user clicks on a region to narrow the search to within that region. Similarly, for the state, market, county, city, and sub-market categories, a user chooses a particular state, market, county, city or sub-market to narrow the search. After selecting a geographic method by which to search the database or selecting a global search, the user moves on to the next step of the search criteria: Step Three Price.

Figure 48:
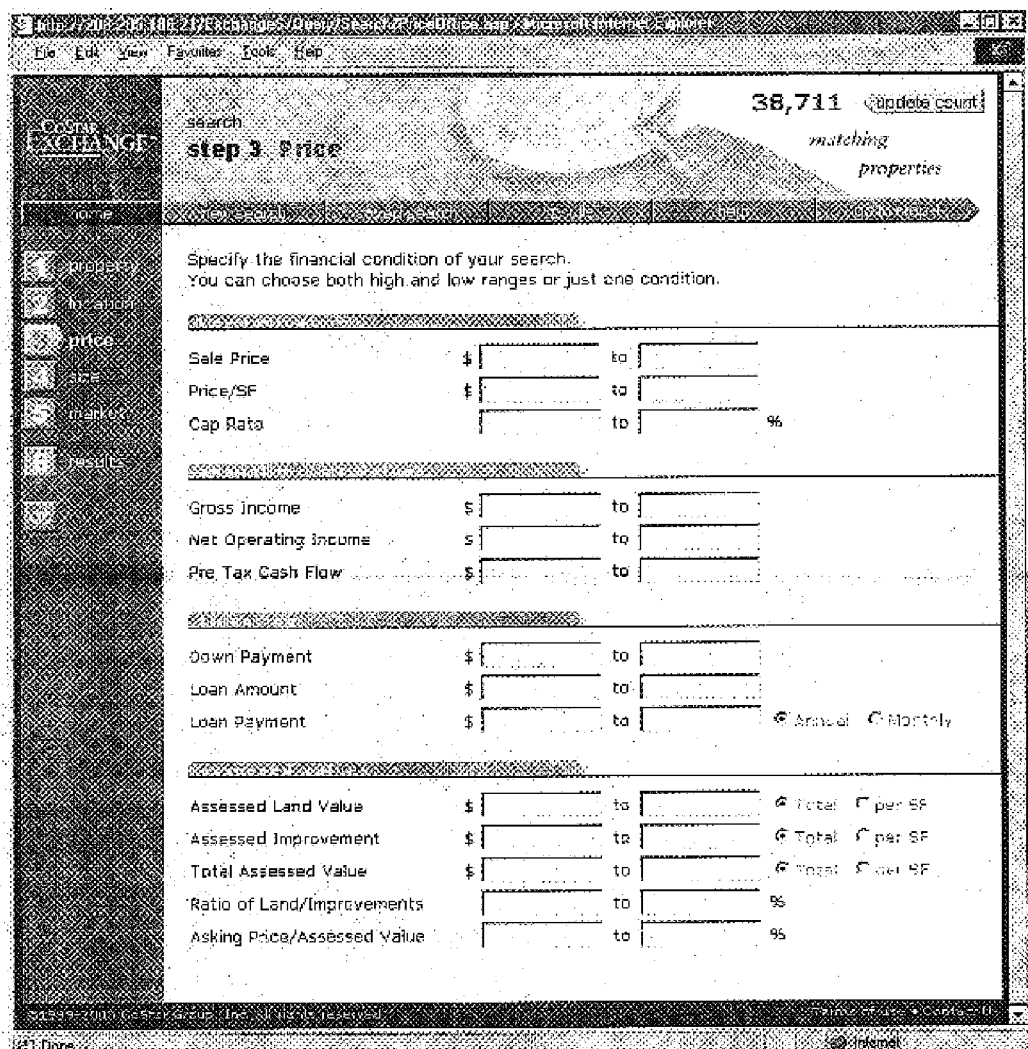

Step Three of the search criteria allows a user to specify the financial conditions for the search. The user can choose both high and low ranges for the price categories or just one condition. As shown in FIG. 48, the price conditions are broken down into four categories: key indicators, annual income values, financing, and assessed values. Under key indicators, the user can specify a sale price, a price per square foot, and a cap rate. Under annual income values, a user can specify gross income, net operating income, and pretax cash flow. Under the financing heading, a user can specify down payment, loan amount, and loan payment in either annual or monthly terms. Under the assessed values subheading, the user can specify assessed land value, assessed improvement, and total assessed value either in total amounts or per square foot. Also under the assessed values subheading, the user can specify the ratio of land to improvements and the ratio of asking price to assessed value. Once the user has chosen values for the price conditions or has chosen to skip Step Three, the user proceeds to Step Four by clicking on the Go to Next Step button or the Step Four button.

Figure 49:
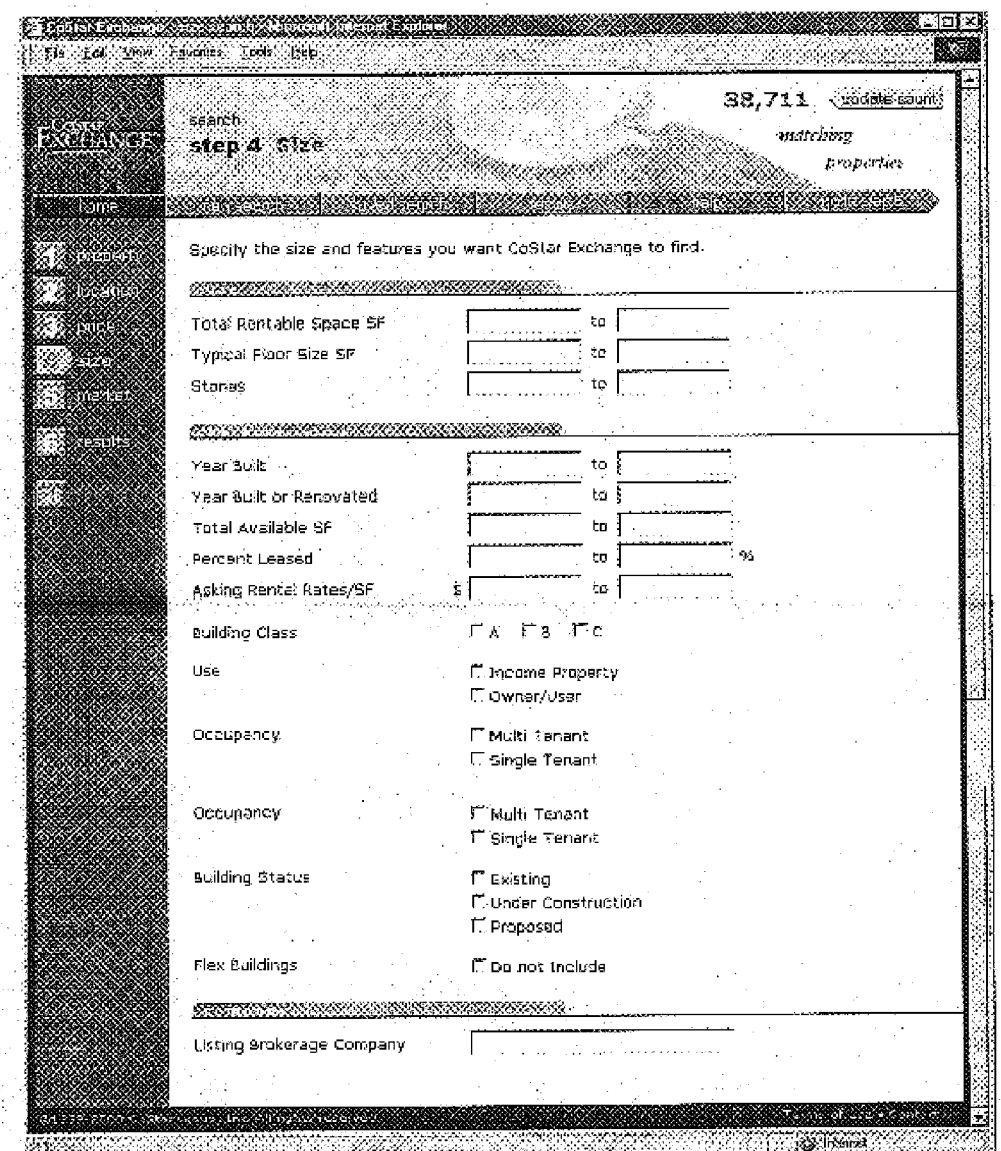

As shown in FIG. 49, the web page for Step Four enables the user to specify the size and features of the property for which the user is searching. The data entry fields for this search criteria are broken down into the subheadings: size, characteristics, and company. Under the size subheading, the user can specify the total rentable space in square feet, the typical floor size in square feet, and the number of stories. Under characteristics, the user can specify the year built, the year built or renovated, the total available square feet, the percent leased, the asking rental rates per square foot, the building class (e.g., A, B, or C), the type of use (e.g., income property or owner/user), the occupancy type (e.g., multi-tenant or single tenant), the building status (e.g., existing, under construction, or proposed), and whether to include flex buildings in the search. Under the company subheading, the user can specify the listing brokerage company and thereby limit the search to that company. Once the user has entered the desired data into the web page of Step Four, the user proceeds to Step Five by clicking on the Go to Next Step button or clicking on the Step Five button.

Figure 50:
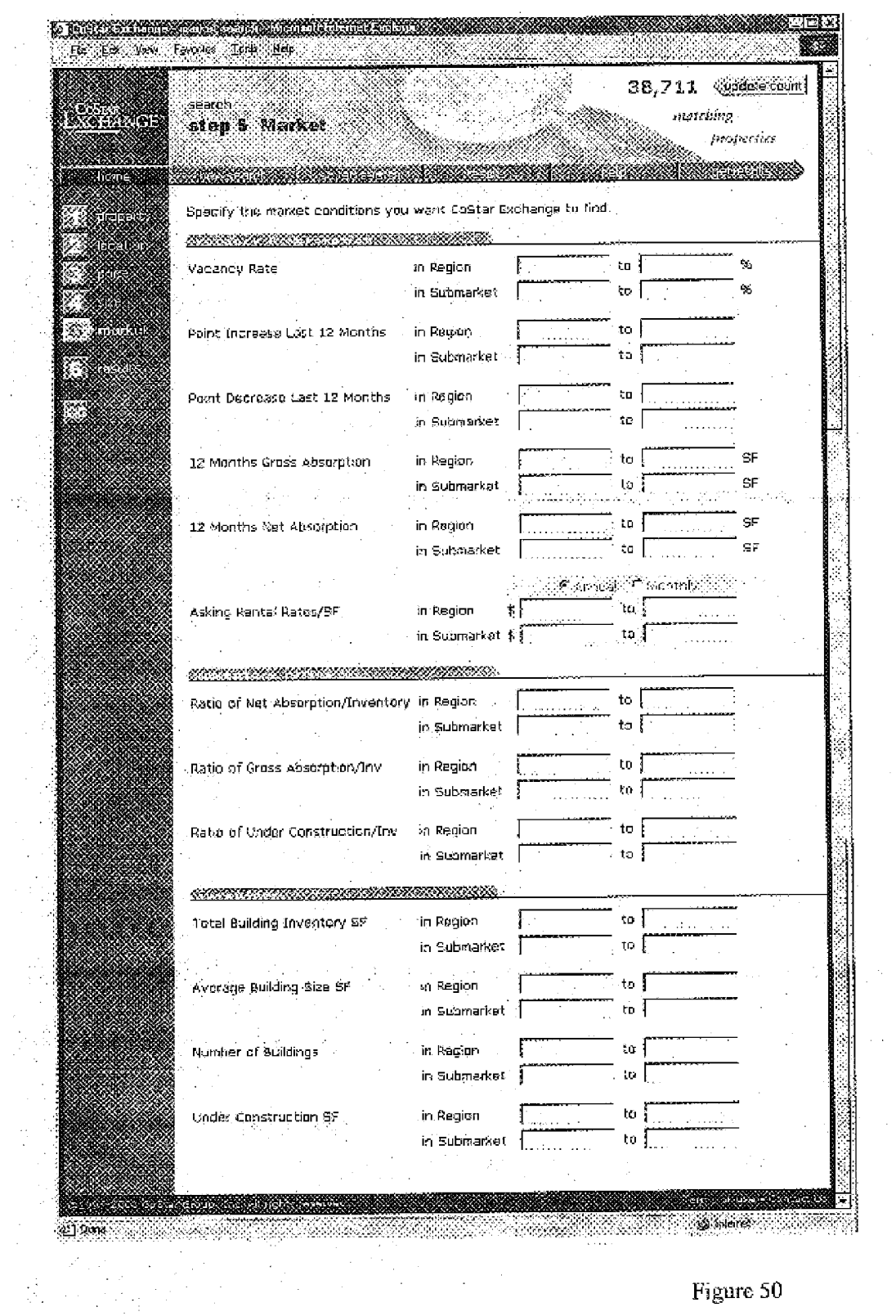

The web page for Step Five, as shown in FIG. 50, enables a user to specify the market conditions of the user's desired property. These market conditions are broken down into three subheadings: vacancy and absorption, inventory ratios, and inventory. Under the vacancy and absorption subheading, a user can specify the vacancy rate in a region or submarket, the point increase in the last 12 months in a region or submarket, the point decrease in the last 12 months in a region or submarket, the 12 months' gross absorption in a region or submarket, the 12 months' net absorption in a region or sub-market, and finally, the asking rental rates per square foot in a region or submarket in annual or monthly terms. Under the inventory ratios subheading, a user can specify the ratio of net absorption to inventory in a region or submarket, the ratio of gross absorption to inventory in a region or submarket, and the ratio of under construction to inventory in a region or submarket. Under the inventory subheading, a user can specify the total building inventory in square feet in a region or submarket, the average building size in square feet in a region or submarket, the number of buildings in a region or in a submarket, and the under construction in square feet in a region or submarket. Once a user has entered the desired values in the data entry fields of the Step Five web page, the user can return to other steps by clicking on those buttons or can proceed to Step Six to obtain the results for the search criteria. From the web page for Step Five, a user can access Step Six by clicking on the Get Results button or by clicking on the Step Six button.

Figure 51:
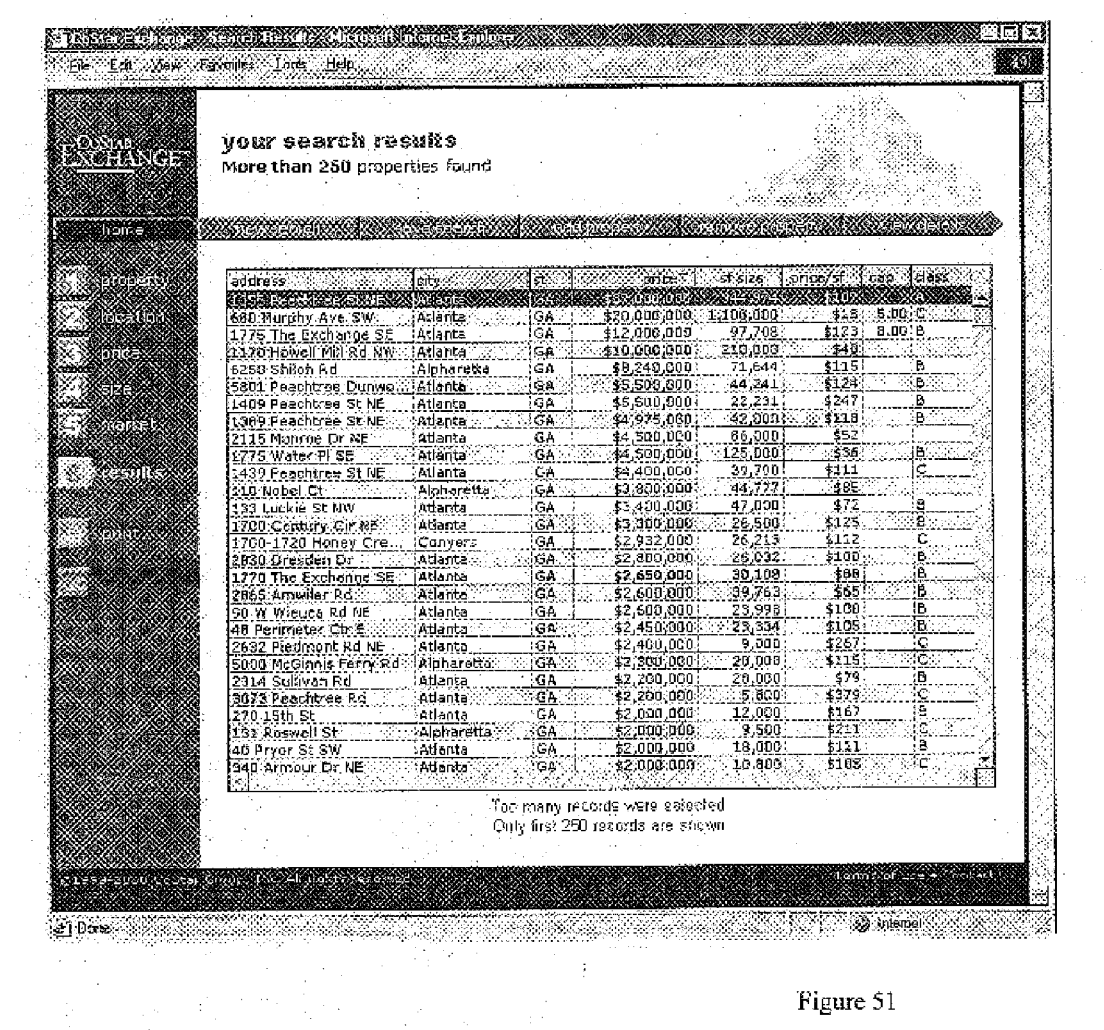

The web page for Step Six lists the results of the search in the form of a table, as illustrated in FIG. 51. The table includes column headings such as address, city, state, price, square foot size, price per square foot, cap, and class of property.

Figure 52:
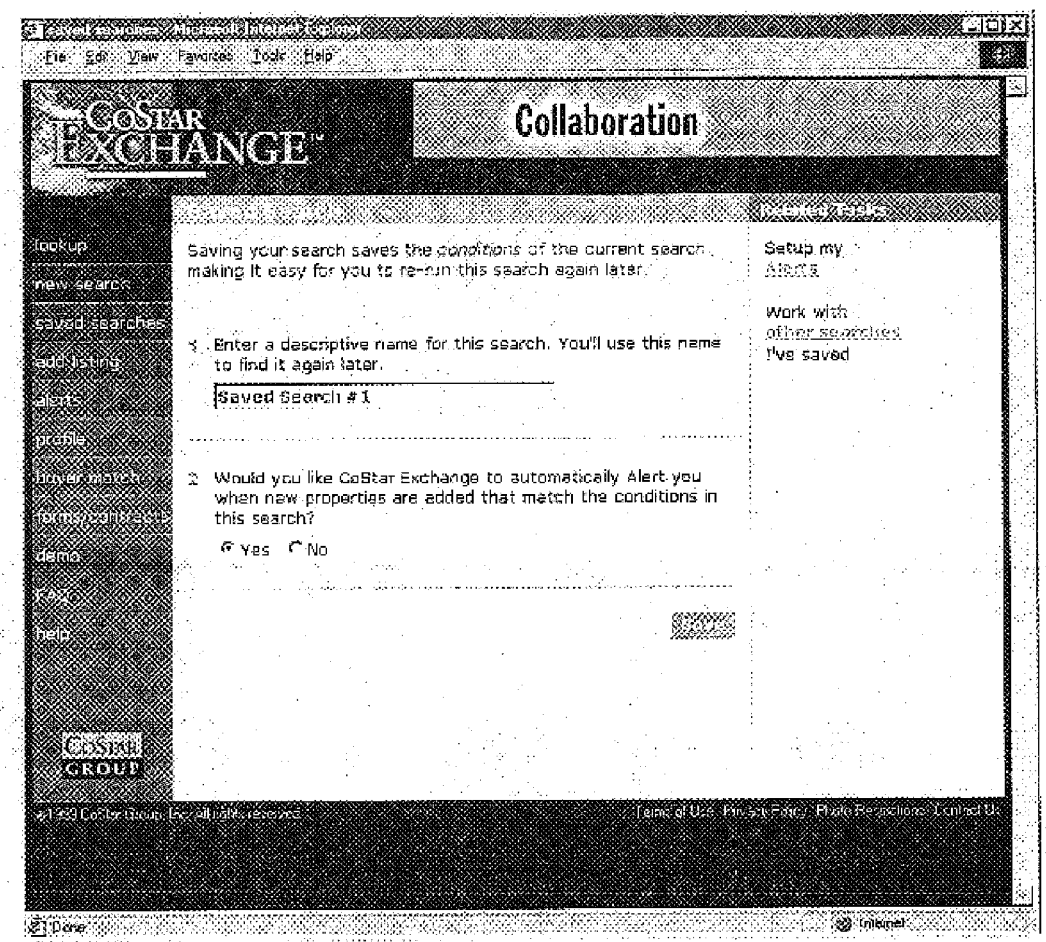

The web page for Step Six, as with the other steps, also provides the user with the function buttons including Return to Homepage, New Search, Save Search, Add Property, Remove Property, and View Details. The New Search button enables a user to return to Step One of the search function to choose new search criteria. The Save Search button enables a user to save the search criteria to be accessed, reviewed, and executed again later. In addition, by saving the search criteria a user can establish an alert notification that automatically notifies the user of a new listing that satisfies that search's criteria. FIG. 52 shows the Saved Search page displayed to a user who clicks through the Save Search button. The Saved Search page prompts a user for a file name and whether alert notification should be activated for the saved search.

The Add Property button (FIG. 51) enables a user to add a property to the search results table that did not initially meet the search criteria but which the user would like to add to the list for comparison purposes. The Remove Property button enables the user to remove properties that did satisfy the search requirements but that the user has determined to be undesirable. Finally, a user can obtain details on a property listed in the search results table by either highlighting the property and clicking on the Get Details button, or by double-clicking on the entry in the table. The web page for Step Six also provides a Print button that enables a user to print out the search result table.

Figure 53:
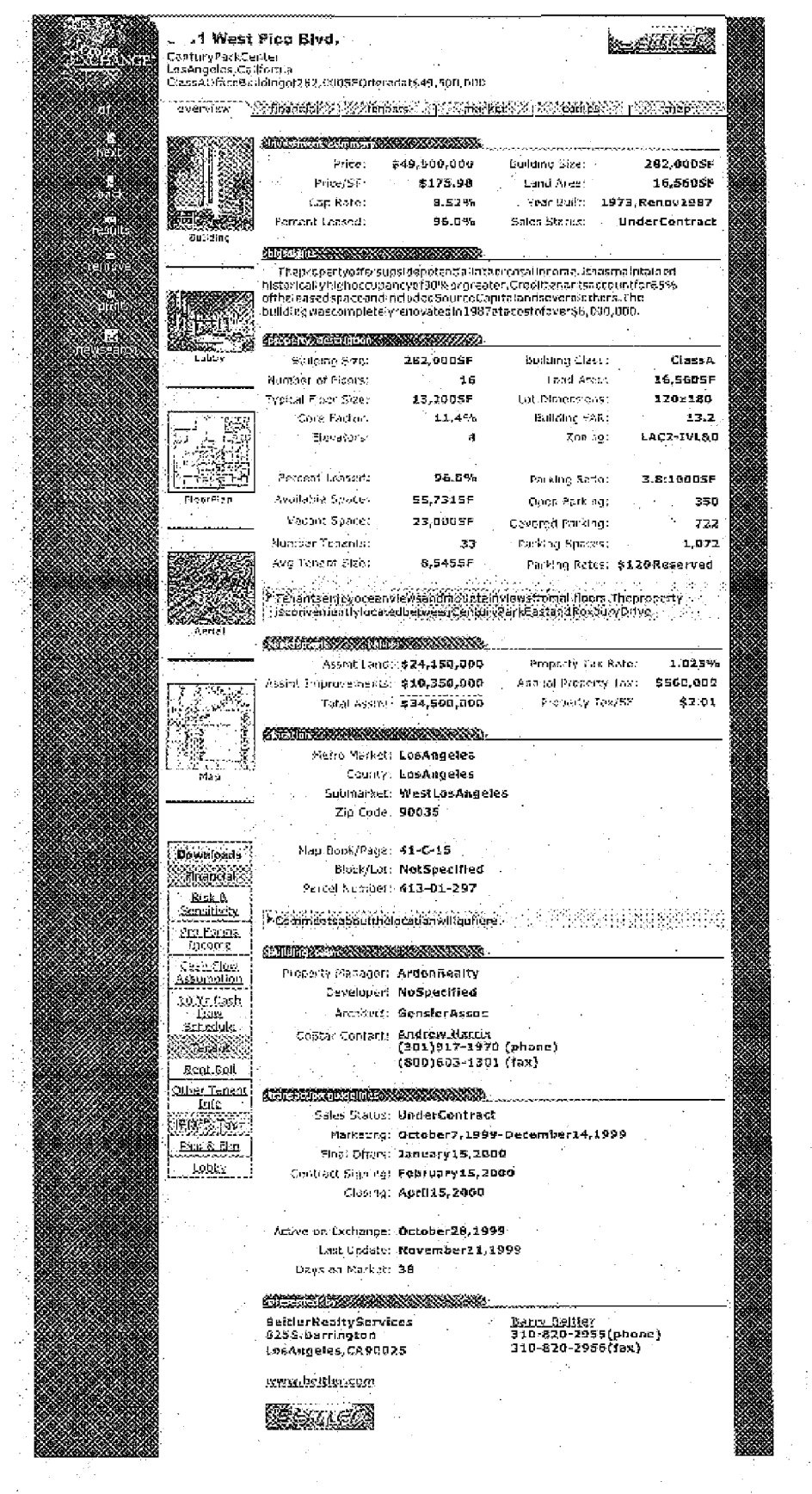

Once the user has chosen to view details on a particular property, the website presents an overview page (FIG. 53) listing general information about the property, photographs of the property, three dimensional images of the property, and maps of the area in which the property is located. The overview page is one tabbed page of six tabbed pages that are presented as part of a Property Details page. Each tabbed page has a structured tab. The structured tabs include Overview, Financial, Tenants, Market, Comps, and Map.

Under the Overview structured tab, the general information on the property is broken down into eight subheadings including investment summary, highlights, property description, assessment value, location, building team, transaction guidelines, and "presented by."

Under the investment summary subheading, the Overview web page lists such data as the price, price per square foot, cap rate, percent leased, building size, land area, year built, and sale status of the property.

Under the highlights subheading, the Overview web page provides a narrative describing the principal selling points of the property.

Under the property description subheading, the Overview web page lists such data as the building size, number of floors, typical floor size, core factor, elevators, building class, land area, lot dimensions, building FAR, zoning, percent leased, available space, vacant space, number of tenants, average tenant size, parking ratio, open parking, covered parking, parking spaces, and parking rates. This section also provides an area for a description of special qualities of the property.

Under the assessment value subheading, the Overview web page lists such figures as land assessment, improvement assessment, total assessment, property tax rate, annual property tax, and property tax per square foot.

Under the location subheading, the Overview page lists the property's metro market, county, submarket, and zip code. This section also provides the map book and page on which to find the property, the block/lot of the property, and the parcel number. This section also provides an area for narrative comments about the location.

Under the building team subheading, the Overview page lists such information as the property manager, the developer, the architect, and a contact person in charge of the building information.

Under the transaction guidelines subheading, the Overview page lists such data as the sales status, marketing, final offers, contract signing, closing, active date, last update, and days on market.

Under the "presented by" subheading, the Overview page lists such information as the contact information for the broker or party responsible for listing the property.

As shown in FIG. 54, under the Financial structure tab of the Property Details page, the information is broken down into four subheadings: financial overview, financial worksheet, income and expense, and existing financing.

Under the financial overview subheading, the Financial page lists such data as the price, the price per square foot, the use, and the cap rate. Under the financial worksheet subheading, the Financial page lists such data as the down payment, the new loan, the net operating income, the loan payment, the pre-tax cash flow, the price, cap rate, down payment, the interest rate, and the loan term along with a Calculate button. Under this subheading, a user can change a field in the worksheet and click the Calculate button to refresh the values in each of the fields. In this manner, the present invention enables a user to enter different financial criteria to determine the impact on price terms, loan terms, and cash flow.

Under the income and expense subheading, the Financial page lists such data as the gross income, other income, vacancy allowance, operating expenses, net operating income, loan payment, pre-tax cash flow, current asking rent per square foot, estimated average rent per square foot, taxes, insurance, utilities, wages, maintenance, management, miscellaneous reserves, total estimated expenses, and estimated expenses per square foot.

Under the existing financing subheading, the Financial page lists such information for the existing financing as lender, loan payment, due date, loan amount, interest rate, and loan term.

Figure 55:
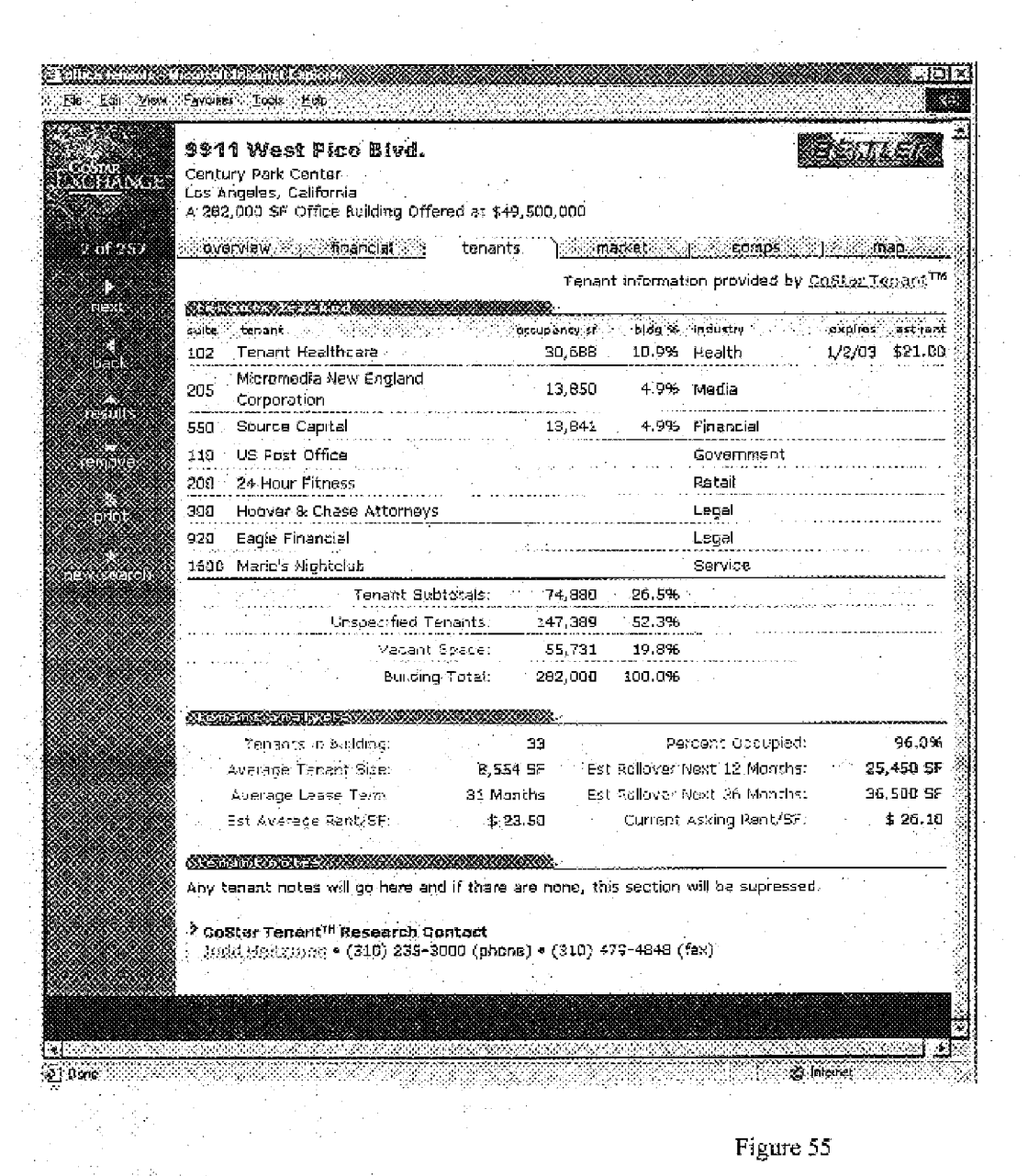

As shown in FIG. 55, under the Tenant structured tab of the Property Details web page, the information is broken down into the subheadings: tenants tracked, tenant analysis, and tenant notes. Under the tenants tracked subheading, columns of information include suite, tenants, occupancy square foot, building percentage, industry, expires, and estimated rent. The suite column lists the suite a tenant occupies. The tenants column lists the name of the tenant. The occupancy square foot column lists the number of square feet the tenant occupies. The building percentage lists the percentage of space in the building that the tenant occupies. The industry column lists the type of business the tenant runs (e.g., health, media, and legal). The expires column lists the date the lease expires for the tenant. The estimated rent column lists the estimated rent the tenant is paying.

Each row under the tenants tracked subheading lists information for individual tenants. At the bottom of the list of tenants are totals for the entire building including tenant subtotals, unspecified tenants, vacant space, and total building. In this manner a user can conveniently determine the percentage of space leased in the property, the percentage of unspecified tenants leasing space in the property, and the total space leased by the listed tenants.

Under the tenant analysis subheading, the Tenant web page lists the number of tenants in the building, the average tenant size, the average lease term, the estimated average rent per square foot, the total percent occupied, the estimated rollover in the next 12 months, the estimated rollover in the next 36 months, and the current asking rent per square foot. Alternatively, the tenant analysis subheading also links Dunn & Bradstreet™ ratings and information.

Under the tenant notes subheading, the Tenant web page lists any relevant narrative information about the tenants.

Figure 56:
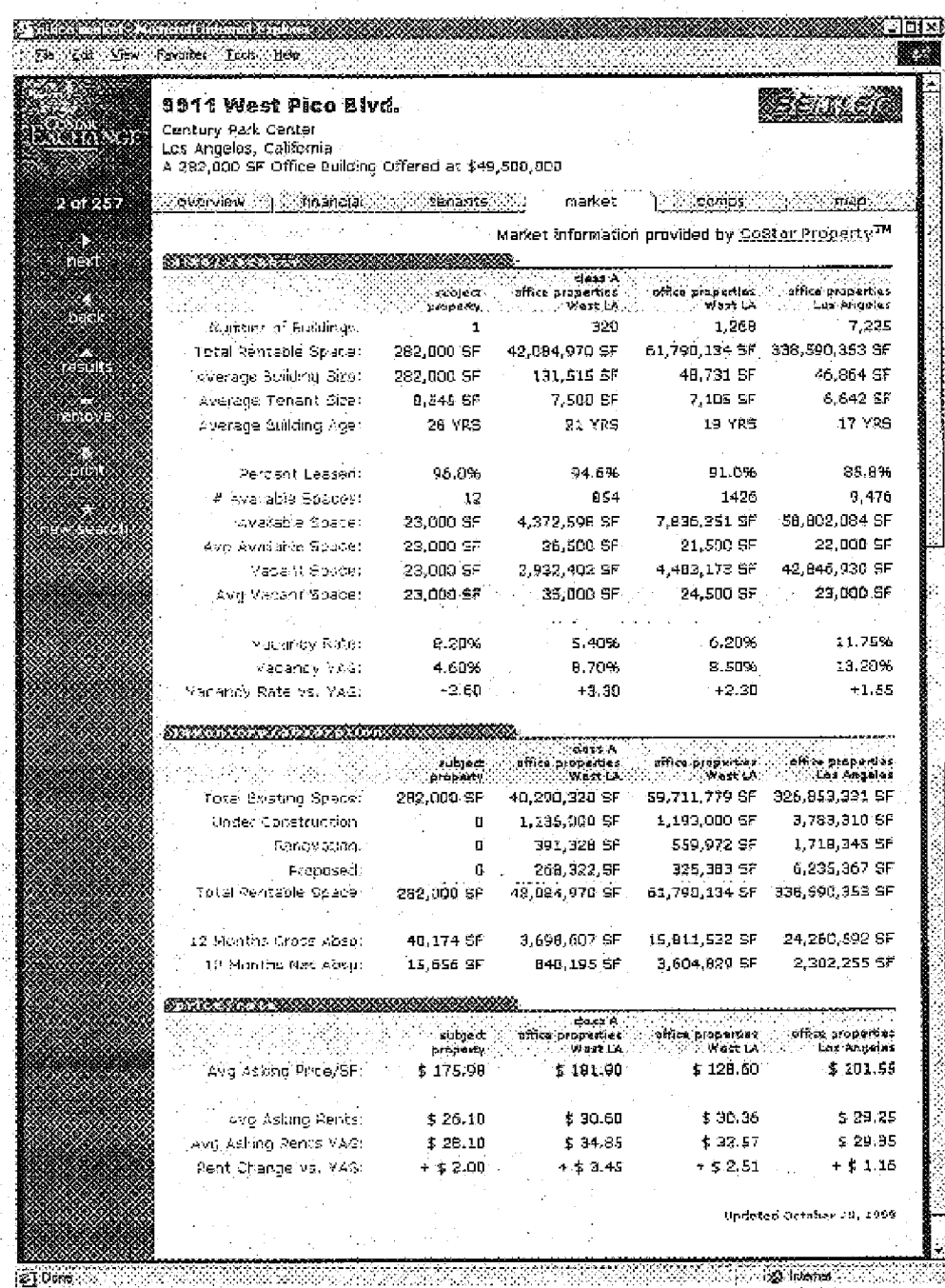

As shown in FIG. 56, under the market structured tab of the Property Details web page, information is presented under three subheadings: size/vacancy, inventory/absorption, and price/rate. The information under the Market structured tab enables a user to compare the commercial viability of the property against similar properties in the same region and state. Under the size/vacancy subheading, the Market web page presents such data as the number of buildings, the total rentable space, the average building size, the average tenant size, the average building age, the percent leased, the number of available spaces, the total available space in square feet, the average available space in square feet, the vacant space in square feet, the average vacant space in square feet, the vacancy rate, the vacancy YAG, and the vacancy rate v. the YAG.

Under the inventory/absorption subheading, the Market web page lists such data as the total existing space in square feet, the square footage under construction, the square footage under renovation, the square footage proposed, the total rentable space in square feet, the 12 month gross absorption in square feet, and the 12 month net absorption in square feet.

Under the price/rate subheading, the Market web page lists such information as the average asking price per square foot, the average asking rent per square foot, the average asking rents YAG, and the rent charge v. YAG.

Figure 57:
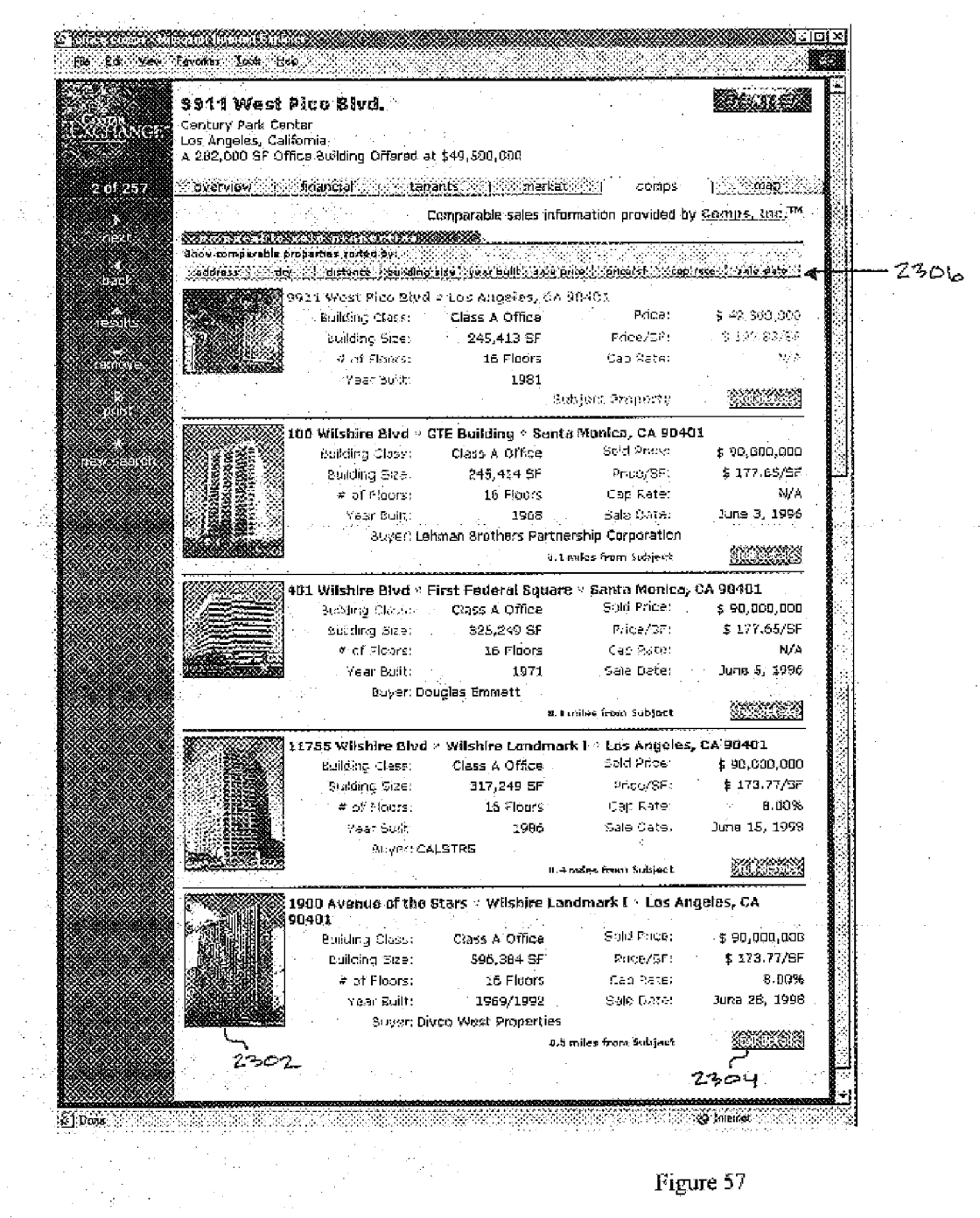

As shown in FIG. 57, under the Comps structured tab of the Property Details web page, the present invention lists sale properties comparable to the subject property. The Comps web page includes summaries of each comparable sale property with a thumbnail picture 2302 and a button 2304 the user can click to obtain full details on the property. Each summary includes such information as the address of the property, the building class size, the building size, the number of floors, the year built, the buyer, the sale price, the price per square foot, the cap rate, and the sale date. In addition, the summary includes the distance the comparable sale property is located from the subject property. The Comps web page also lists a series of buttons 2306 at the top of the page corresponding to each category listed in the comparable sale property summaries. By pressing one of these buttons, a user can sort the comparable properties by the summary category corresponding to that button. Thus, for example, if a user wishes to sort the comparable sale properties by their distance from the subject property, the user would click the Distance button. To view a full-sized picture of the sale property, a user simply clicks on the thumbnail picture. To open the Properties Details page for a comparable sale property, the user simply clicks on the Full Details button for that property. In addition, in a further preformed embodiment, the comps structured tab includes a summary of the subject property to enable side-by-side comparisons with comparable properties by summary categories.

Figure 58:
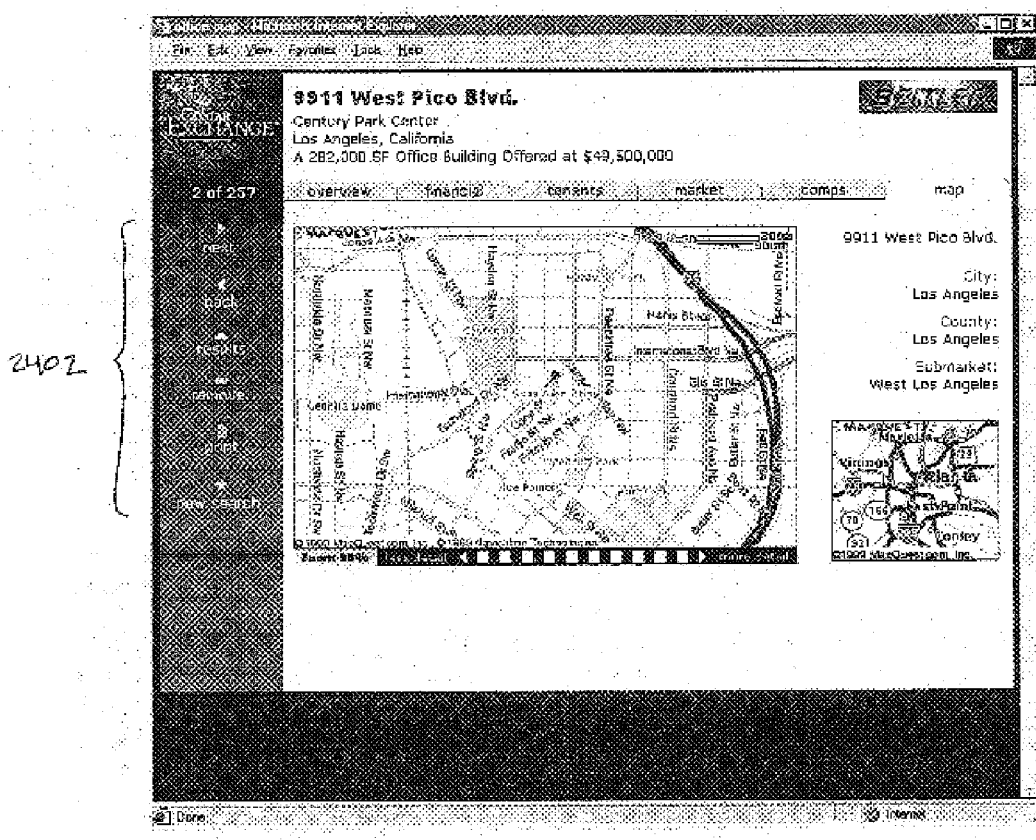

As shown in FIG. 58, under the Map structure tab of the Property Details web page, the present invention provides maps, pinpointing the location of the subject property with an icon or other indicator. The Map web page also lists the address, the city, the county, and the submarket of the property. The maps give the user the ability to view the overall region in which the property is located, as well as the ability to zoom in and out on the map of the property.

Optionally, the map displays the locations of other for sale and comparable properties using icons or other indicators. Preferably, when the user drags the mouse pointer over an icon, the system displays a pop-up window providing information on the associated property, e.g., a photograph, square footage, and price of the property. A user could then click through the pop-up window to access more information about the property.

While a user is exploring the above-described six structured tabs of the Property Details web page, the present invention provides a function menu area 2402 (as noted in FIG. 58) including next, back, results, remove, print, new search, and a numerical listing of the property. The numerical listing corresponds to the item number of the property in the list of the search results. For example, a user may be viewing the property details for the 12th property listed on a search list of 39 properties, i.e., 12 of 39. The next function enables a user to view the next property listing in the search results table. Thus, for example, the user could click on the next function to view 13 of 39 after viewing 12 of 39. Similarly, the back function allows the user to move to a prior property listing. The results function allows the user to return to the table listing the search results. The remove function enables the user to remove a property from the search result table after viewing the property details and determining that the property is not desirable. The print function enables a user to print out the property details of a particular property. Finally, the new search function enables a user to return to the original six step search function to commence a new search. A further preferred feature provides on-screen and print reports such as a one-line summary, a multi-line summary with photos, a one page report, and an investment package (all data compiled in a paginated investment package format).

Returning to the website homepage (FIG. 35), the third primary function under the For Sale structured tab is Add Listing. Upon clicking on the Add Listing button, the website presents the user with a Building Questionnaire web page, as shown in FIG. 59. The Building Questionnaire page asks the user to select the type of property the user wishes to profile in the present invention. These types of properties include such categories as for 'sale' properties and 'for lease' properties. Within each of these property types, the user can choose a particular class of property, such as office or industrial.

Figure 60:
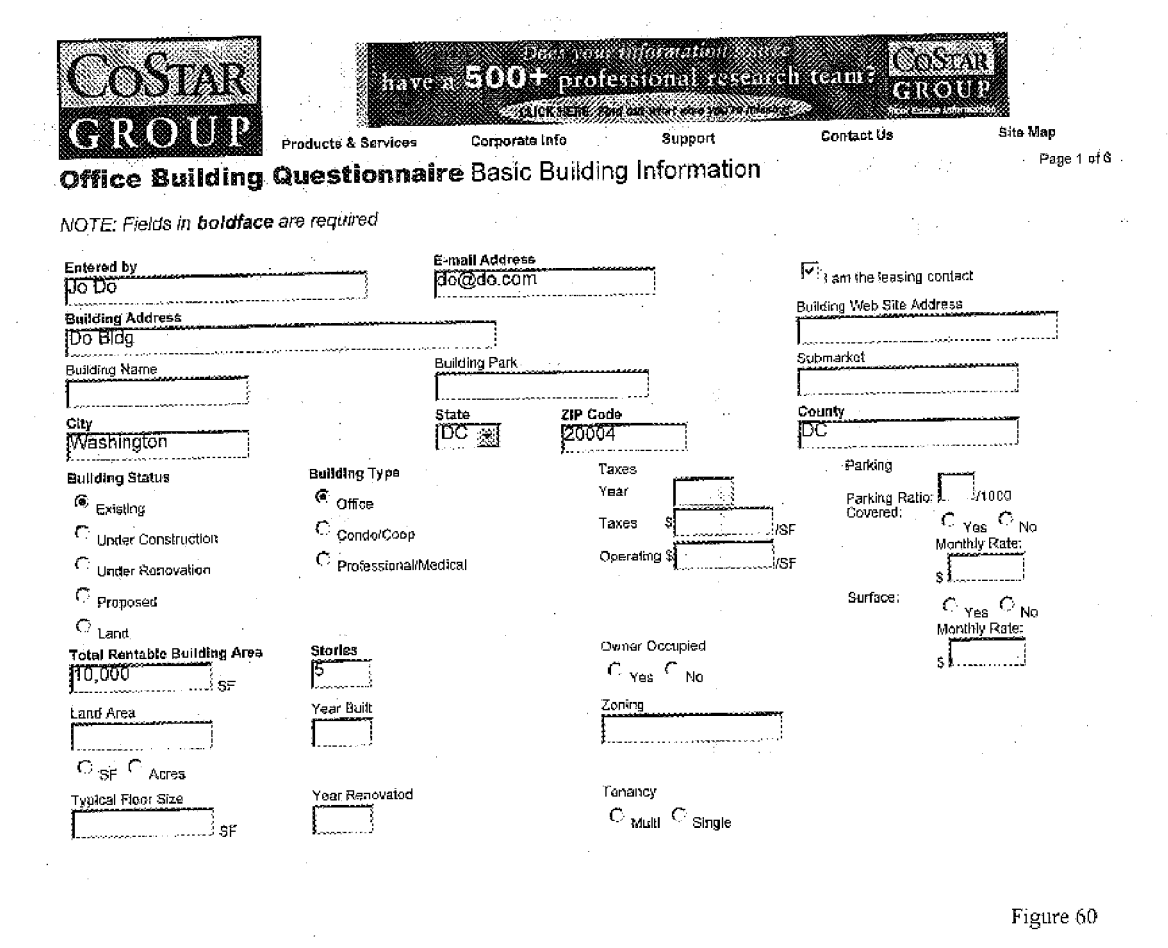

Upon clicking a property and class type, the website presents a data entry page as shown in FIGS. 60 and 61. The data entry page prompts the user for basic building information. The user enters the building information in searchable data fields such as building address, city, state, zip code, county, building status, building type, total rentable building area, and number of stories.

Figure 62:
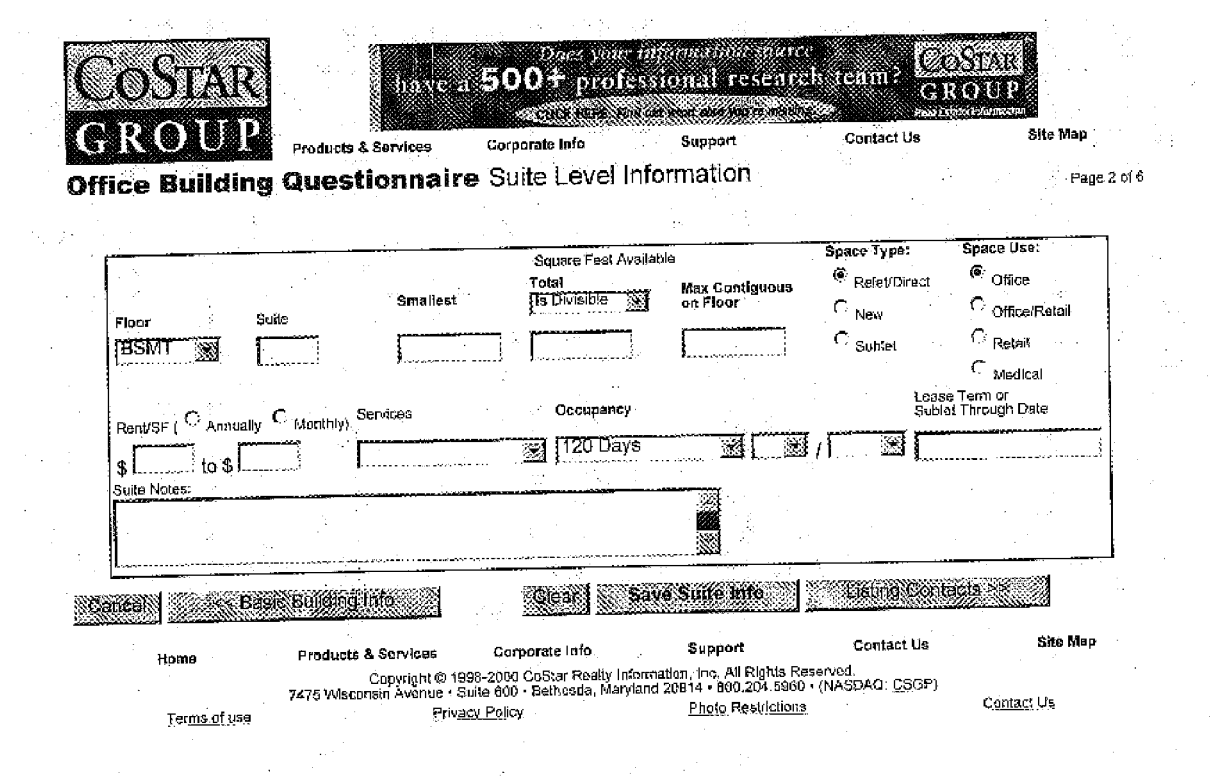
Figure 63:
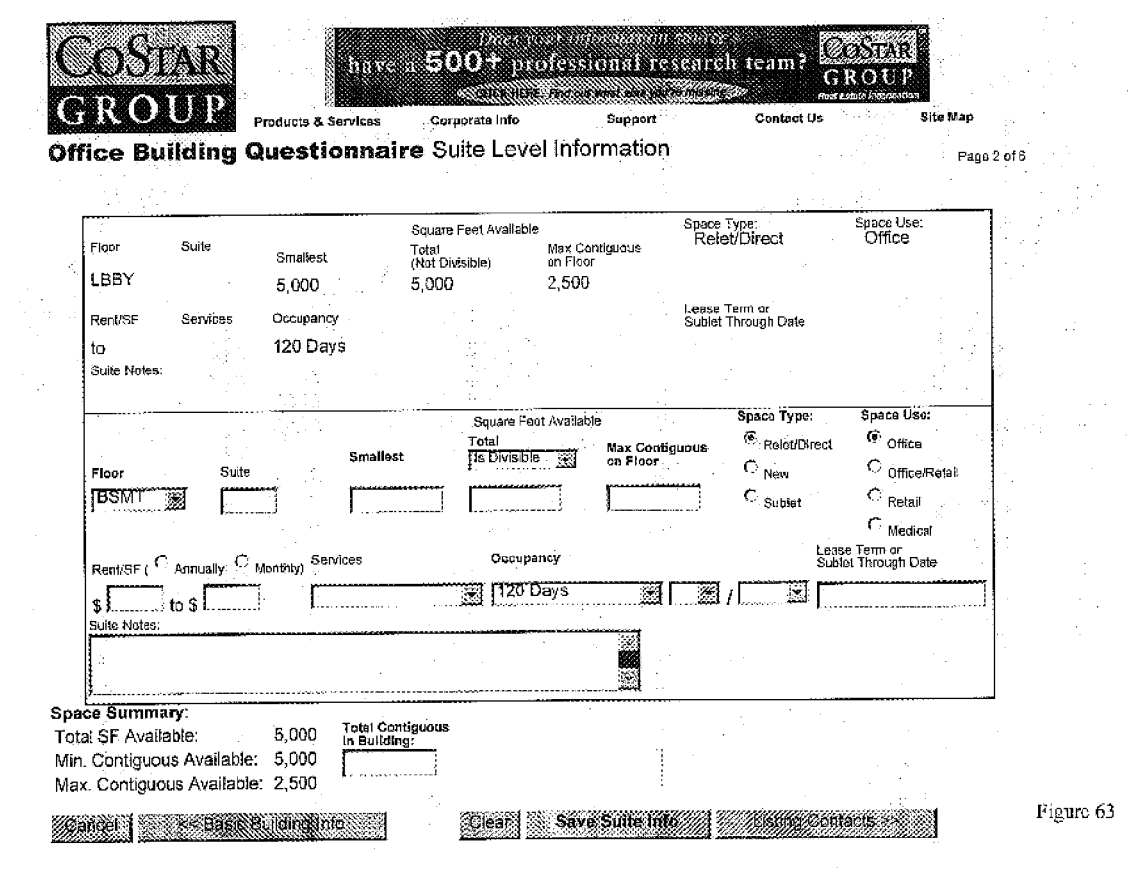

As shown in FIG. 62, after completing the basic building information, the Building Questionnaire prompts the user for suite level information including such information as floor, smallest square feet available, whether the total square feet is divisible or is not divisible, and the maximum contiguous square feet on a floor. The Questionnaire also asks for suite level information such as the space type (e.g., relet/direct, new and sublet), the space use (e.g., office, office/retail, retail, and medical), and occupancy (e.g., 120 days, to be determined, and vacant/off-market). From this page, a user can save the suite level information by clicking through the Save button. Upon saving, the website displays the page shown in FIG. 63.

Figure 64:
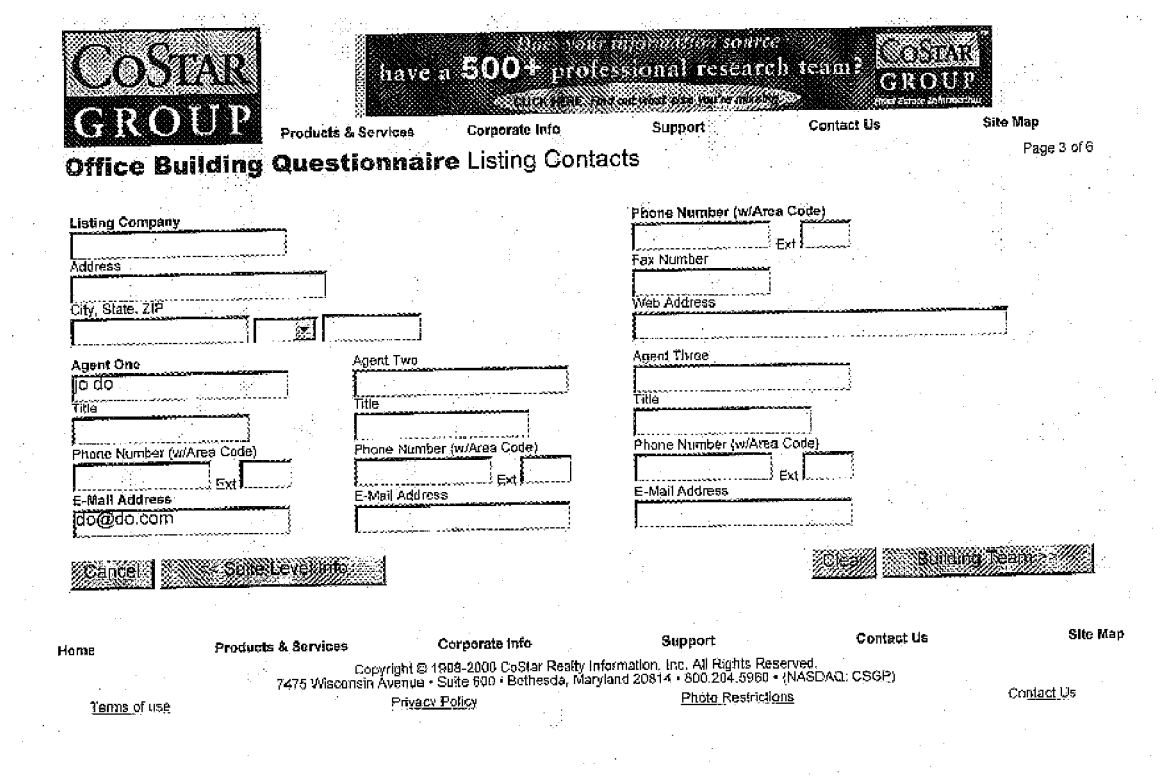

As shown in FIG. 64, the next section of the office building questionnaire prompts the user for information concerning the listing contact such as the listing company, its telephone number, its agents, and its e-mail address.

Figure 65:
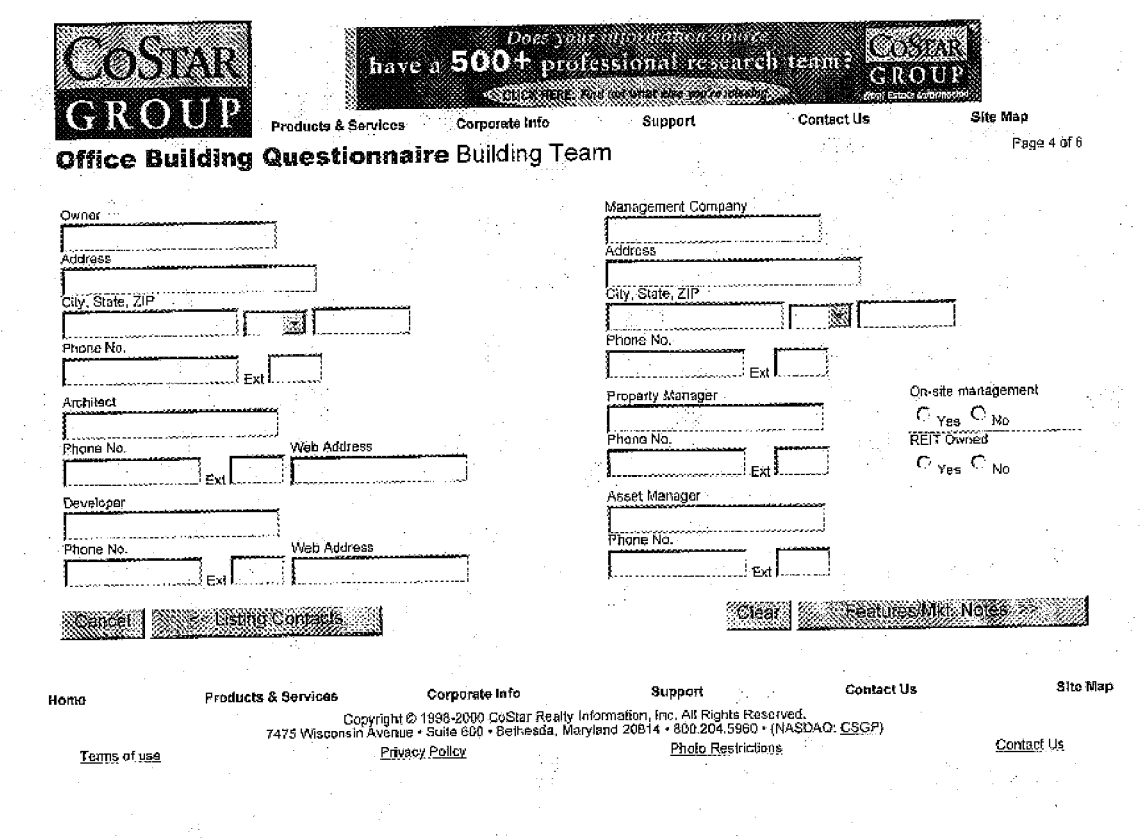

As shown in FIG. 65, the next section of the office building questionnaire prompts the user for information about the building team including such data fields as owner, architect, developer, management company, property manager, asset manager, and the various contact information for each of these entities.

Figure 66:
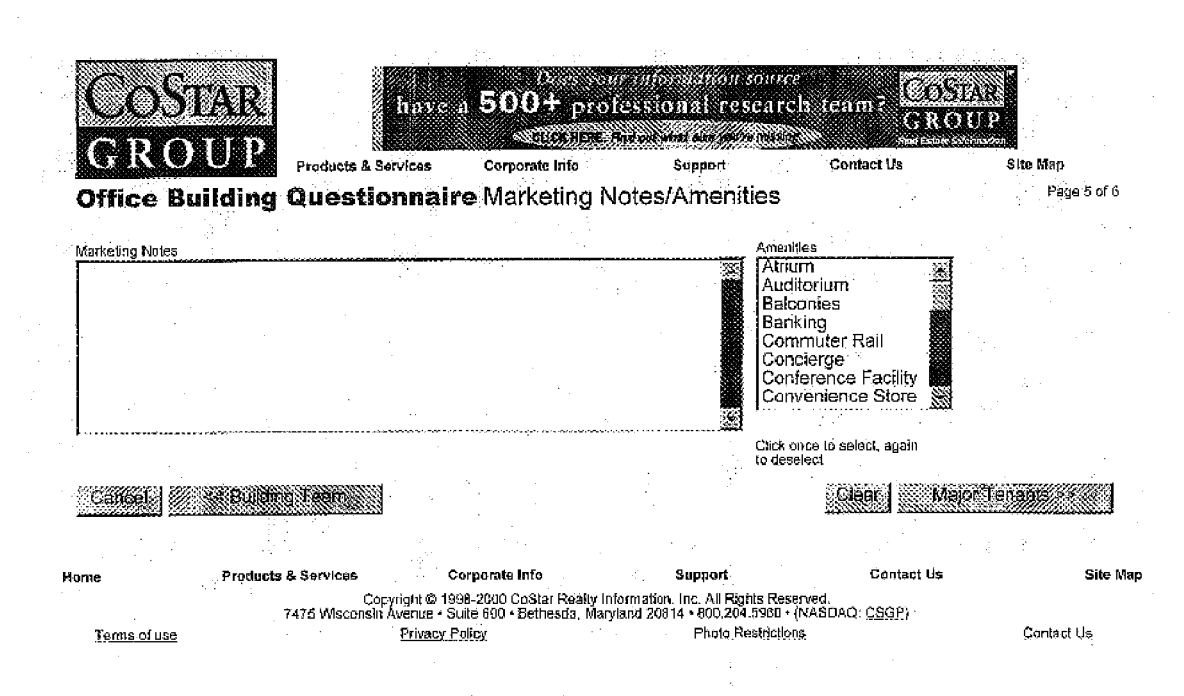

As shown in FIG. 66, the next section of the office building questionnaire prompts the user for information concerning marketing notes and amenities such as an atrium, auditorium, nearby commuter rail stations, dry cleaners, golf courses, and restaurants. A data entry field for marketing notes accepts free-style narratives on any special features that improve the value of the property and enhance its attractiveness to buyers.

Figure 67:
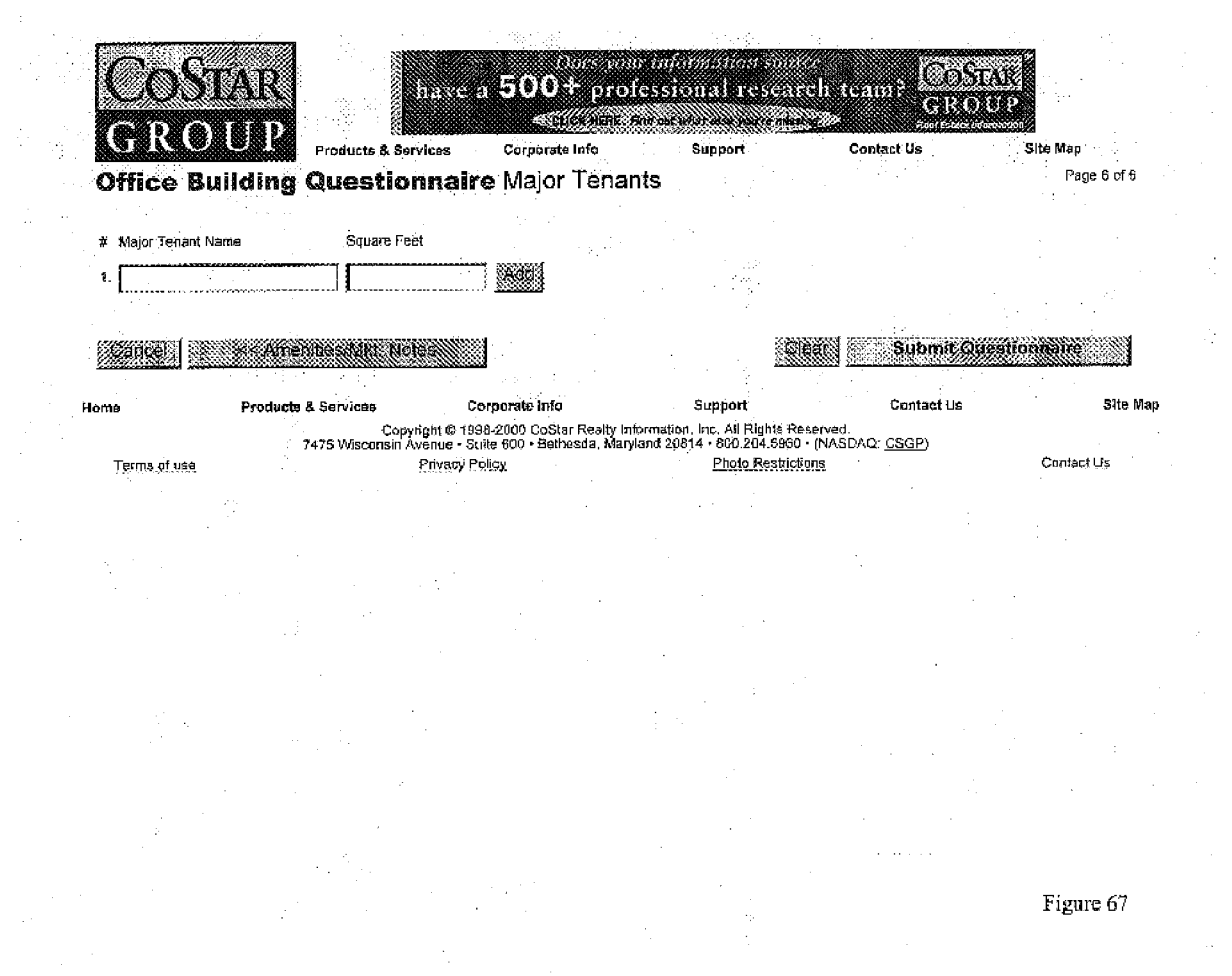

As shown in FIG. 67, the final section of the office building questionnaire prompts the user for information on major tenants in the subject property. This section includes data entry fields for such information as major tenant name and square feet.

Figure 68:
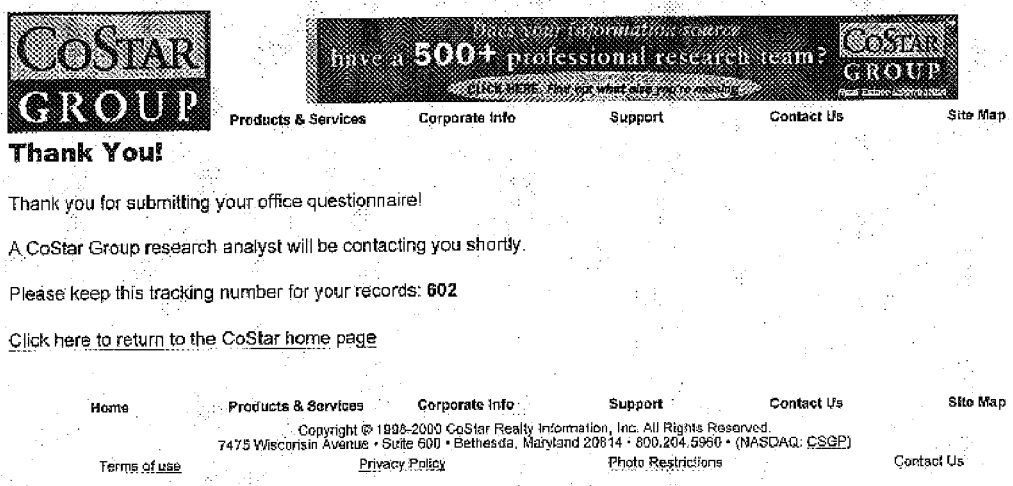

Each of the above-described sections of the office building questionnaire presents web page buttons that allow the user to move back and forth between the sections of the questionnaire. On the final section for major tenants (FIG. 67), the button Submit Questionnaire allows a user to submit the questionnaire and exit the Add Listing function of the present invention. After clicking the Submit Questionnaire button, the web page presents the user with a confirmation thank you page (FIG. 68), thanking the user for submitting the office questionnaire and providing a tracking number for the user's records. The confirmation page also informs the user that a research analyst will be contacting the user shortly concerning the listing. According to the overall process of the present invention, once the research analyst contacts the listing entity and confirms the validity of the information, that data is entered into the database for access by the search function.

Figure 69:
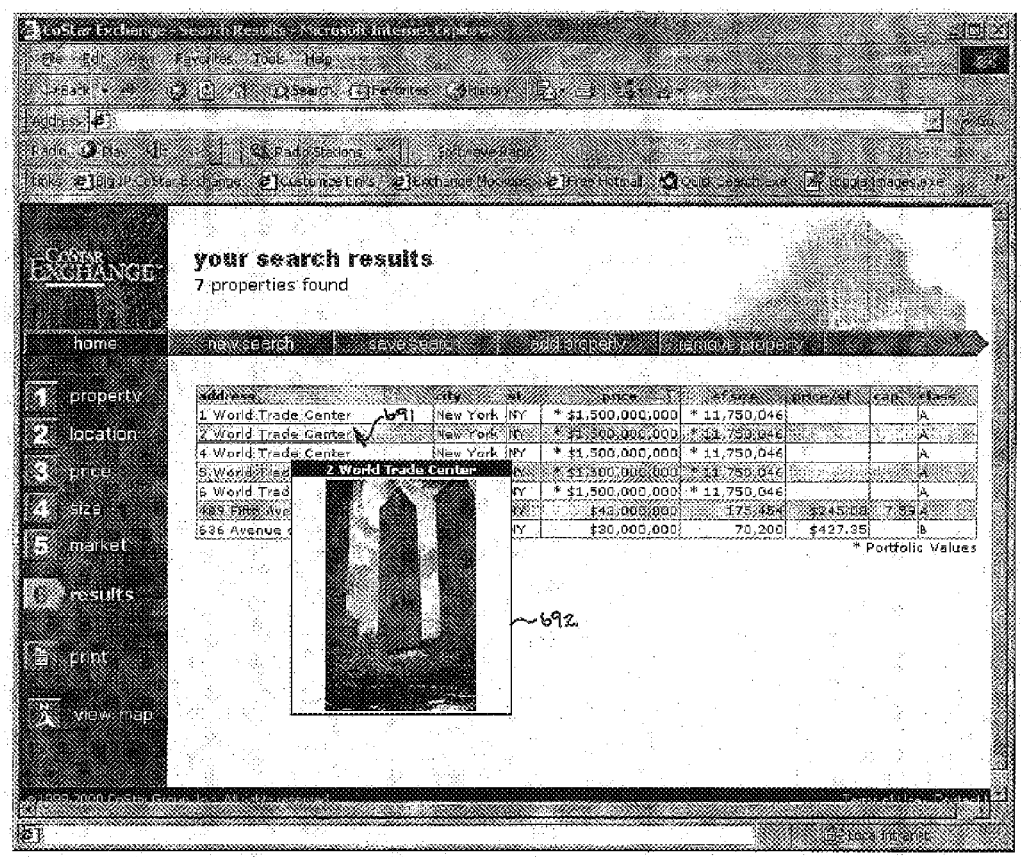
Figure 70:
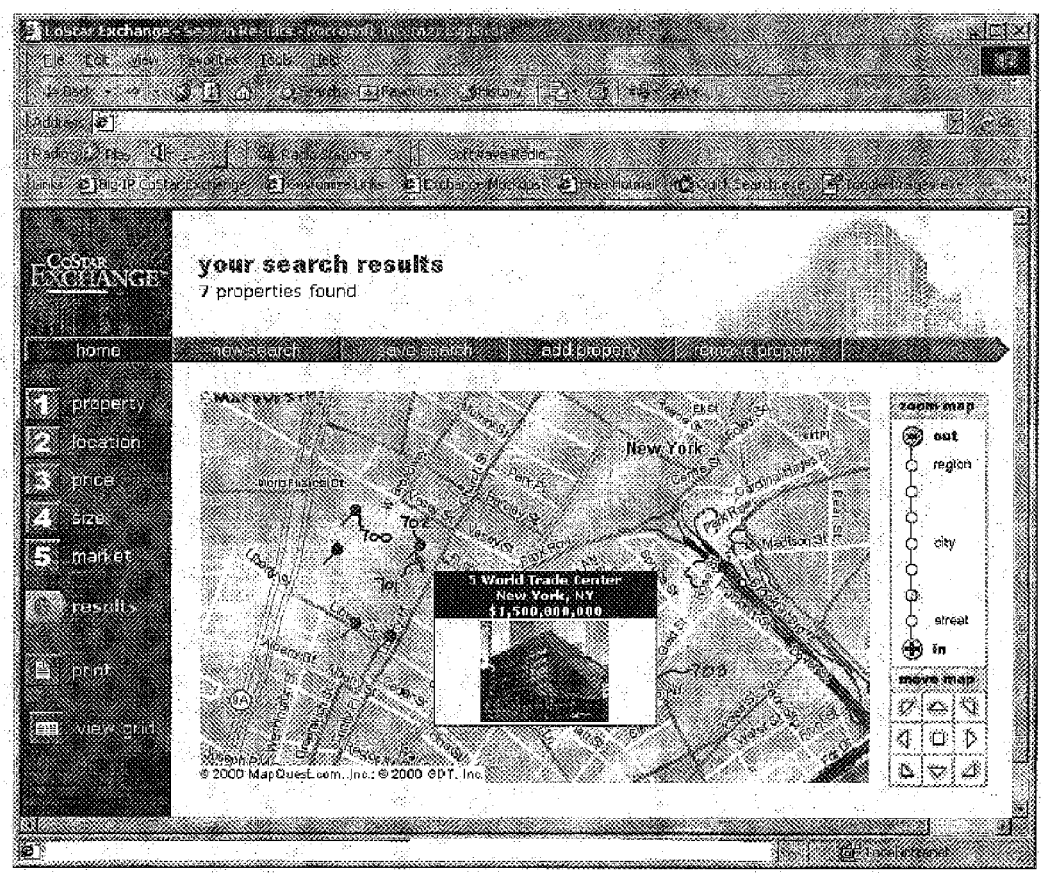
Figure 71:
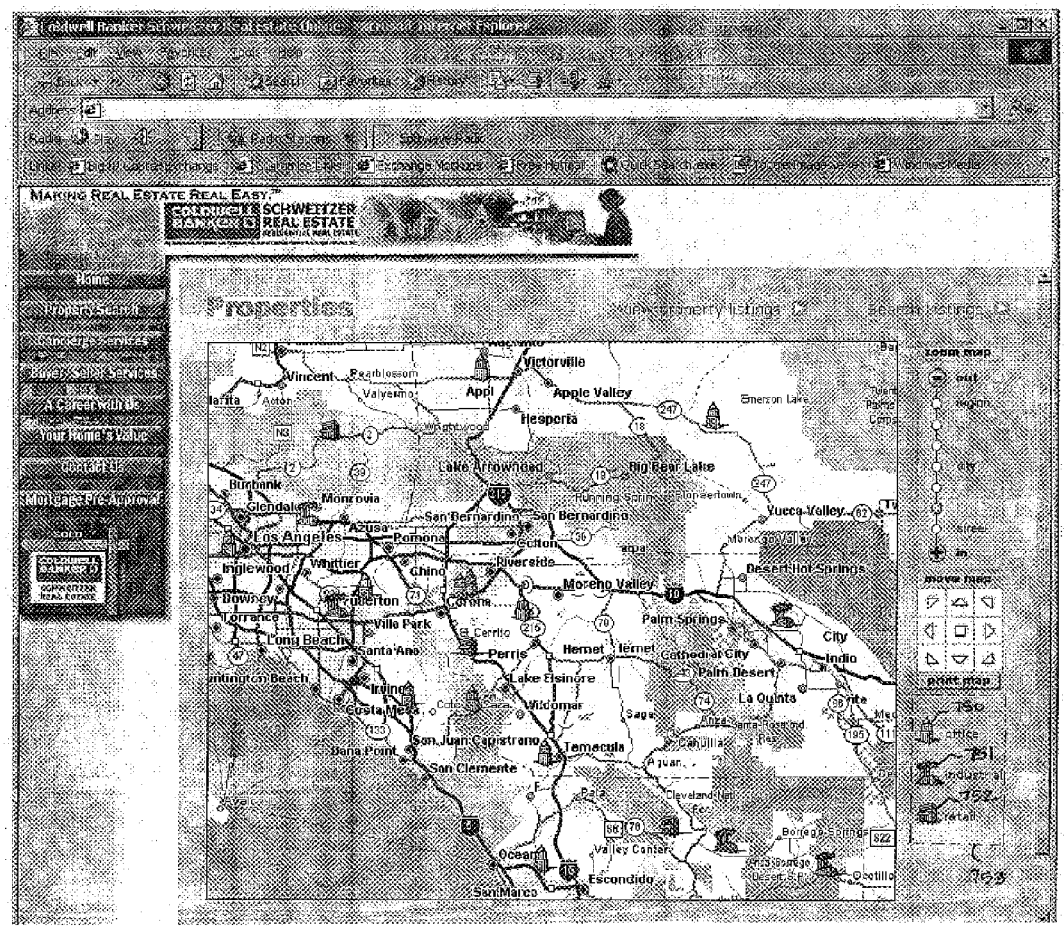

In a further preferred embodiment of the present invention, FIGS. 69–71 illustrate a system and method for providing real estate property information through a unique user interface. The system and method link display elements on a user interface to a real estate property database. Each display element represents a specific real estate property. Proximate to each element, the user interface includes a link (e.g., a Hypertext Markup Language (HTML) link) to a data entry in the database corresponding to the specific property. By selecting the display element (e.g., by clicking through it with a mouse), a user can access the corresponding information from the data entry in the database. Preferably, a user selects the display element by dragging a mouse pointer over the element, in which case the system automatically accesses the corresponding information and displays it in a pop-up window. Optionally, a user could also select the display element using a touch screen, a voice activated response system, or any other type of pointing or selecting device.

The preferred formats of the user interface and display element include 1) a chart with textual listings of properties and 2) a map with icons or some other type of indicator to indicate properties within the particular geographic area covered by the map. FIG. 69 illustrates the chart format in which the textual property listings are the display elements. In this example, the chart of search results contains eight property listings. The user has positioned the mouse pointer 691 over the listing "2 World Trade Center" and has activated the link to a data entry in the property database corresponding to the "2 World Trade Center." In response, the system has displayed a pop-up window 692 containing a photograph of the property.

FIG. 70 illustrates the map format in which the display elements are icons or other types of indicators. In this example, the icons are push-pins 700. The user has positioned the mouse pointer 701 proximate to a particular pushpin 702 and has activated the link to a data entry in the property database corresponding to the "5 World Trade Center." In response, the system has displayed a pop-up window 703 containing a photograph, address, and price of the property.

Although these examples describe limited categories of information displayed in the pop-up window, the information could include any data available from the property database, including media such as text, images, audio, and video. In addition, as a further feature, after the display element is selected and the pop-up window is displayed, the user can click on the pop-up window to view a subsequent display containing more details about the property. As an example, the information included in the pop-up window and the subsequent display could include images of the property, audio content relating to the property, video of the property, and one or more textual details on the property, such as the address of the property, the building class size, the building size, the number of floors, the year built, the buyer, the sale price, the price per square foot, and the cap rate.

In this further preferred embodiment, a user can easily browse a chart of search results or a map of a particular geographic area to learn about for property for sale or for lease. Although FIGS. 69 and 70 present this embodiment of the present invention within the context of searching for property for sale or lease, the method of linking map indicators with geographically pertinent database information, and especially photographic or video information, is also applicable to other aspects of the present invention, e.g., in looking up or searching for comparable properties within a particular geographic area or for searching for property listings limited to specific criteria. As an example, FIG. 71 illustrates using the map format of this embodiment of the present invention to search property listings of a particular broker, e.g., Coldwell Banker™.

FIG. 71 also shows an additional aspect of this further preferred embodiment, in which the display elements carry an added information content. In this manner, the user can recognize a characteristic of the property even before activating the link associated with the display element. For example, as shown in FIG. 71, different icons could signify different types of property, such as office, industrial, and retail, corresponding to icons 750, 751, and 752, respectively. Preferably, a legend 753 indicates to the user the meaning of each icon. A user interested in the particular listings of Coldwell Bankerm, but only interested in purchasing retail space, would browse the map looking for icon 752 and would save time by dragging the mouse pointer only across that particular icon.

As one of ordinary skill in the art would appreciate, this aspect would work equally as well in the residential real estate context, in which different icons could, for example, represent condominiums, townhouses, and single family homes. In addition, icons or other indicators can represent different characteristics of a real estate property. For example, an indicator consisting of a certain number of dollar signs (e.g., "$$$") could show that a particular property is selling within a certain price range. A legend could provide the particular price ranges to which each number of dollar signs corresponds. As another example, the icon could be the price of the property itself.

As suggested by FIGS. 69–71, the present invention provides various user-friendly graphical user interface systems and methods that are useful in displaying information retrieved from a database. The graphical user interface features of the present invention are described herein largely in the context of a database containing data concerning real estate information and/or other information of interest, including merchant information, tourist information, service provider information, and the like, which is correlated with geographic location information to allow data pertaining to a particular geographic location to be retrieved. It should be appreciated, however, that the user interface features described herein are useful in other contexts as well, and that the graphical user interface tools described herein have broad applicability.

One user interface feature is the ability to provide seemingly automatic retrieval of location-based information. Underlying this seemingly automatic retrieval of location-based information is a software enabled feature that allows the system to retrieve one set of data in response to a user query or predetermined system queries to the database, but to display only a subset of the data retrieved (a first portion), while storing the remaining data (a second portion) locally such as in a cache on the user's computer. The portion of the data that is displayed (the first portion) may be displayed in a text grid/spreadsheet/chart format. Optionally, the data (the first portion) may be displayed in a map format. A subset (but preferably not all) of the second portion of data (i.e., the data that is retrieved and stored, but not displayed) may then be automatically displayed in response to a user input, such as passing a pointing device icon over a portion of the text grid/spreadsheet/chart or over an icon on the map display. More specifically, the user input selects a portion of the displayed data (the first portion) and system then displays a subset of the second portion of data that is relevant to the selected portion of the first portion.

In the embodiment described herein, the data initially retrieved includes digital images, address information, and price information. The digital images are not initially displayed. The address and/or price information of the properties is initially displayed (in a text grid/spreadsheet/chart or map format) in the display of the first portion of the data retrieved. The second portion of data includes the digital images (if available) of all the properties retrieved, but each image is only displayed when the user "selects" a property as described above. The display is both uncluttered with extraneous data (because most of the second portion of data is NOT displayed) and user-friendly because the relevant subset of the second portion of data is displayed quickly without need for an additional database query.

The interface further includes a means for users to optionally retrieve even further information from the database by, for example, selecting (e.g., with a pointing device) text or an icon representing the desired information. It should be understood, however, that this graphical user interface feature is more widely applicable and, indeed, can be used in connection with any system in which there is an advantage to use of this display technique.

In accordance with another graphical user interface feature of the present invention, icons can be used to provide information about the properties shown in the text grid/spreadsheet/chart or map view of the user interface. In the map view, for instance, an icon's location on a map provides geographic location information. To provide further information, the icon may be in a shape or appearance that conveys information concerning the type of property, the cost of the property, or the identity of the broker listing the property. Further, the icon may be a small digital image (thumbnail image) of the property itself to convey further information.

The graphical user interface features described herein may be used in various combinations to customize functionality for different purposes to leverage the use of the database. For example, it is possible for the system operator to provide custom content for individual brokers by using predetermined queries to display only properties listed by a particular broker and by displaying the information as an essentially seamless part of the broker's web site. The hierarchical display of information retrieved from the database can be used in other contexts where display of too much information is confusing or impractical, and resubmitting queries to get basic information is too cumbersome for users. Thus, the present invention also provides graphical user interface tools with broad applicability.

Detailed Description of Derivative Embodiments

According to another aspect of the present invention, the system includes a method and system for listing and brokering a commodity and its financial derivatives. The method begins by identifying a plurality of characteristics of a particular commodity such as commercial real estate, and then entering those characteristics into a data processing system using a real-time clock. Once the commodity characteristics are entered, an exchange market for the commodity is established based upon a pre-selected set of the commodity's characteristics. After market price for each commodity listed in the database has been set, a class or classes of financial derivatives can be established. Then, with the establishment of derivative classes, a financial exchange market for those derivatives can be established.

The characteristics of the commodity to be listed, and subsequently traded, would preferably include: a geographic location; a lease term start date range and a lease term end date range; a building class (e.g., class A, B, C); a volume; and a cost. These characteristics generally describe commercial real estate, which is the broad class of commodity to be traded in the preferred embodiment of the present invention.

The entry of the commodity into the data processing system comprises several steps, these include: determining whether or not the commodity is being identified to the data processing system for the first time; and, storing the commodity characteristics in a commodity database if the entry is indeed a first time entry. If the entry is not a first time entry, then the status of the entry with respect to being a candidate for purchase, sale, or trade would need to be determined.

The description or characteristics of the derivatives would be more general in context than that of the commodity itself and could be described by a series of broad categories. These categories might include: all commercial real estate available during a particular time period in a particular region; all commercial real estate of a certain class or cost; or, a combination of categories. The broad characteristics of the derivatives would comprise a Lease Space Equivalent Unit, or LSEU.

The LSEU comprises a: common descriptive link between varied commodity types; a time period (contract length) that runs from the date of the contract to the performance date of the commodity; and, a contract price. When entering the characteristics of the LSEU into the data processing system, the system determines whether the entry is being made for the first time. If so, then the characteristics are entered into the derivatives database and an identifier is issued. If the described derivative has been previously entered into the system, then the system determines the status of the derivative, with respect to whether or not that derivative is being exchanged, sold, or traded.

The system which employs the method of the subject invention comprises a number of elements that include: data processing means for accepting and storing the parameters of the commodity available for sale or exchange; data processing means for entering a description of the commodity desired for purchase or exchange; means for determining whether a match exists based upon a comparison of the commodity offered for sale and that requested for purchase or exchange; means for displaying the matched entry to a system operator; means for selecting the matched entry for purchase and/or exchange; means for determining a class of financial derivatives based upon a pre-determined set of characteristics resident in the commodity descriptions stored in the database; and means for selecting a class of derivatives for purchase and/or exchange.

The data processing means of the system, in turn, further comprises a system controller. The system controller is comprised of a number of elements, which include: a data processing system and programs for the management of data; data entry means for entering data into the data processing system; memory means for storing data; and, communication means for communicating data between the system controller and a plurality of input and output points. The input and output points, for the input and output of data, comprise: one or more commodity input points; one or more commodity receiver points; one or more commodity brokerage points; and, one or more derivative exchange points.

Figure 72:
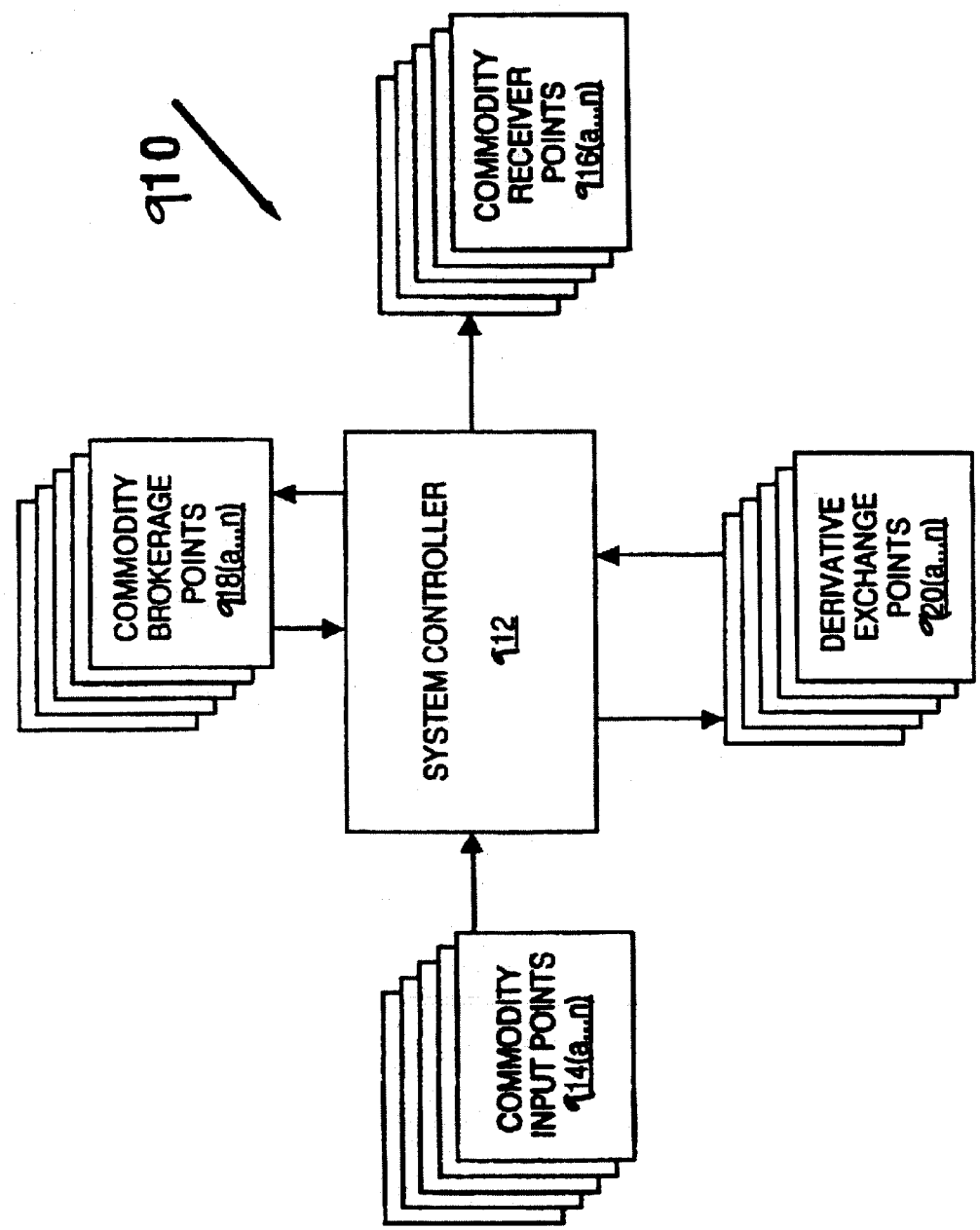
FIG. 72 is a high level overview of the proposed method and system for listing, brokering, and exchanging carrier capacity, according to a preferred embodiment of the present invention.
Figure 73:
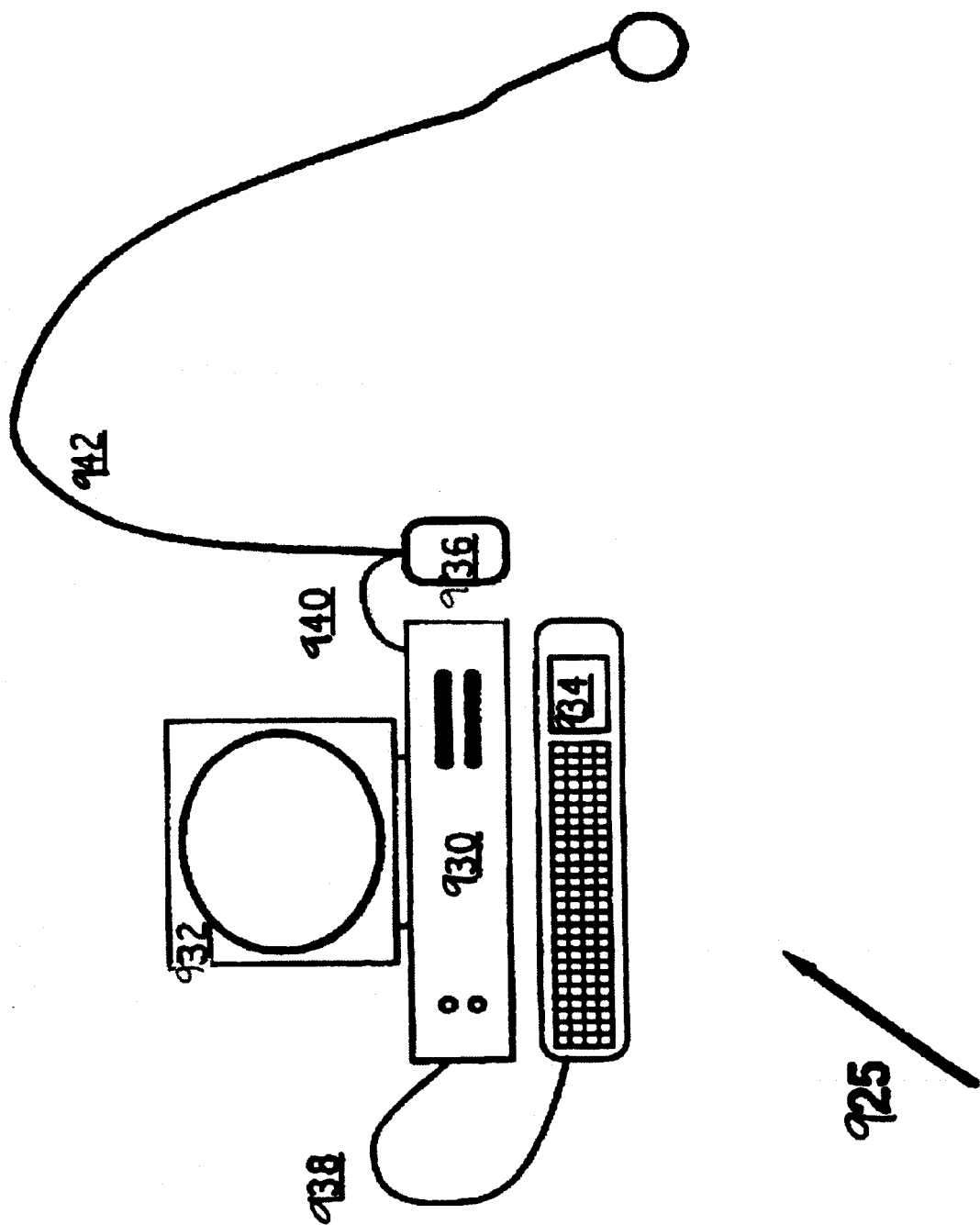
FIG. 73 is a drawing of the apparatus that can be used as an entry point into the system to utilize the method, according to a preferred embodiment of the present invention.

The system for implementing this aspect of the present invention can be a known system, such as that shown in FIG. 72 and FIG. 73, applied to this new area and taking advantage of the unique unified data model of the present invention. To begin with, as shown in FIG. 72, a high level flowchart of the overall system of the subject invention is designated as system 910. System 910 comprises a central hub in the form of a system controller 912 which can be a computer or a data processing system for processing data entered by the system operator. System controller 912 has a number of input and output points which allow nodes located at the input and output points to utilize this known method in a new context, i.e., commercial real estate.

Commodity input point 914 can exist as a single point or as multiple points. At commodity input point 914, the description of a commodity to be traded or purchased is entered into system 910 and resides within system controller 912. In a preferred embodiment of the invention, the commodity to be entered is commercial real estate. Entry of the commodity into system 910 must include enough information so as to identify the commodity in time, place, volume, and class. In an alternative: embodiment of the subject invention, system controller 912 resides within each of the input and output points 914, 916, 918, and 920 so that the database of each is redundant to the others with respect to storing commodity data.

Commodity receiver point 916 can exist as a single point or as multiple points. At commodity receiver point 916, the description of a commodity that has been purchased is confirmed to the purchaser by a confirmation transmitted from system controller 912. The confirmation will include an identification of the commodity purchased and a market value for the commodity that will be debited from an account of the purchaser and credited to an account of the carrier listing the commodity.

Commodity brokerage point 918 can exist as a single point or as multiple points. At commodity brokerage point 918, the trading of a commodity between a commodity owner and a secondary purchaser is entered into system 910. A secondary purchaser is defined as a purchaser who did not purchase the commodity to be traded directly from the carrier who introduced the commodity to the market. A request to purchase or trade a particular commodity is entered into system controller 912, which will attempt to seek a match between the commodity requested and commodities available for sale or trade. Alternatively, a listing of commodities available for sale or trade, within certain parameters, can be displayed prior so that a sale or trade request can be subsequently entered.

Derivative exchange point 920 can exist as a single point or as multiple points. At derivative exchange point 920, the trading of a derivative between a derivative owner and a derivative purchaser is entered into system 910. A derivative is defined as a financial instrument whose value is based on the perceived future collective value of a breadbasket of primary instruments. For example, a derivative could be based on the value of all commercial real estate leases of a specified class in a specified area for a period ending on a particular date some time in the future (i.e., 90, 120, 180 days forward). A request to purchase or trade a particular derivative is entered into system controller 912, which will attempt to seek a match between the derivative requested and derivatives available for sale or trade. Alternatively, a listing of derivatives available for sale or trade, within certain parameters, can be displayed prior so that a sale or trade request can be subsequently entered.

Turning to FIG. 73, there is shown subsystem 925, which represents an input/output point that is porting data to system controller 912 shown in FIG. 72. Subsystem 925 comprises: microprocessor 930 for processing data entered by the system operator; microprocessor 930 operatively connected to monitor 932 where the system operator can view entries made to the system, matches available, or receive notification of a match; keyboard 934, which is used to make data entries to the system connected to microprocessor 930 by interface cable 938; and, modem 936, which can transmit data entries to, or receive data entries from, system controller 912, connected to microprocessor 930 by interface cable 942.

Description of Representative Embodiment

As described above, the system and method of the present invention provide the unified data model required to complete the development of a digital marketplace for the commercial real estate and related business community. The marketplace contains a wealth of information that can be used to provide an array of new services.

The currently preferred embodiment of the database of the present invention tracks over 15 billion square feet of U.S. commercial properties, and is one of the largest in existence. Over 700 researchers make daily updates to the database. This highly complex database is comprised of hundreds of data fields, tracking such categories as: location; site and zoning information; building characteristics; space availability; tax assessments; ownership; sales comparables; mortgage and deed information; for-sale information; income and expense histories; tenant names; lease expirations; contact information; and historical trends.

The database includes over 660,000 high-resolution digital images, including building photographs, aerial photographs, and floor plans. The database tracks approximately 900,000 tenants occupying office and industrial space in 54 U.S. markets.

The currently preferred embodiment also employs a sophisticated data collection organization, made up of a combination of researchers, management systems, computer and communications hardware, and software systems. To begin with, over 700 researchers collect and analyze office and industrial real estate information through hundreds of thousands of phone calls, e-mails, internet updates, and faxes a year, in addition to e-mails, field inspections, news monitoring, and direct mail. Moreover, because of the importance commercial real estate professionals place on the data, they frequently take the initiative to report transactions to our researchers.

In addition, the system includes management and quality control systems. Both automated and non-automated controls are used to ensure the integrity of the data collection process. A large number of automated data quality tests check for potential errors including occupancy date conflicts, available square footage greater than building area, typical floor greater than land area, and expired leases. Non-automated quality control procedures include: calling our information sources on recently-updated properties to re-verify information; reviewing commercial real estate periodicals for transactions to cross-check our research; and performing field checks to ensure the correct canvassing of all building. Finally, one of the most important and effective quality control measures is feedback, garnered through regular client surveys taken from the commercial real estate professionals using the data of the present invention every day.

With regard to computer and communications hardware, the system maintains Windows NT servers in support of the database and a national internal frame relay network to allow remote researchers real-time access to the database. Full data back-ups are stored off-site.

The system uses client-server software to manage internal data collection. In addition, the system uses custom software systems for four primary functions: collection of building-specific data; tracking of commercial real estate companies and individuals; facilitating operations; and distribution of data.

The currently preferred embodiments of various services that can be provided with the unified data model will now be described in detail in the following paragraphs.

CoStar Property

This is a database of more that 15.3 billion feet of commercial space in the United States (mostly office and industrial), combining hundreds of data fields such as space availability, sales comps, properties for sale, ownership, photos, size, location, and characteristics. CoStar Property has fostered the development of the digital leasing marketplace. Clients use CoStar Property to research leasing options, analyze market conditions and competitive property positions, and produce multimedia client presentations. Members of the broader commercial real estate community, including non-CoStar Property subscribers, Use CoStar Property extensively to market their properties. The subscriber can query CoStar Property with any combination of pertinent criteria, combining any of approximately one hundred data fields from categories such as building size, location, building characteristics, space, availability, ownership, or sales comparables. CoStar Property's search engine scans through hundreds of millions of square feet of space in a specified market in seconds to find all the properties meeting the search criteria. The user can select from over 50 customizable reports, presenting space availability, comparable sales, tenant activity, market statistics, photographs, and floor plans. The user can export and edit reports, photos and floor plans to help determine feasibility of a specific space. Clients also use CoStar Property to analyze market conditions by calculating current vacancy rates, absorption rates, or average rental rates.

CoStar Tenant

This is a database of some 900,000 tenants and their lease terms, including all building information, rents, lease terms, commissions and broker, tenant type or business, and other data. A key service feature is accurate lease expiration information. Clients use CoStar Tenant to: find information about particular tenants; identify and target the most likely tenants to lease space; identify all tenants in a particular building; understand trends and the underlying demand for commercial real estate; identify and target the tenants most likely to need representation for their real estate requirements; and identify and target the tenants most likely to buy a particular vendors' goods and services.

COSTAR EXCHANGE™

Allows property owners to list their properties for sale (and list extensive information about their properties) on the system operator's website at no cost. The generation of the product is from the company's database, incorporating much of the data in tenant and property but emphasizing the sale process as opposed to the listing process. Emphasized information will include tenant information, leasing information, and income and expense data. These listings allow sellers to reach a very large audience. There are currently over 38,000 buildings for sale in the CoStar/Comps database, representing in excess of some $40 billion in aggregate value. The system is sold on a subscription basis into the existing client base and can also create on-off revenue. The exchange is a web-based marketplace to more efficiently and securely facilitate the buying and selling of commercial properties. Information is distributed through a secure web service, known as COSTAR EXCHANGE™. The site affords an efficient means for these sellers to reach a large universe of potential buyers. Potential buyers pay a subscription fee to access the system. Sellers of investment-grade properties have the additional option of selecting limited, secure distribution of their properties in order to address confidentiality requirements.

CoStar Analytic

This service is a web-based analytical tool based on the tenant and property databases. The tool is designed to allow users to analyze underlying trends in the covered markets. The types of inquiries that can be made are nearly limitless and are based on combinations of fields in the database. A typical inquiry might be to analyze leases rolling over in a submarket over a forward 36-month period to try to determine the leasing success of a potential new development. CoStar Advisory is sold both on a subscriber basis and on a per-search basis. Users can analyze the important changing trends in market metrics such as vacancy rates, tenant movements, supply, rental rates, tenant demographics, new construction, and absorption rates. This web-based analytic tool allows users to perform more sophisticated analyses of underlying market conditions and trends when making investment, leasing, purchase, sale, construction, and marketing decisions involving commercial real estate. These tools provide strategic insight into the changing trends in vacancy rates, tenant movements, supply, new construction, absorption rates, and other important market metrics. The system also provides fee-based customized reports and advisory services.

CoStar Comps

This service is an enhanced web-based service providing confirmed commercial real estate sales information on properties that have recently sold. This web-based service enables clients to track and analyze sales comparables in a more timely and comprehensive manner than is currently possible. This service covers 47 national markets, including information on comparable sales such as sale prices, income and expenses, capitalization rates, loan data and other details. Clients can search the proprietary database of comparable sales information by multiple search parameters, including location, property type, square footage, price range, and number of units. Clients receive a report of all relevant properties in the database matching their search criteria, including photographs.

CoStar Marketplace

The participants in the CoStar marketplace directly influence approximately $100 billion in leasing and sales each year. The system allows the system operator to provide digital marketing opportunities to reach this audience through premium high-exposure banner ads on CoStar and on the website. The Marketplace provides an online means for the commercial real estate and related business community to direct advertising to the appropriate decision-makers. The service benefits clients by providing increased distribution, higher visibility, and a more cost effective way to reach an audience targeted for their advertising material.

CoStar News

This service provides website, CoStar, and e-mail news dispatches that keep clients informed of late-breaking commercial real estate news such as deals signed, acquisitions, ground breakings and other features. Web banner ads are prominently displayed on the site, generating significant revenues. The system also allows the system operator to deliver a free e-mail system built around customized client profiles, with highly-targeted banner advertising attached.

The present invention thus provides a digital marketplace in which the members of the commercial real estate and related business community can continuously interact and can facilitate transactions by efficiently exchanging accurate and standardized information. In addition, the system operator is capable of providing the depth and breadth of the following services:

Digital leasing marketplace—provides the information required to efficiently conduct commercial real estate leasing transactions, both between brokers and between owners and brokers. The system operator delivers this service through CoStar Property and CoStar Tenant, which benefit clients by providing a more comprehensive solution with much higher data quality, at substantially less time and cost than otherwise available.

Digital Selling Marketplace

This service provides the information required to efficiently and securely conduct commercial real estate buy and sell transactions. The system operator can deliver this service through CoStar and enhance this service through COSTAR EXCHANGE™. This service benefits clients by allowing purchasers to make more-informed investments and sellers to maximize realized property values.

On-line Decision Support Services

These services allows members of the community to perform analysis of underlying market conditions and trends when making investment, leasing, purchase, sale, build, and marketing decisions involving commercial real estate. The system operator can deliver these services through CoStar Analytic and CoStar Comps. These services benefit clients by providing powerful, flexible, time-efficient, and accurate analytic capabilities.

Tenant Information Services

These services enable members of the commercial real estate and related business community to identify and market to the tenants who are the most likely prospects for their goods and services. The system operator delivers these services primarily through CoStar Tenant. These services benefit clients by more precisely identifying and capturing viable prospects at a lower cost.

On-line Property Marketing

This service provides a targeted on-line means for the commercial real estate and related business community to direct advertising to the appropriate decision-makers. The system operator can deliver this service through CoStar and via the website. This service benefits clients by providing them increased distribution, higher visibility, and a more cost-effective way to reach their targeted audience than otherwise available.

On-line Industry News

This service allows members of the commercial real estate and related business community to remain current with developments in the industry. The system operator delivers these services through CoStar, www.costargroup.com, which benefit clients by providing more timely and in-depth news.

The increased availability of the services from a web-based platform will allow the commercial real estate and related business community real-time access to the CoStar marketplace data and provide the opportunity for increased interaction among community members. This will lead to the development of a more efficient commercial real estate marketplace.

The preferred embodiment of the present invention relates to a system and method for collecting, standardizing, and distributing information pertaining to commercial real estate. The information falls into three conceptual camps: Information about the leasing of commercial space (which itself is divided into tenant data and space-for-lease data); Information about the listing and sale of buildings; and Market research.

The commercial real estate brokerage community supplies the first two types of information. As a broker in a local market gets a listing, the space for sale or rent is listed in the CoStar system and the information enters the database. For example, if a user wanted 10,000 feet in downtown Los Angeles, the CoStar system would allow the tenant representative broker to search suitable locations in that market based on up to 100 data fields. Listing brokers that represent the property owner would have provided the actual data.

The present invention achieves significant network effect benefits to the extent nearly every major brokerage company in the United States submits its data and uses the system. If a large brokerage does not use the system, its clients do not get the best and widest market for lease or sale transactions. Imagine a stockbroker that maintains an internal market in a select group of stocks, but the market is highly illiquid and inactive. Meanwhile, all the other brokers share information and liquidity in a centralized digital exchange. If a customer happens to want to sell a particular stock and no one in the small broker's office is familiar with what is going on with that stock, the customer would be out of luck. This is the conundrum the real estate brokers face, as network effects cause the system to become even more important.

In all cases, the information is scrubbed, verified, and systemized to conform to the database so it is digitally accessible. In the case of market data, some is digitally culled from the 1.5 terabytes of historical real estate data that already exists in CoStar's computers, supplemented by on-going field research. Field researchers using mobile vehicles and other tools compile digital images, location information, and site-specific data, both verifying data already entered by the brokerage community and completing the market research function. The system standardizes information across source and market.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A system for correlating information stored in a remote database with a user's location, retrieving pertinent data files from the database based upon the user's location, and automatically transmitting the selected data files to the user, the system comprising:

user equipment sets, each user equipment set comprising a display and a location determining device for generating data pertaining to the user's location and for transmitting the data pertaining to the user's location to a remote computer automatically;

a computer, the computer equipped for wireless communication with geographically remote users that are equipped with the equipment sets so as to send data to the equipment sets and receive data from the equipment sets including the data pertaining to the user's location; and a database in communication with the computer, the database storing information that includes information identifying a location of a property and features of the property;

whereby, in response to receipt of the data pertaining to a user's location, the computer automatically:

identifies in the database, from the information identifying a location of a property, a property nearby the user's location, retrieves from the database the features of the nearby property, and an identification of features of the property that have not been entered into the database, transmits the features and the identification of missing features of the nearby property to the user's equipment set for display on the display, and prompts the user to update the features and input the missing features through the user's equipment set.

2. The system for correlating information stored in a remote database with a user's location, retrieving pertinent data files from the database based upon the user's location, and automatically transmitting the selected data files to the user according to claim 1, wherein the each user equipment set further comprises a data input device for allowing the user to input the missing features.

3. The system for correlating information stored in a remote database with a user's location, retrieving pertinent data files from the database based upon the user's location, and automatically transmitting the selected data files to the user according to claim 1, wherein the display is a color display adapted for displaying photographic images.

4. The system for correlating information stored in a remote database with a user's location, retrieving pertinent data files from the database based upon the user's location, and automatically transmitting the selected data files to the user according to claim 1, whereby in response to receipt of the data pertaining to the user's location, the computer automatically retrieves information describing commercial real estate near the user's location and transmits the same to the user's equipment set for display on the display.

5. The system for correlating information stored in a remote database with a user's location, retrieving pertinent data files from the database based upon the user's location, and automatically transmitting the selected data files to the user according to claim 1, whereby in response to receipt of the data pertaining to a user's location, the computer automatically retrieves information describing residential real estate near the user's location and transmits the same to the user's equipment set for display on the display.

6. The system for correlating information stored in a remote database with a user's location and retrieving pertinent data files from the database based upon the user's location, and automatically transmitting the selected data files to the user according to claim 1, whereby in response to receipt of data pertaining to a user's location, the computer automatically retrieves information regarding at least one of commercial enterprises and landmarks near the user's location and transmits the same to the user's equipment.

7. The system for correlating information stored in a remote database with a user's location and retrieving pertinent data files from the database based upon the user's location, and automatically transmitting the selected data files to the user according to claim 1, wherein the user's equipment set includes audio capabilities, and the features of the property include audio data.

8. The system for correlating information stored in a remote database with a user's location and retrieving pertinent data files from the database based upon the user's location, and automatically transmitting selected data files to the user according to claim 1, wherein the computer further transmits the information pertaining to the user's location to the user's equipment set for color display on the display.

9. The system for correlating information stored in a remote database with a user's location and retrieving pertinent data files from the database based upon the user's location, and automatically transmitting the selected data files to the user according to claim 8, wherein the information pertaining to the user's location further includes information on commercial enterprises located near the user's location, the information on commercial enterprises including information on at least one of the products, goods, and services provided by the commercial enterprises, whereby in response to receipt of the data pertaining to a user's location, the computer automatically retrieves the information on at least one of products, goods, and services provided by commercial enterprises near the user's location and transmits the same to the user's equipment set.

10. The system for correlating information stored in a remote database with a user's location and retrieving pertinent data files from the database based upon the user's location, and automatically transmitting the selected data files to the user according to claim 1, wherein the computer automatically retrieves information describing real estate near the user's location and the display shows a pop-up window including the information describing the real estate.

11. The system for correlating information stored in a remote database with a user's location, retrieving pertinent data files from the database based upon the user's location, and automatically transmitting the selected data files to the user according to claim 1, wherein the information stored in the database includes at least one of the following:

square footage available for lease;

whether a property is available for sale;

property address;
contact information; and
price.

12. The system for correlating information stored in a remote database with a user's location, retrieving pertinent data files from the database based upon the user's location, and automatically transmitting the selected data files to the user according to claim 11, wherein the information stored in the database also includes at least one of the following:
   a digital image of the property;
   square footage data representing a square footage of the property;
   data characterizing the selected use of the property;
   rental price of the property;
   sale price of the property;
   data about the tenant in the property;
   a real estate submarket identification;
   sales comparable information;
   lender information;
   a grade indicator of the property, the grade indicator having an alpha numerical representation and being a function of a classification system of the property that is consistent with accepted standards and providing a representation of the quality of the property;
   a classification of the property based upon at least one of the following: a building grade, an age of the building, and an extrapolation of comparable buildings; and
   information pertaining to the submarket including at least one of (i) rents, (ii) vacancy, and (iii) absorption rates for each of the submarket and nearby submarkets, and (iv) other indicators of submarket and location attractiveness.

13. The system for correlating information stored in a remote database with a user's location, retrieving pertinent data files from the database based upon the user's location, and automatically transmitting the selected data files to the user according to claim 11, whereby in response to receipt of data pertaining to the user's location, the computer automatically retrieves information describing the commercial real estate near the user's location and transmits the same to the user's equipment set for display on the display.

14. The system for correlating information stored in a remote database with a user's location, retrieving pertinent data files from the database based upon the user's location, and automatically transmitting the selected data files to the user according to claim 11, whereby in response to receipt of the data pertaining to a user's location, the computer automatically retrieves information describing the residential real estate near the user's location and transmits the same to the user's equipment set for display on the display.

15. The system of claim 1, wherein the database stores information about commercial real estate, the database comprising data records, including information pertaining to lease information, sale information, comparable sales information, and tenant information, and
   wherein the computer allows a plurality of users to query the database, add data to the database, and retrieve the information from the database.

16. The system of claim 15, wherein the database further includes at least one of:
   data about a tenant in the commercial real estate;
   building-specific information including data representing an age of the commercial real estate, and data representing financial obligations and tenancy status of the tenant in the commercial real estate;
   square footage data representing a square footage of the commercial real estate;
   data characterizing a selected use of the commercial real estate;
   cost data including a rental price of the commercial real estate;
   a real estate submarket identification;
   a classification of the commercial real estate based upon at least one of a building grade, an age of the building, and an extrapolation of comparable buildings; and
   information pertaining to a submarket including rent data, vacancy data, and absorption rate data.

17. The system of claim 15, wherein the data records include market analytic information.

18. The system of claim 1,
   wherein the display generates a plurality of digitized video images of real estate, each digitized video image depicting a real estate,
   wherein the database stores data records concerning the real estate including the digitized video images, textual information concerning the real estate, and information identifying the location of the real estate,
   wherein the location determining device determines a location of the user,
   wherein the computer retrieves data records corresponding to the user's location, and
   wherein the display displays the digitized video images and textual information from the data records corresponding to the user's location.

19. The system of claim 1, wherein the database is a unified group of correlated databases that provides real estate data to facilitate a real estate transaction, wherein each database of the unified group is a discrete data module, wherein real estate data entries of a first database of the unified group are associated with corresponding real estate data entries of the remaining databases of the unified group,
   wherein the computer is adapted to collect the real estate data from real estate industry data sources,
   record the real estate data in the first database of the unified group,
   determine an effect of the recorded real estate data on the remaining databases of the unified group,
   reconcile remaining real estate data in the remaining databases based on the effect, and
   distribute the recorded real estate data and the reconciled real estate data to real estate industry professionals and to real estate industry customers.

20. The system of claim 19, wherein the real estate data includes property information and tenant information, and the unified group of correlated databases comprises a property information database, and a tenant information database.

21. The system of claim 20, wherein the real estate data further includes comparable property information, assessment information, and market analytics information, and the unified group of correlated databases comprises a comparable property information database, an assessment information database, and a market analytics information database.

22. The system of claim 19, wherein the computer collects the real estate data by receiving web-based input from the real estate industry professionals and the real estate industry customers.

23. The system of claim 22, wherein the computer further collects the real estate data by receiving information from a mobile data acquisition vehicle that contains a user equipment set.

24. The system of claim 19, wherein the computer reconciles the remaining real estate data by confirming that the real estate data entries and the corresponding real estate data entries that were associated are internally consistent.

25. The system of claim 19, wherein the computer distributes the recorded real estate data and the reconciled real estate data by providing a web-based interface in communication with the unified group of correlated databases.

26. The system of claim 25, wherein the computer further provides communication between parties to a transaction, and transactional services in support of a transaction.

27. The system of claim 19, wherein the computer distributes the recorded real estate data and the reconciled real estate data by accepting a property search query from a user and running the property search query in the unified group of correlated databases and returning property search results to the user.

28. The system of claim 27, wherein the computer is further adapted to:
add properties to the property search results as directed by the user without running another search query;
remove properties from the property search results as directed by the user without running another search query; and
run negative search queries in the property search results as directed by the user to remove properties from the property search results.

29. The system of claim 27, wherein the computer is adapted to accept a second property search query from the user, run the second property search query on the property search results, and return a second set of property search results to the user.

30. The system of claim 27, wherein the property search results provide data from at least one of leasing history of a specific building, history of a market in a particular geographic area, and history of the specific building relative to the market.

31. The system of claim 27, wherein the computer is adapted to:
save the property search query as directed by the user;
run the saved property search query at a periodic interval; and
notify the user of new properties that satisfy the property search query.

32. The system of claim 31, wherein the saved property search query has at least one field that relates to market conditions and at least one new property satisfies the property search query because of a change in the market conditions.

33. The system of claim 26, wherein the computer provides a derivatives marketplace in which to define, value, and exchange real estate commodities.

34. The system of claim 33, wherein the commodities are real estate cost futures.

35. The system of claim 17, wherein the user equipment sets are adapted to:
display a user interface on the display,
display a display element on the user interface to indicate a property for which information is recorded in the unified group of correlated databases,
provide a link to the information on the user interface proximate to the display element,
allow a user to select the display element, and
in response to the selection, retrieve and display the information.

36. The system of claim 35, wherein the user selects the display element by dragging a pointer proximate to the display element, and wherein the information is automatically displayed.

37. The system of claim 35, wherein the user interface is one of a chart and a map, and the display element is one of a text listing and an indicator.

38. The system of claim 35, wherein the information includes at least one of a photograph of the indicated property, an address of the indicated property, a building class size of the indicated property, a building size of the indicated property, a number of floors of the indicated property, a year in which the indicated property was built, a buyer of the indicated property, a sale price of the indicated property, a price per square foot of the indicated property, and a cap rate of the indicated property.

39. The system of claim 35, wherein the user equipment sets allow the user to select the display element by providing one of a click-through button, a touch screen, and a voice activated response system.

40. The system of claim 1, wherein the database comprises a core data warehouse, and wherein the computer comprises:
data sources that gather and generate real estate data;
data mining applications in communication with the data sources, wherein the data mining applications receive and organize the real estate data into separate interrelated modules, and wherein the data mining applications evaluate the real estate data and reconcile the real estate data among the interrelated modules;
a contact management system in communication with the data sources and the data mining applications, wherein the contact management system directs data mining applications to conduct continuous pollings of the data sources to update the real estate data,
wherein the core data warehouse is in communication with the data mining applications, and wherein the core data warehouse receives and stores the reconciled and updated real estate data from the data mining applications;
database processes in communication with the core data warehouse, wherein the database processes access the reconciled and updated real estate data from the core data warehouse and create database sets; and
network integration applications in communication with the database processes, wherein the network integration applications manipulate the database sets in response to commands from a user and present results of the manipulation to the user.

41. The system of claim 40, wherein the network integration applications comprise at least one of a look up property application, a search database application, and an add listing application.

42. The system of claim 41, wherein the search database application accepts property search queries from the user, runs the property search queries, and returns property search results to the user.

43. The system of claim 42, wherein the search database application adds properties to the property search results as directed by the user without running another search query, removes properties from the property search results as directed by the user without running another search query, and runs negative search queries as directed by the user to remove properties from the property search results.

44. The system of claim 40, wherein the data sources include at least one of property managers, proprietary databases, Internet sources, site inspections, building owners, brokerage firms, real estate investment trust filings, tenant canvassing, public records, and comparable property databases.

45. The system of claim 40, wherein the data mining applications include at least one of a property information database, a tenant information database, an assessment information database, a comparable property information database, and a market analytics information database.

46. The system of claim 1, wherein the computer receives the updated features and the missing features, and enters the updated features and the missing features in the database.

47. A system for correlating information stored in a remote database with a user's location, retrieving pertinent data files from the database based upon the user's location, and transmitting the selected data files to the user, the system comprising:
- user equipment sets, each user equipment set including a display and means for inputting or determining a user's geographic location and for transmitting information pertaining to the user's location to a remote computer;
- a computer, the computer equipped for communication with geographically remote users that are equipped with the equipment sets so as to send data to the equipment sets and receive data from the equipment sets including data pertaining to a user's location; and
- a database in communication with the computer, the database storing information that includes information identifying the a location of a property and features of the property,
- whereby, in response to receipt of data pertaining to a user's location, the computer automatically:
  - identifies in the database, from the information identifying a location of a property, a property nearby the user's location,
  - retrieves from the database the features of the nearby property, and an identification of features of the property that have not been entered into the database,
  - transmits the features and the identification of missing features of the nearby property to the user's equipment set for display on the display, and
  - prompts the user to update the features and input the missing features through the user's equipment set.

48. The system for correlating information stored in a remote database with a user's location, retrieving pertinent data files from the database based upon the user's location and automatically transmitting the selected data files to the user according to claim 47, wherein the features of the nearby property include information concerning comparable properties.

49. The system for correlating information stored in a remote database with a user's location, retrieving pertinent data files from the database based upon the user's location and automatically transmitting the selected data files to the user according to claim 47, wherein the features of the nearby property include information concerning three dimensional video description of properties.

50. The system for correlating information stored in a remote database with a user's location, retrieving pertinent data files from the database based upon the user's location and automatically transmitting the selected data files to the user according to claim 47, wherein the features of the nearby property include information concerning historical performance of commercial properties.

51. The system for correlating information stored in a remote database with a user's location, retrieving pertinent data files from the database based upon the user's location and automatically transmitting the selected data files to the user according to claim 47, wherein the features of the nearby property include information concerning comparable lease data for commercial properties.

52. The system for correlating information stored in a remote database with a user's location, retrieving pertinent data files from the database based upon the user's location, and automatically transmitting the selected data files to the user according to claim 47, wherein the information stored in the database includes information pertaining to commercial real estate located proximate to the user's location, the information including at least one of data and images describing the commercial real estate, whereby in response to receipt of data pertaining to a user's location, the computer retrieves information describing the commercial real estate near the user's current location and transmits the same to the user's equipment set for display on the display.

53. The system for correlating information stored in a remote database with a user's location, retrieving pertinent data files from the database based upon the user's location, and automatically transmitting the selected data files to the user according to claim 47, wherein the information stored in the database includes information pertaining to residential real estate located proximate to the user's location, the information including at least one of data and images describing the residential real estate, whereby in response to receipt of data pertaining to a user's location, the computer retrieves information describing the residential real estate near the user's current location and transmits the same to the user's equipment set for display on the display.

54. The system for correlating information stored in a remote database with a user's location and retrieving pertinent data files from the database based upon the user's location and automatically transmitting the selected data files to the user according to claim 47, whereby in response to receipt of data pertaining to a user's location, the computer retrieves geographically pertinent information and transmits the same to the user's equipment set for display on the display.

55. The system for correlating information stored in a remote database with a user's location and retrieving pertinent data files from the database based upon the user's location and automatically transmitting the selected data files to the user according to claim 47, wherein the display comprises:
  (i) a map of a geographic area;
  (ii) an indicator on the map to indicate a property for which information is recorded in the database; and
  (iii) a pop-up window linked to the indicator, wherein the pop-up window appears when the user's location is proximate to the property for which information is recorded in the database, and wherein the pop-up window displays the information recorded in the database.

56. The method of claim 55, wherein the information includes at least one of a photograph of the indicated property, an address of the indicated property, a building class size of the indicated property, a building size of the indicated property, a number of floors of the indicated property, a year in which the indicated property was built, a buyer of the indicated property, a sale price of the indicated property, a price per square foot of the indicated property, and a cap rate of the indicated property.

57. The system of claim 47, wherein the display provides three dimensional video depictions.

58. The system of claim 47, wherein the display comprises:

(i) a map of a geographic area;

(ii) an indicator on the map to indicate a location of a property for which a data record exists;

(iii) a link to the data record on the map proximate to the indicator; and (iv) a pop-up window proximate to the indicator, wherein the pop-up window appears when the link is activated, and wherein the pop-up window includes at least a portion of the data record.

59. The system of claim 58, wherein the link is activated by one of dragging a pointer over the indicator, touching a touch screen at the indicator, and voicing a command to a voice activated response system.

60. The system of claim 58, wherein the pop-up window provides access to an image of the indicated property, audio content relating to the indicated property, video of the indicated property, and textual information on the indicated property.

61. The system of claim 60, wherein the textual information includes one of an address of the indicated property, a building class size of the indicated property, a building size of the indicated property, a number of floors of the indicated property, a year in which the indicated property was built, a buyer of the indicated property, a sale price of the indicated property, a lease price of the indicated property, a price per square foot of the indicated property, and a cap rate of the indicated property.

62. The system of claim 58, wherein the indicator signifies a characteristic of the indicated property.

63. The system of claim 62, wherein the indicator signifies that the indicated property is one of an office space, an industrial space, and a retail space.

64. The system of claim 62, wherein the indicator signifies that the indicated property is one of a condominium, a townhouse, and a single family home.

65. The system of claim 62, wherein the indicator signifies the price range of the indicated property.

66. The system of claim 62, wherein the indicator signifies the price of the real estate indicated property.

67. The system of claim 47, wherein the computer receives the updated features and the missing features, and enters the updated features and the missing features in the database.

* * * * *